United States Patent
Chen et al.

(10) Patent No.: US 12,526,501 B2
(45) Date of Patent: Jan. 13, 2026

(54) IMAGING LENS MODULE AND ELECTRONIC DEVICE WITH HARDNESS-CONTROLLED ISOLATING ARTICLE AND PLASTIC MOLDING ARTICLE

(71) Applicant: LARGAN INDUSTRIAL OPTICS CO., LTD., Taichung (TW)

(72) Inventors: Chih Cheng Chen, Taichung (TW); Yu Chen Lai, Taichung (TW); Ming-Ta Chou, Taichung (TW); Tzu Kan Chen, Taichung (TW); Tsao-Pin Chen, Taichung (TW)

(73) Assignee: LARGAN INDUSTRIAL OPTICS CO., LTD., Taichung (TW)

( * ) Notice: Subject to any disclaimer, the term of this patent is extended or adjusted under 35 U.S.C. 154(b) by 675 days.

(21) Appl. No.: 17/895,850

(22) Filed: Aug. 25, 2022

(65) Prior Publication Data

US 2023/0341647 A1 Oct. 26, 2023

Related U.S. Application Data

(60) Provisional application No. 63/333,334, filed on Apr. 21, 2022.

(51) Int. Cl.
*H04N 5/335* (2011.01)
*G02B 1/118* (2015.01)
(Continued)

(52) U.S. Cl.
CPC ............. *H04N 23/55* (2023.01); *G02B 1/118* (2013.01); *G02B 7/021* (2013.01); *H04N 23/52* (2023.01);
(Continued)

(58) Field of Classification Search
CPC ..................................................... H04N 23/55
See application file for complete search history.

(56) References Cited

U.S. PATENT DOCUMENTS 8,969,120 B2   3/2015  Huang
10,748,829 B2 *  8/2020  Chen ..................... H10F 39/026
(Continued)

FOREIGN PATENT DOCUMENTS

CN           1959995 A      5/2007
CN         100483726 C      4/2009
(Continued)

OTHER PUBLICATIONS

Taiwan Office Action dated Nov. 4, 2022 as received in application No. 111118816.
(Continued)

*Primary Examiner* — Gary C Vieaux
(74) *Attorney, Agent, or Firm* — Maschoff Brennan

(57) ABSTRACT

An imaging lens module includes a sensing part, a lens assembly, a lens holding member, an isolating article and a plastic molding article. The sensing part includes a substrate, a sensing chip and a plurality of conducting wires. The substrate supports the sensing chip. The sensing chip includes an optical effect area and an electrical connection area. The conducting wires are electrically connected to the electrical connection area for transmitting an image signal. The lens assembly corresponds to the optical effect area. The lens holding member holds the lens assembly. The lens holding member includes a wire correspondence structure corresponding to the conducting wires. The isolating article is between the wire correspondence structure and the conducting wires. The plastic molding article is molded on the
(Continued)

sensing part. The plastic molding article physically contacts the lens holding member to fix the lens holding member with respect to the sensing part.

24 Claims, 73 Drawing Sheets

(51) Int. Cl.
  *G02B 7/02* (2021.01)
  *H04N 23/52* (2023.01)
  *H04N 23/54* (2023.01)
  *H04N 23/55* (2023.01)
  *H10F 39/00* (2025.01)
  *G03B 30/00* (2021.01)

(52) U.S. Cl.
  CPC ........... *H04N 23/54* (2023.01); *H10F 39/806* (2025.01); *G03B 30/00* (2021.01)

(56) References Cited

U.S. PATENT DOCUMENTS

| | | | |
|---|---|---|---|
| 2007/0272827 A1 | 11/2007 | Heo | |
| 2008/0023808 A1 | 1/2008 | Wu et al. | |
| 2018/0077327 A1* | 3/2018 | Du | H04N 23/54 |
| 2018/0113378 A1 | 4/2018 | Wang et al. | |
| 2019/0165019 A1* | 5/2019 | Wang | H01L 24/48 |
| 2021/0223517 A1 | 7/2021 | Yamamoto | |
| 2022/0359593 A1* | 11/2022 | Hsu | H01L 23/3128 |

FOREIGN PATENT DOCUMENTS

| | | |
|---|---|---|
| CN | 104580859 B | 4/2015 |
| CN | 105681637 A | 6/2016 |
| CN | 105721754 B | 6/2016 |
| CN | 205959984 U | 2/2017 |
| CN | 107547778 B | 1/2018 |
| CN | 109683434 A | 4/2019 |
| CN | 110089102 B | 8/2019 |
| CN | 210225545 U | 3/2020 |
| CN | 210629641 U | 5/2020 |
| EP | 3 468 165 A1 | 4/2019 |
| EP | 3 468 316 A1 | 4/2019 |
| EP | 3 562 136 A2 | 10/2019 |
| TW | I425825 B | 2/2014 |
| WO | 2019/015692 A1 | 1/2019 |

OTHER PUBLICATIONS

Extended European Search Report dated Jun. 5, 2023 as received in Application No. 22192525.8.
EP Office Action dated Jan. 30, 2025 as received in Application No. 22192525.8.

* cited by examiner

IMAGING LENS MODULE AND ELECTRONIC DEVICE WITH HARDNESS-CONTROLLED ISOLATING ARTICLE AND PLASTIC MOLDING ARTICLE

RELATED APPLICATIONS

This application claims priority to U.S. Provisional Application 63/333,334, filed on Apr. 21, 2022, which is incorporated by reference herein in its entirety.

BACKGROUND

Technical Field

The present disclosure relates to an imaging lens module and an electronic device, more particularly to an imaging lens module applicable to an electronic device.

Description of Related Art

With the development of technology, featuring high image quality becomes one of the indispensable features of an optical system nowadays. Furthermore, electronic devices equipped with optical systems are trending towards multi-functionality for various applications, and therefore the functionality requirements for the optical systems have been increasing.

However, conventional optical systems are difficult to meet the requirement of miniaturization of an electronic device under diversified development in recent years, especially designated thicknesses of structural parts are required in the configurations of the existing optical systems for maintaining sufficient mechanical strength, which causes difficulty in miniaturization. Therefore, how to improve the mechanical configuration inside an optical system for further miniaturization while ensuring structural strength thereof for mass productivity is an important topic in this field nowadays.

SUMMARY

According to one aspect of the present disclosure, an imaging lens module includes a sensing part, a lens assembly, a lens holding member, an isolating article and a plastic molding article. The sensing part includes a substrate, a sensing chip and a plurality of conducting wires. The substrate supports the sensing chip. The sensing chip includes an optical effective area and an electrical connection area. The conducting wires are electrically connected to the electrical connection area for transmitting an image signal. The lens assembly is disposed corresponding to the optical effective area. The lens holding member holds the lens assembly, and the lens holding member includes a wire correspondence structure disposed corresponding to the conducting wires. The isolating article is disposed between the wire correspondence structure and the conducting wires. The plastic molding article is molded on the sensing part. The plastic molding article is in physical contact with the lens holding member, such that the lens holding member is fixed with respect to the sensing part.

According to another aspect of the present disclosure, an imaging lens module includes a sensing part, a lens assembly, a lens holding member and a plastic molding article. The sensing part includes a substrate, a sensing chip and a plurality of conducting wires. The substrate supports the sensing chip. The sensing chip includes an optical effective area and an electrical connection area. The conducting wires are electrically connected to the electrical connection area for transmitting an image signal. The lens assembly is disposed corresponding to the optical effective area. The lens holding member holds the lens assembly, and the lens holding member includes a wire correspondence structure disposed corresponding to the conducting wires. The plastic molding article is molded on the sensing part and located farther away from the optical effective area than the conducting wires. The plastic molding article is in physical contact with the lens holding member, such that the lens holding member is fixed with respect to the sensing part.

According to another aspect of the present disclosure, an imaging lens module includes a sensing part, a lens assembly, a lens holding member, an isolating article and a plastic molding article. The sensing part includes a substrate, a sensing chip and a plurality of conducting wires. The substrate supports the sensing chip. The sensing chip includes an optical effective area and an electrical connection area. The conducting wires are electrically connected to the electrical connection area for transmitting an image signal. The lens assembly is disposed corresponding to the optical effective area. The lens holding member holds the lens assembly. The isolating article isolates the plurality of conducting wires. The plastic molding article is molded on the sensing part and located farther away from the optical effective area than the conducting wires. The plastic molding article is in physical contact with the lens holding member, such that the lens holding member is fixed with respect to the sensing part.

According to another aspect of the present disclosure, an electronic device includes one of the aforementioned imaging lens modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
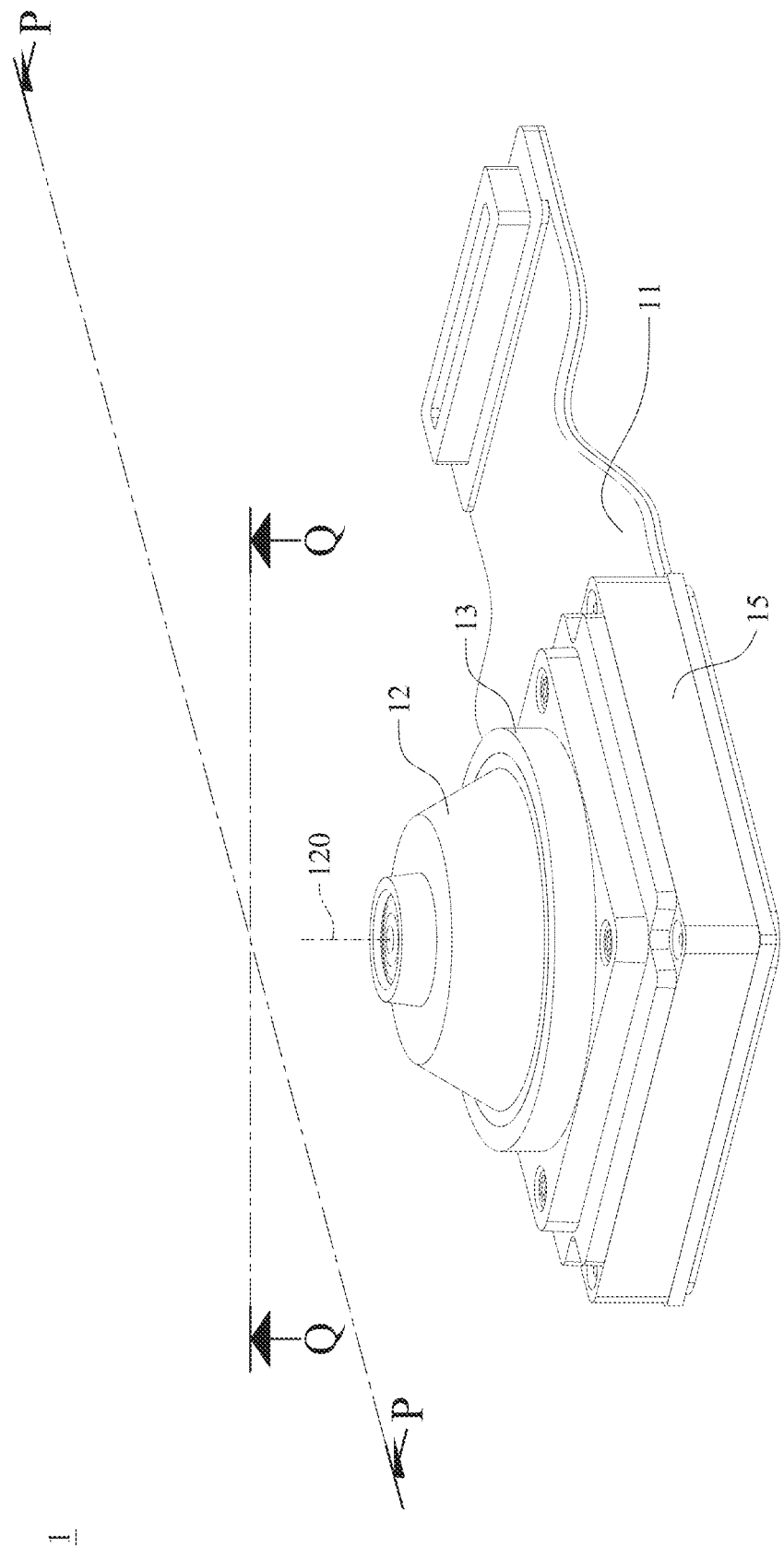
FIG. 1 is a perspective view of an imaging lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens module that can include a sensing part, a lens assembly, a lens holding member, an isolating article, a plastic molding article, a pre-adhesive article, an optical element and an anti-reflection membrane.

The sensing part includes a substrate, a sensing chip and a plurality of conducting wires. The substrate supports the sensing chip. Moreover, the substrate can include a heat dissipation layer, and the sensing chip can be disposed on the heat dissipation layer. Therefore, it is favorable for further increasing heat dissipation efficiency, thereby preventing thermal noise. The sensing chip includes an optical effective area and an electrical connection area. The conducting wires are electrically connected to the electrical connection area so as to transmit image signals.

The lens assembly is disposed corresponding to the optical effective area and can have an optical axis. Moreover, the lens assembly can include a trimmed lens element that can have a trimmed surface recessed towards the optical axis. Therefore, it is favorable for further miniaturizing the imaging lens module. Moreover, the trimmed surface can be formed while molding the trimmed lens element or achieved by a secondary processing, and the present disclosure is not limited to these methods.

The lens holding member holds the lens assembly. The lens holding member can include a wire correspondence structure and a positioning structure. The wire correspondence structure can be disposed corresponding to the conducting wires. With the arrangement of the wire correspondence structure, it is favorable for allowing the lens holding member to be located close to the sensing chip, thereby miniaturizing the imaging lens module. Moreover, the lens holding member can be disposed at a particular position of the sensing part, and the particular position can be arranged on one of the substrate and the sensing chip. Therefore, it is favorable for reducing offset due to assembly, thereby ensuring optical quality. During the assembly process, the positioning structure can be used for aligning the lens holding member with the optical effective area of the sensing chip through image recognition. Therefore, it is favorable for preventing offset of the imaging lens module or tilt of the optical axis. Moreover, the lens holding member and the sensing part can form an internal space therebetween, and the internal space can be in connection with outside via the wire correspondence structure during assembly. Therefore, it is favorable for further utilizing the wire correspondence structure as an air exhaust channel so as to reduce influence of air pressure on the assembly.

The isolating article isolates the conducting wires. Further, the isolating article can be disposed between the wire correspondence structure and the conducting wires. With the arrangement of the isolating article, it is favorable for spacing the conducting wires and the wire correspondence structure, thereby preventing failure due to impact between them. Moreover, the isolating article can cover the conducting wires, and the isolating article can include a light-absorption material. Therefore, it is favorable for preventing glare caused by light reflected off the conducting wires. Moreover, the isolating article can include a thermosetting resin, a photocurable resin, or a photothermal curing mixture resin, but the present disclosure is not limited thereto.

Moreover, the isolating article can enclose the wire correspondence structure. Therefore, it is favorable for preventing the plastic molding article from being overflowed into the optical effective area via the wire correspondence structure. Moreover, the isolating article can isolate the conducting wires from the plastic molding article.

The plastic molding article is molded on the sensing part. The plastic molding article is in physical contact with the lens holding member, such that the lens holding member is fixed with respect to the sensing part. With the collaboration of the plastic molding article and the lens holding member, the lens holding member is favorable for having sufficient support to the lens assembly and good association with the sensing part, thereby ensuring structural strength of the imaging lens module and achieving conditions of mass production. Moreover, the plastic molding article can be integrally formed with the lens holding member and the sensing part through an insert molding process. Therefore, it is favorable for reducing an aligning process during assembly. Alternatively, the plastic molding article can also cover the lens holding member and the sensing part through an insert molding process, such that all of them are integrally formed into one piece. Moreover, the plastic molding article can be located farther away from the optical effective area than the isolating article. Therefore, it is favorable for preventing the plastic molding article from being affecting optical quality. Moreover, the plastic molding article can also be located farther away from the optical effective area than the conducting wires.

The pre-adhesive article can be disposed at the particular position. Therefore, it is favorable for temporarily adhering the lens holding member and the sensing part through the pre-adhesive article before arranging the plastic molding article, thereby increasing assembly efficiency.

The optical element can be disposed on the lens holding member and corresponding to the optical effective area. The optical element can be a filter or a lens element; alternatively, the optical element can also be a distortion correction lens element, a lens array, a wafer-level lens element or a metalens, but the present is not limited thereto.

The anti-reflection membrane can be disposed at a side of the lens holding member facing towards the sensing part. Moreover, the anti-reflection membrane can be coated on the side of the lens holding member facing towards the sensing part. Alternatively, the anti-reflection membrane can be disposed in the optical effective area. Alternatively, the anti-reflection membrane can be disposed at a side of the optical element facing towards the optical effective area.

The anti-reflection membrane can include a nano-ridge layer. Therefore, it is favorable for making the anti-reflection membrane to have an anti-reflective function. The nano-ridge layer can mainly include a ceramic material. Moreover, the ceramic material can include aluminium oxide. Moreover, the ceramic material can further include silicon oxide. The nano-ridge layer can become sparse towards the air, and the average height of the nano-ridge layer can range from 60 nanometers to 400 nanometers. Moreover, the average height of the nano-ridge layer can also range from 100 nanometers to 285 nanometers. Please be noted that multiple ridges in the nano-ridge layer can be observed in a cross-sectional image thereof obtained through a scanning electron microscope, then three to six of the observed ridges can be selected to be measured in height, and the average height of the nano-ridge layer can be obtained by an average calculation from their measured heights. In specific, please refer to FIG. 71, which is a cross-sectional view of an anti-reflection membrane according to one embodiment of the present disclosure. The nano-ridge layer NRL can be measured in height in the cross-sectional view thereof, and height values can be obtained as following: GH1=189.56 [nm]; GH2=303.28 [nm]; GH3=271.88 [nm]; and GH4=112.67 [nm], thereby further obtaining the average height of the nano-ridge layer NRL is 219.3475 [nm].

Figure 71:
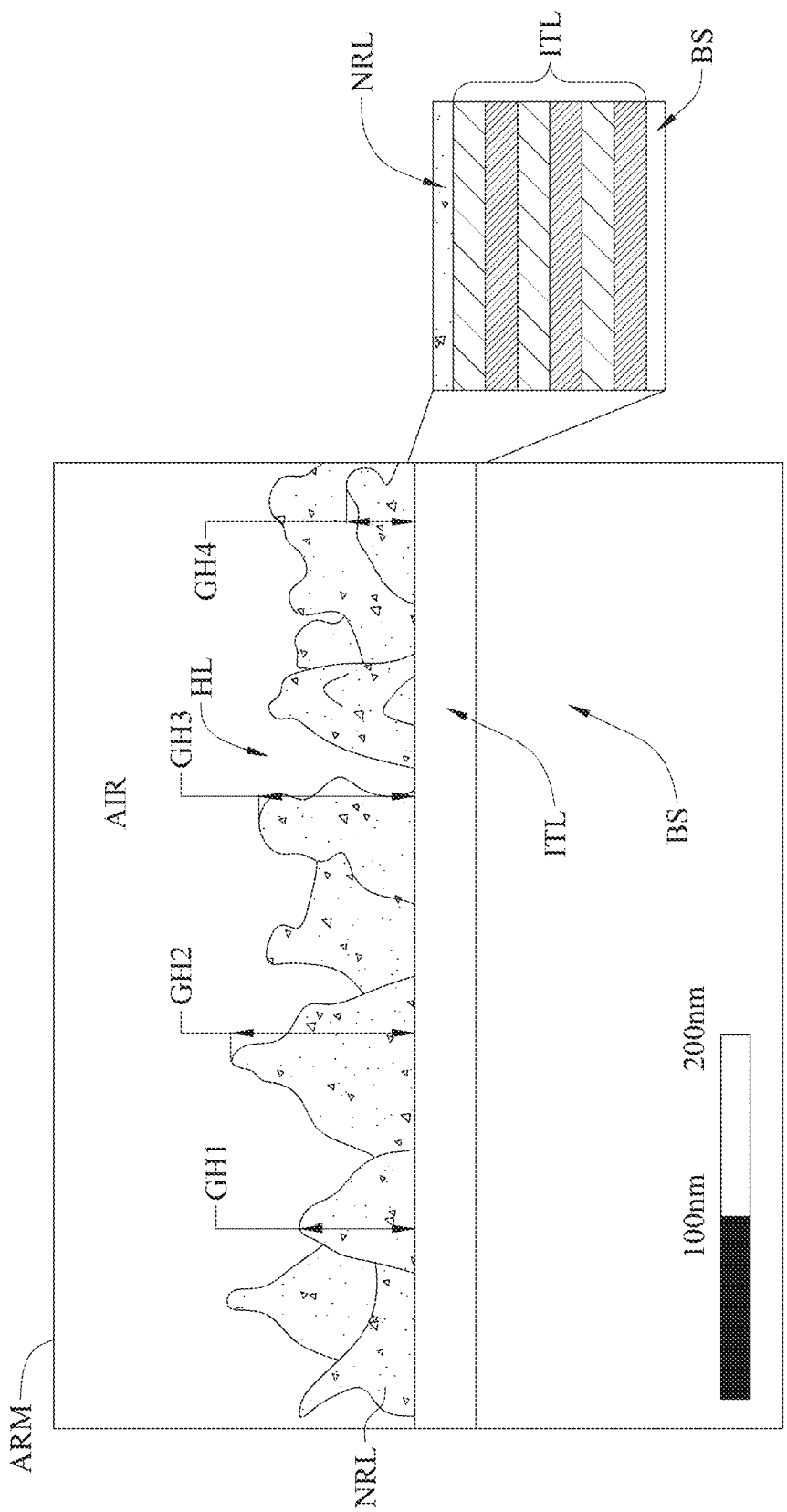
FIG. 71 is a cross-sectional view of an anti-reflection membrane according to one embodiment of the present disclosure.
Figure 72:
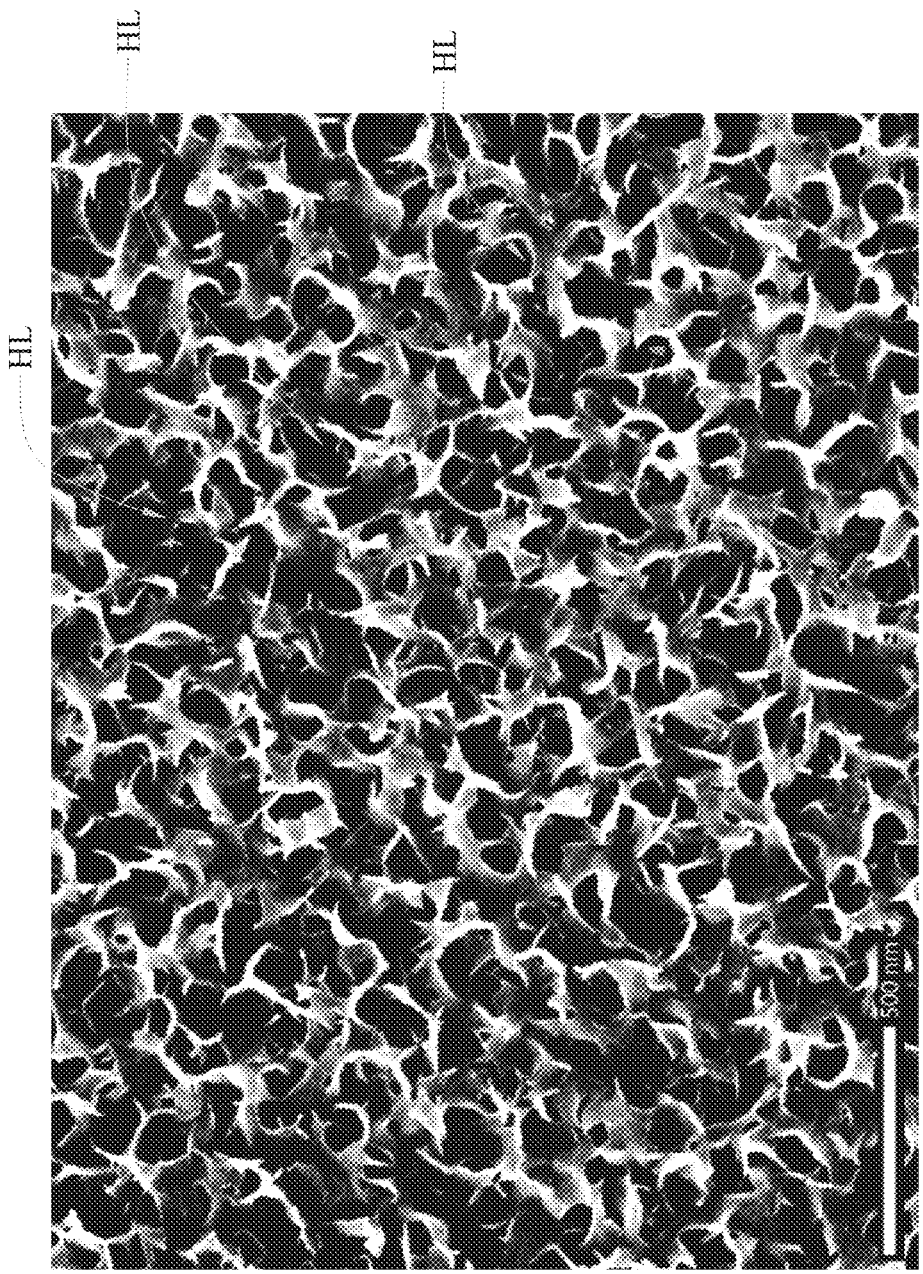
FIG. 72 is an enlarged top view of a nano-ridge layer according to one embodiment of the present disclosure.
Figure 73:
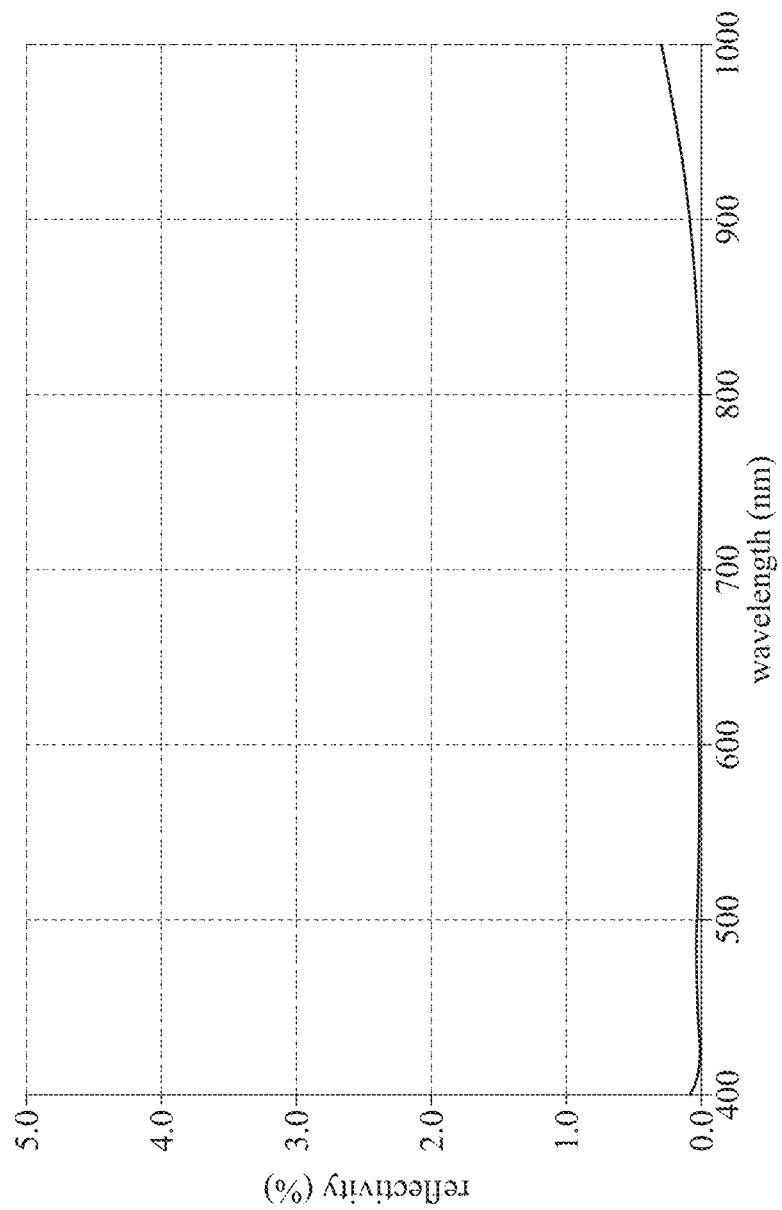
FIG. 73 is a chart showing reflectivity of the anti-reflection membrane including the nano-ridge layer for light with various wavelengths according to one embodiment of the present disclosure.

As shown in FIG. 71, the anti-reflection membrane ARM can further include a base BS and an interlayer ITL. The interlayer ITL is in physical contact with the base BS. The nano-ridge layer NRL is disposed on the interlayer ITL. The nano-ridge layer NRL becomes sparse towards the air AIR (i.e., a larger pitch between adjacent nano-ridges at the upward position in FIG. 71), and the nano-ridge layer NRL has a plurality of holes HL. The holes HL can be observed in a top view of the nano-ridge layer NRL, as shown in FIG. 72. The holes HL can further enhance the anti-reflective function of the anti-reflection membrane ARM. Please refer to FIG. 73, which is a chart showing reflectivity of the anti-reflection membrane including the nano-ridge layer for light with various wavelengths according to one embodiment of the present disclosure, wherein the horizontal axis refers to wavelengths (unit: nanometers (nm)), and the vertical axis refers to reflectivity (unit: percentage (%)). As shown in FIG. 73, with the assistance of the nano-ridge layer NRL, the average reflectivity of the anti-reflection membrane ARM for light with wavelengths from 420 nanometers to 680 nanometers is 0.022%, the average reflectivity of the anti-reflection membrane ARM for light with wavelengths from 400 nanometers to 900 nanometers is 0.023%, and the minimum reflectivity of the anti-reflection membrane ARM for light with wavelengths from 420 nanometers to 680 nanometers is 0.012%. Moreover, as shown in FIG. 71, the interlayer ITL can be a multi-layer structure. Therefore, it is favorable for increasing adhesion of the nano-ridge layer NRL. Please be noted that the thickness of the interlayer ITL and the layer quantity of the multi-layer structure are only exemplary in FIG. 71, and they can be adjusted depend on actual requirements and are not intended to restrict the present disclosure. In addition, the base BS can be the lens holding member, single lens of the lens assembly, the optical element or the sensing chip of the present disclosure, and the present disclosure is not limited thereto.

The isolating article can have hardness equal to or smaller than that of the plastic molding article. Therefore, it is favorable for preventing a shear force applied to the joint of the conducting wires during an impact on the imaging lens module.

The plastic molding article can include a thermal conductive polymer that can have thermal conductivity equal to or larger than that of the lens holding member. Therefore, it is favorable for increasing heat dissipation efficiency so as to ensure stability of optical quality.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
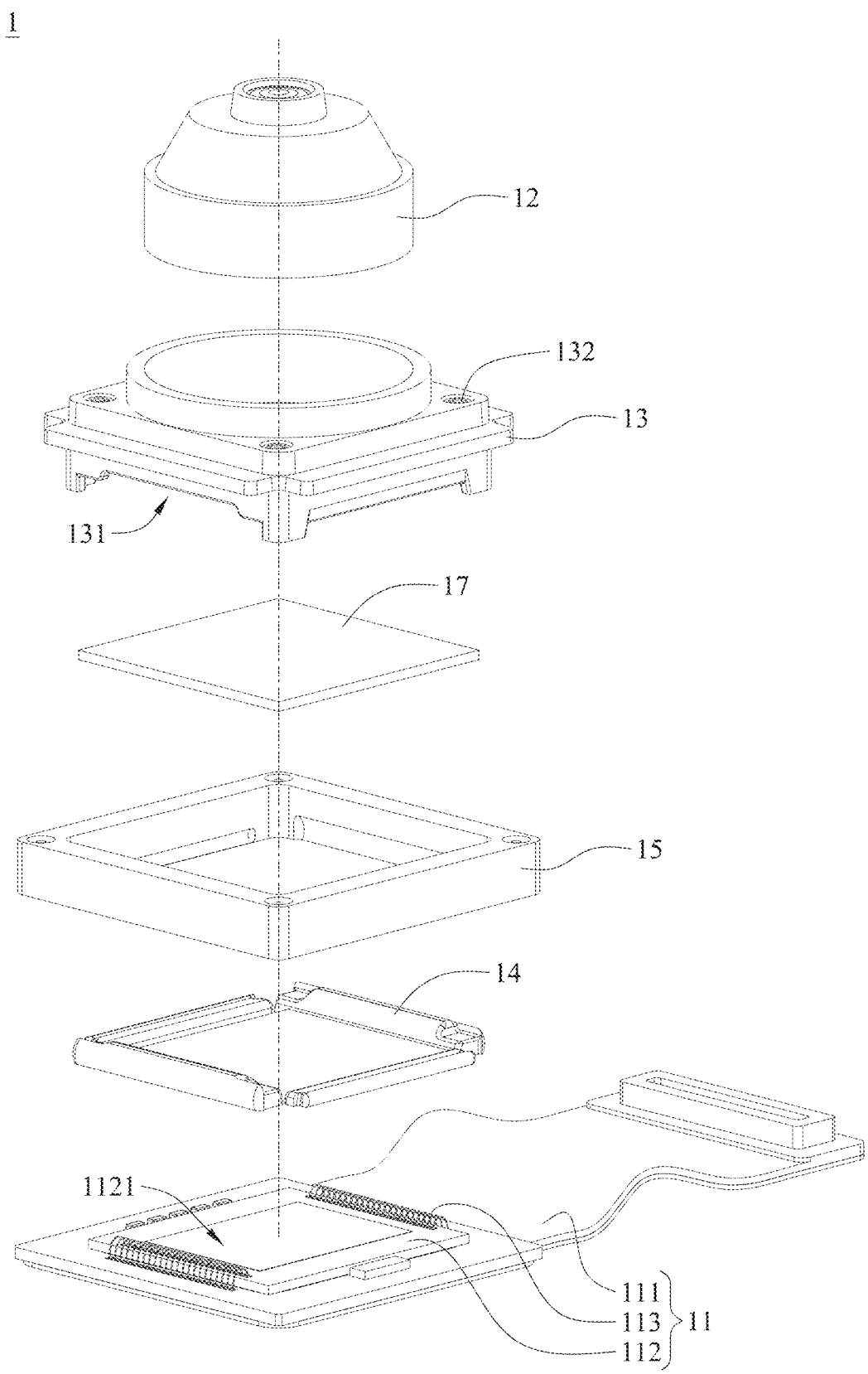
FIG. 2 is an exploded view of the imaging lens module in FIG. 1.
Figure 3:
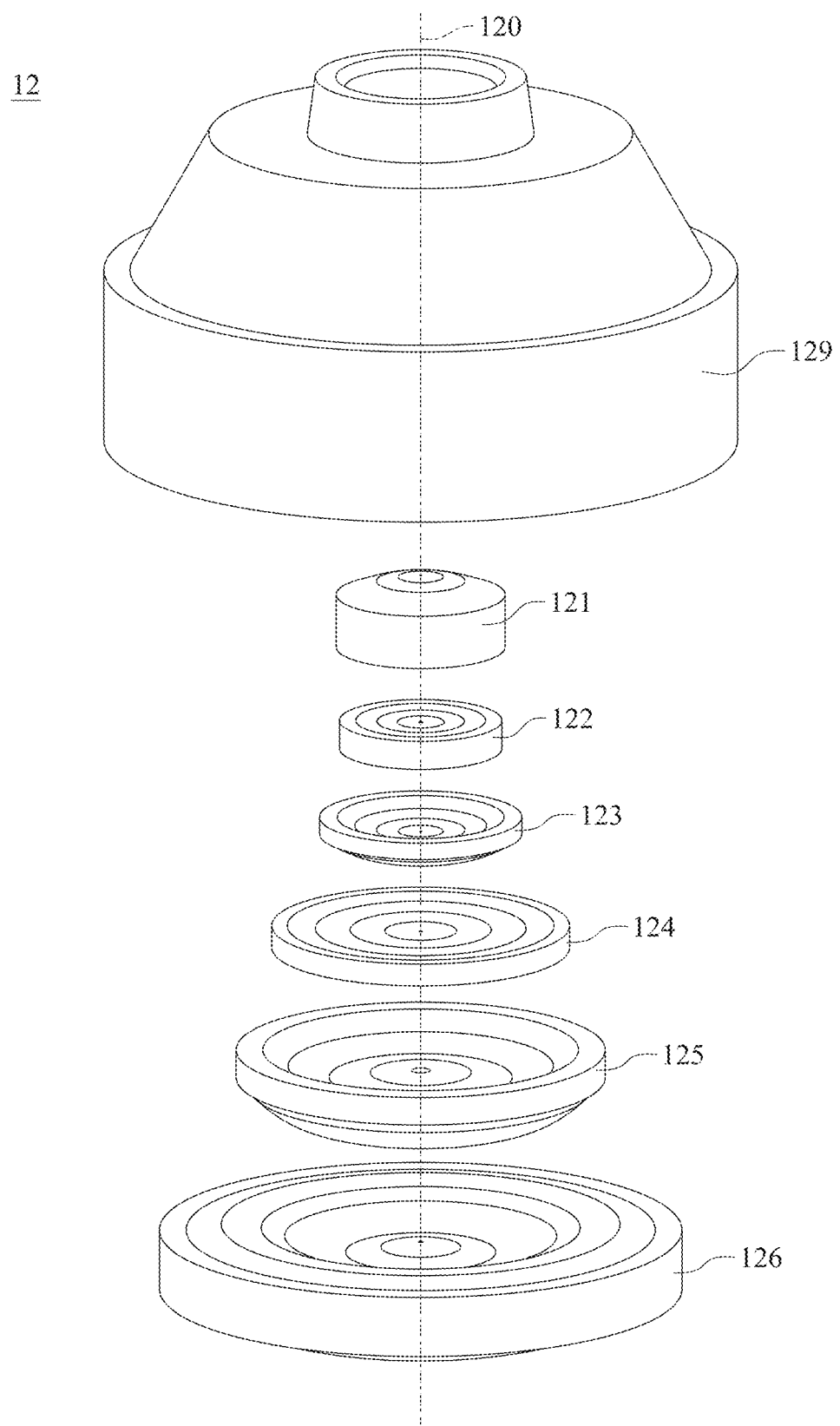
FIG. 3 is an exploded view of a lens assembly of the imaging lens module in FIG. 2.
Figure 4:
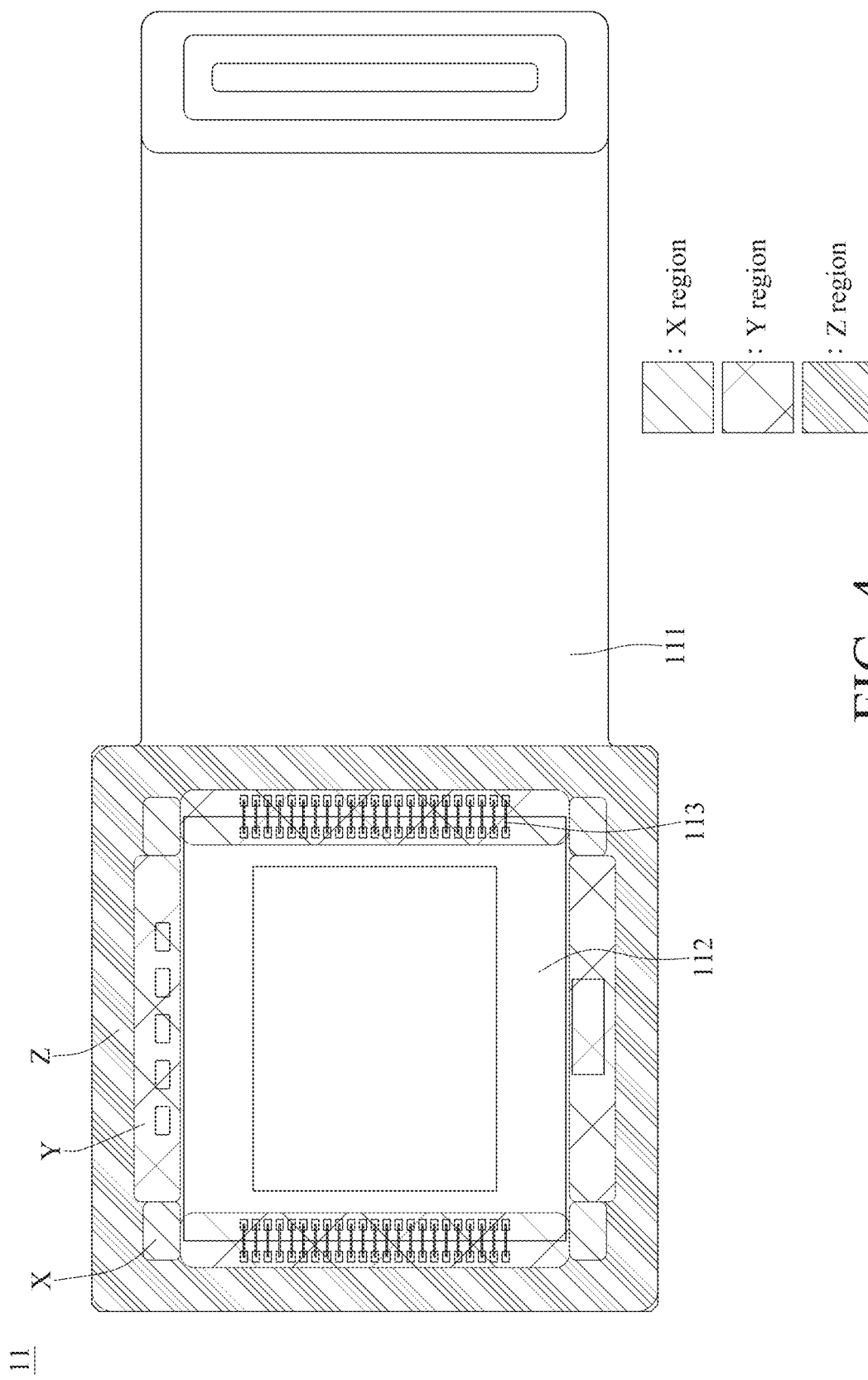
FIG. 4 is a top view of a sensing part of the imaging lens module in FIG. 2.
Figure 5:
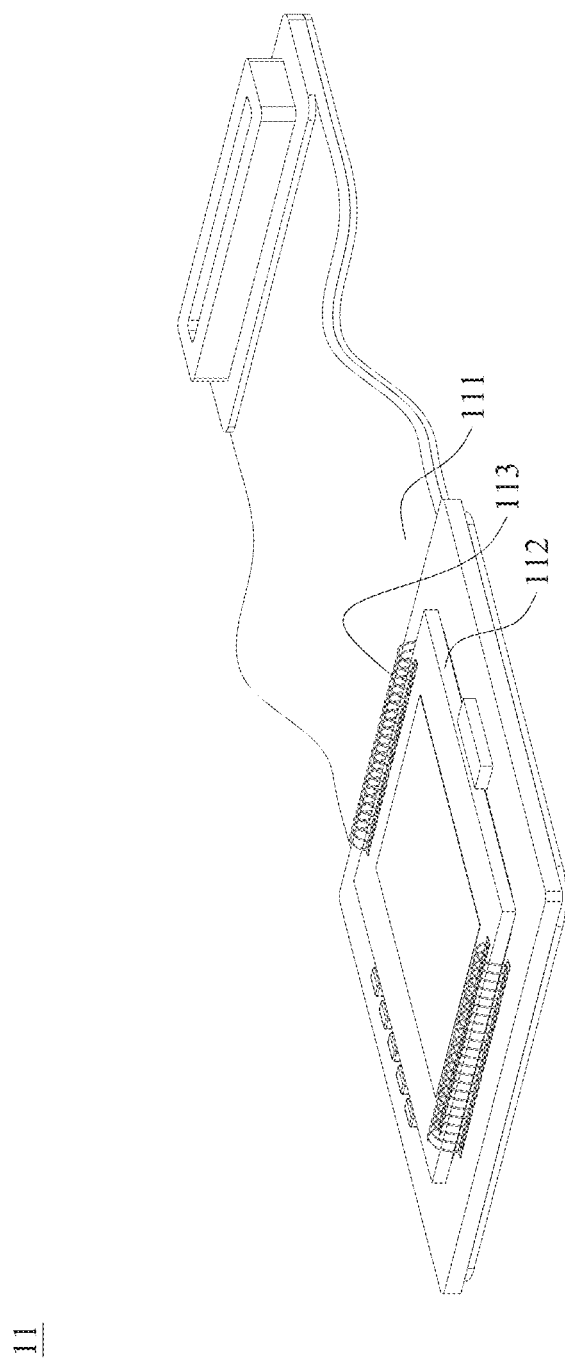
FIG. 5 to FIG. 9 are perspective views showing assembly processes of the imaging lens module in FIG. 1.
Figure 6:
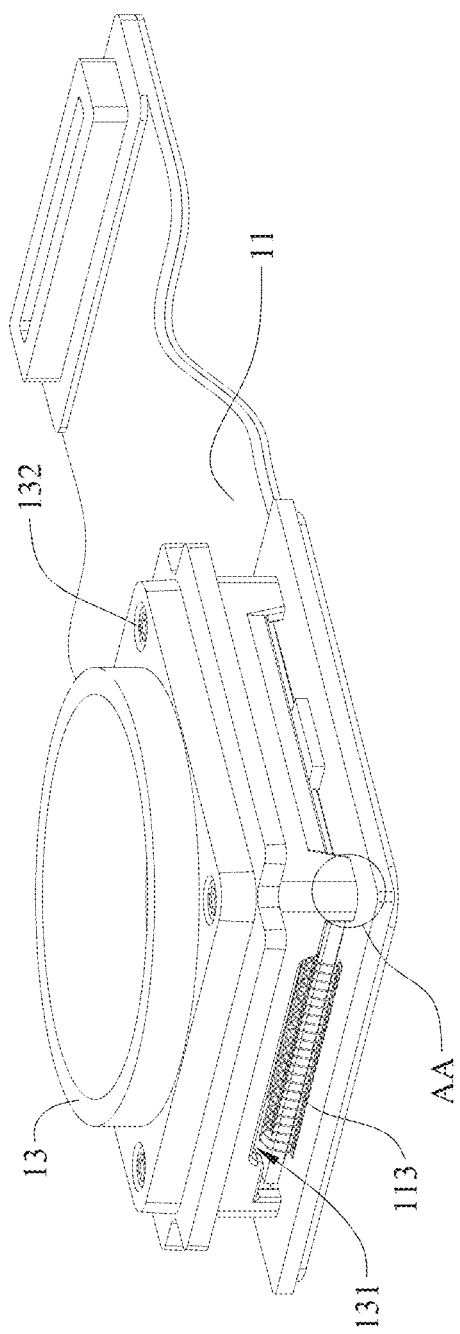
Figure 10:
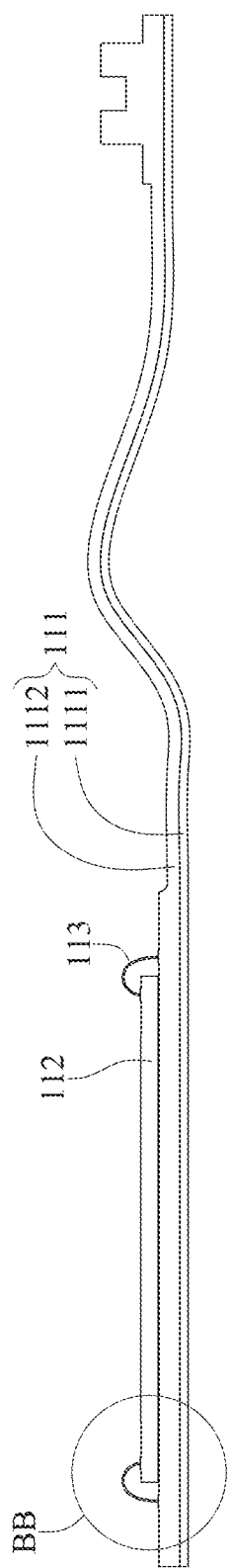
FIG. 10 to FIG. 14 are cross-sectional views showing the assembly processes of the imaging lens module along line P-P in FIG. 1.
Figure 14:
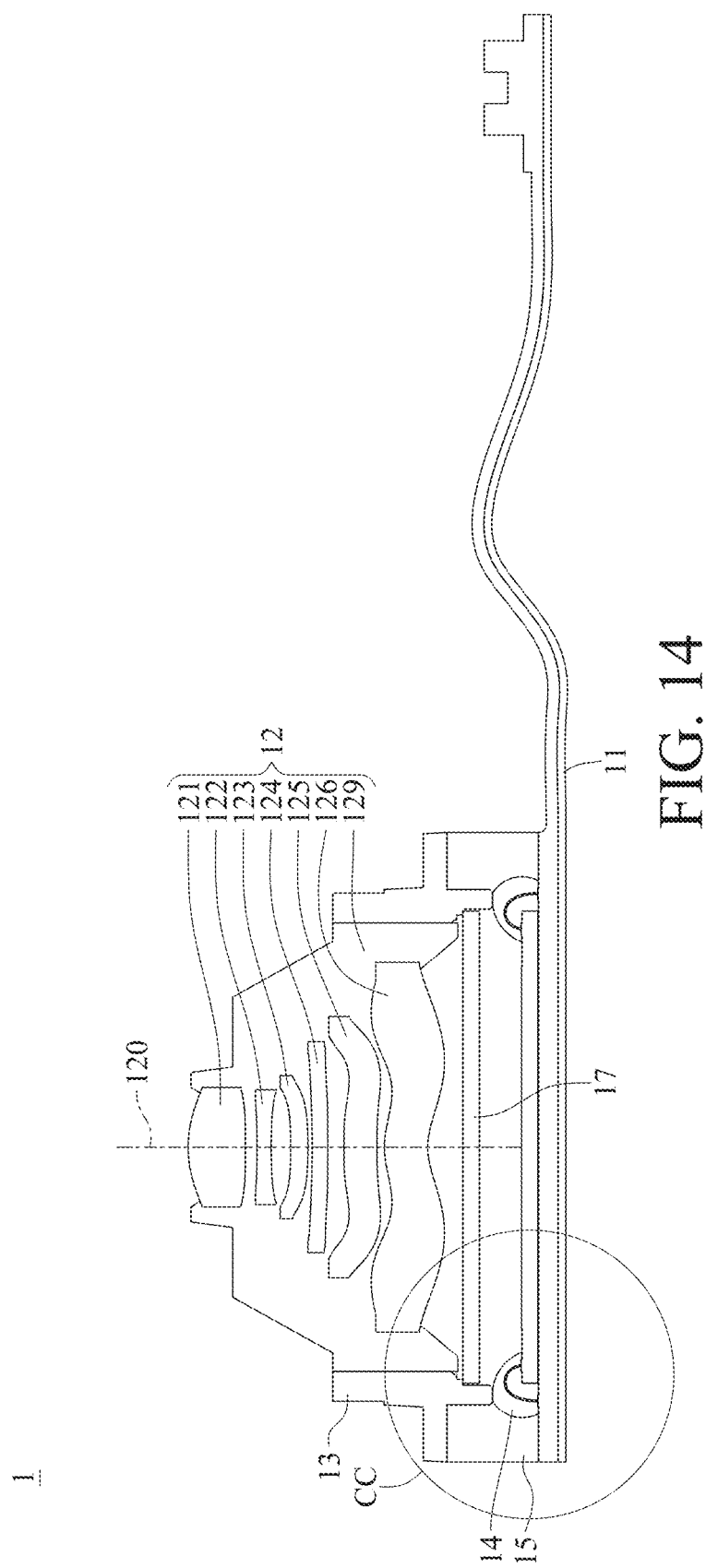
Figure 15:
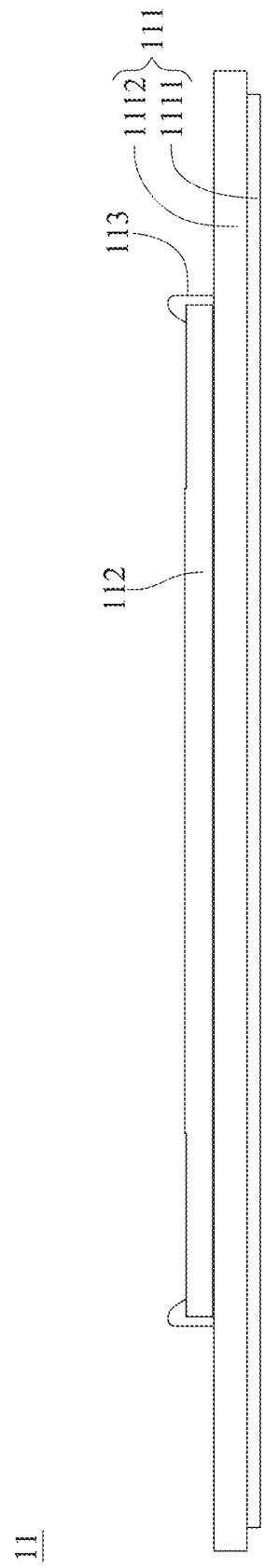
FIG. 15 to FIG. 19 are cross-sectional views showing the assembly processes of the imaging lens module along line Q-Q in FIG. 1.
Figure 20:
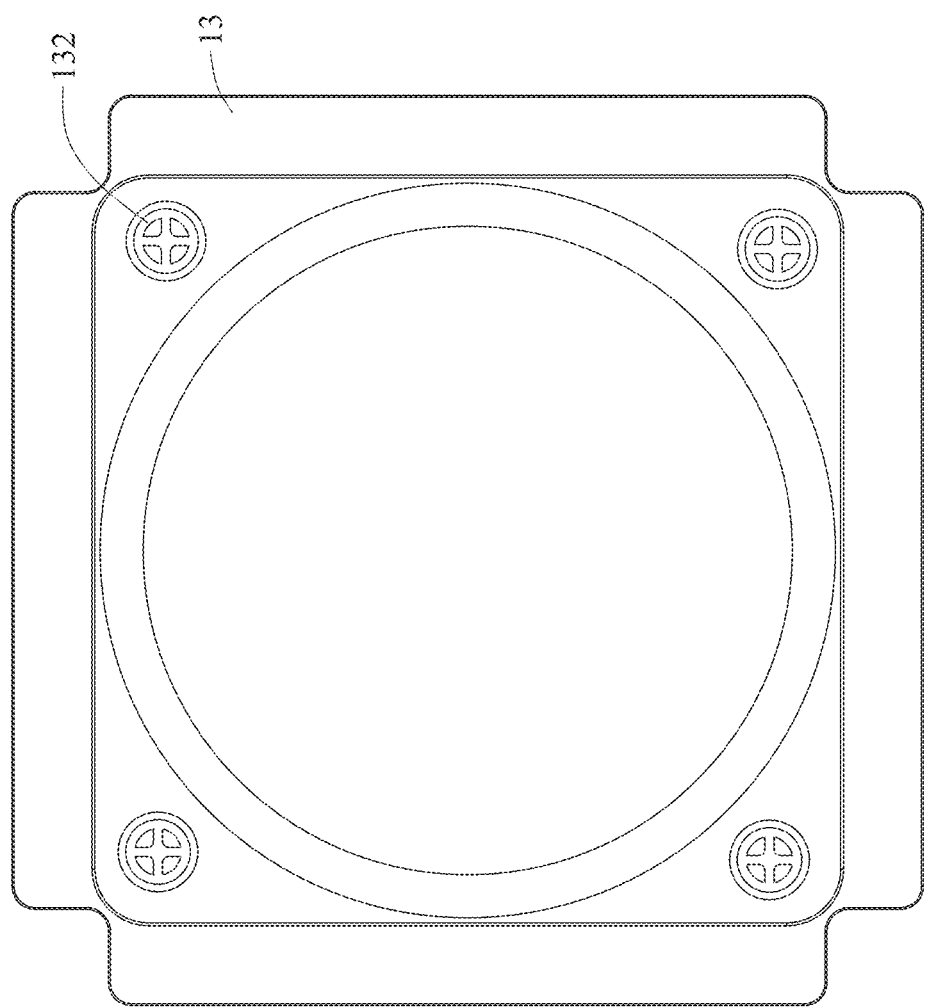
FIG. 20 is a top view of a lens holding member in FIG. 6.
Figure 21:
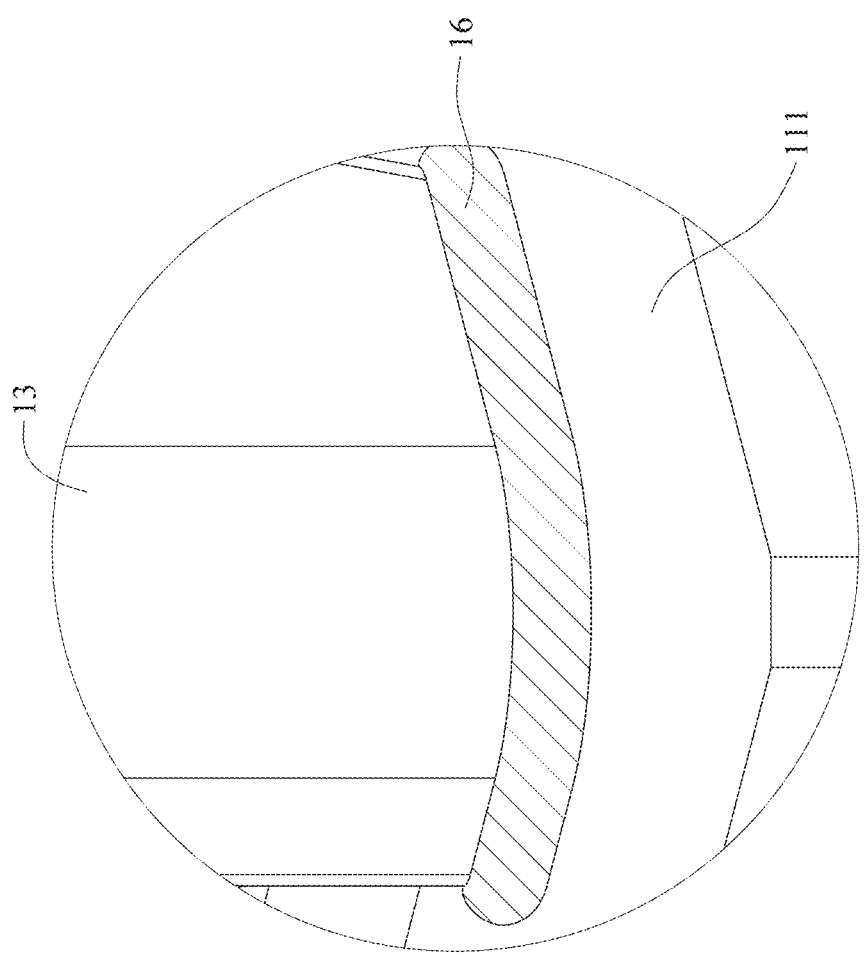
FIG. 21 is an enlarged view of AA region in FIG. 6.
Figure 22:
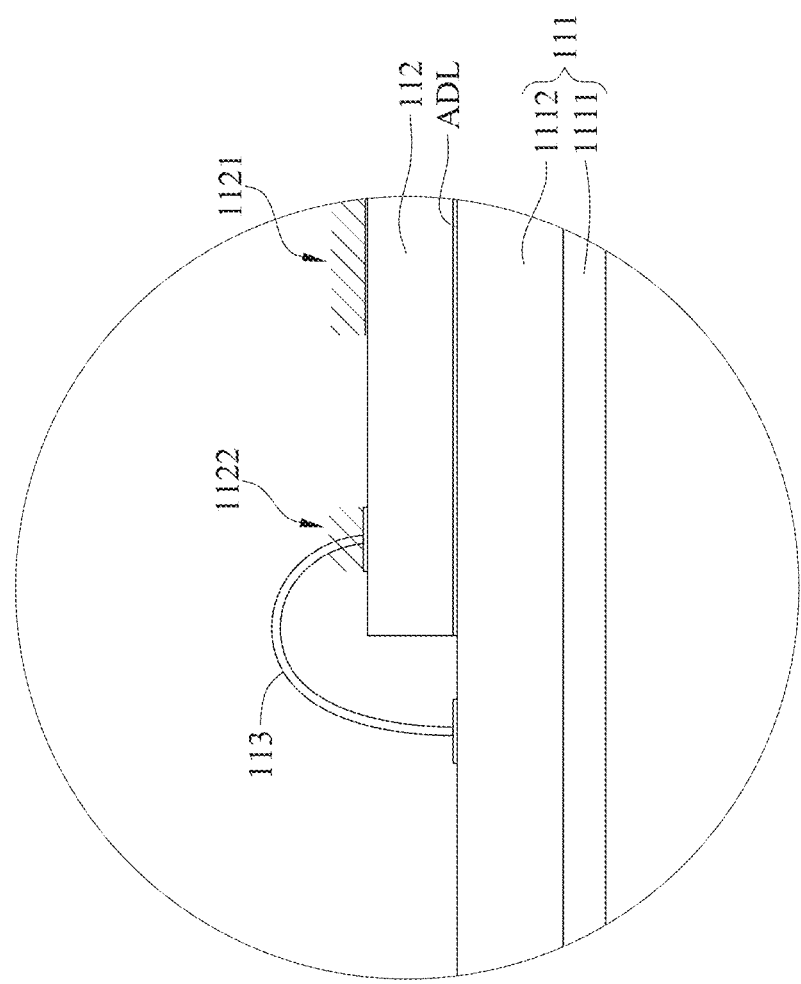
FIG. 22 is an enlarged view of BB region in FIG. 10.
Figure 23:
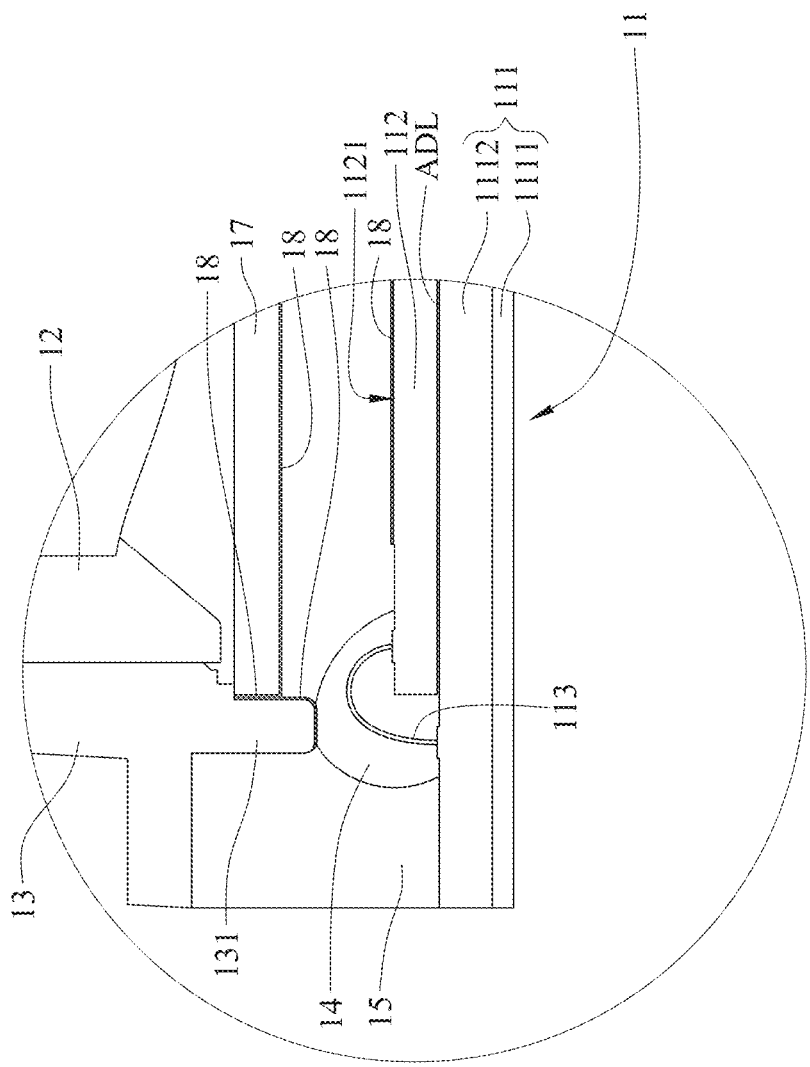
FIG. 23 is an enlarged view of CC region in FIG. 14.

Please refer to FIG. 1 to FIG. 23, where FIG. 1 is a perspective view of an imaging lens module according to the 1st embodiment of the present disclosure, FIG. 2 is an exploded view of the imaging lens module in FIG. 1, FIG. 3 is an exploded view of a lens assembly of the imaging lens module in FIG. 2, FIG. 4 is a top view of a sensing part of the imaging lens module in FIG. 2, FIG. 5 to FIG. 9 are perspective views showing assembly processes of the imaging lens module in FIG. 1, FIG. 10 to FIG. 14 are cross-sectional views showing the assembly processes of the imaging lens module along line P-P in FIG. 1, FIG. 15 to FIG. 19 are cross-sectional views showing the assembly processes of the imaging lens module along line Q-Q in FIG. 1, FIG. 20 is a top view of a lens holding member in FIG. 6, FIG. 21 is an enlarged view of AA region in FIG. 6, FIG. 22 is an enlarged view of BB region in FIG. 10, and FIG. 23 is an enlarged view of CC region in FIG. 14.

In this embodiment, an imaging lens module 1 includes a sensing part 11, a lens assembly 12, a lens holding member 13, four isolating articles 14, a plastic molding article 15, a pre-adhesive article 16, an optical element 17 and a plurality of anti-reflection membranes 18.

Please refer to FIG. 5 to FIG. 9, FIG. 10 to FIG. 14 and FIG. 15 to FIG. 19, which are respectively perspective views, cross-sectional views along line P-P, and cross-sectional views along line Q-Q showing five steps of the assembly processes of the imaging lens module 1. Step I is to provide the sensing part 11. Step II is to dispose the lens holding member 13. Step III is to dispose the isolating articles 14. Step IV is to mold the plastic molding article 15. Step V is to assemble the lens assembly 12. Step I to Step V exemplarily show the functionality of each component and the cooperation between the components, Step I to Step V do not completely correspond to actual manufacturing processes, and the claims of the present disclosure are also not limited to Step I to Step V. In the following, the components will be illustrated in detail.

The sensing part 11 includes a substrate 111, a sensing chip 112 and a plurality of conducting wires 113. The substrate 111 supports the sensing chip 112. Specifically, please refer to FIG. 22, the substrate 111 includes a heat dissipation layer 1111 and a circuit layer 1112. The circuit layer 1112 is disposed on the heat dissipation layer 1111. The sensing chip 112 is disposed on the circuit layer 1112 via an adhesive layer ADL. The sensing chip 112 includes an optical effective area 1121 and an electrical connection area 1122. The conducting wires 113 are electrically connected to the electrical connection area 1122 and the circuit layer 1112 so as to transmit image signals. As shown in FIG. 4, the sensing part 11 has an X region, a Y region and a Z region for the lens holding member 13, the isolating articles 14 and the plastic molding article 15 to be disposed thereon, respectively.

The lens assembly 12 is disposed corresponding to the optical effective area 1121 and has an optical axis 120. The lens assembly 12 includes a lens barrel 129 and six lens elements accommodated in the lens barrel 129. The six lens elements are, in sequence along the optical axis 120, a first lens element 121, a second lens element 122, a third lens element 123, a fourth lens element 124, a fifth lens element 125 and a sixth lens element 126. The six lens elements are only exemplary in the drawings, the quantity or the contours thereof can be adjusted according to actual requirements, and the present disclosure is not limited thereto.

Figure 11:
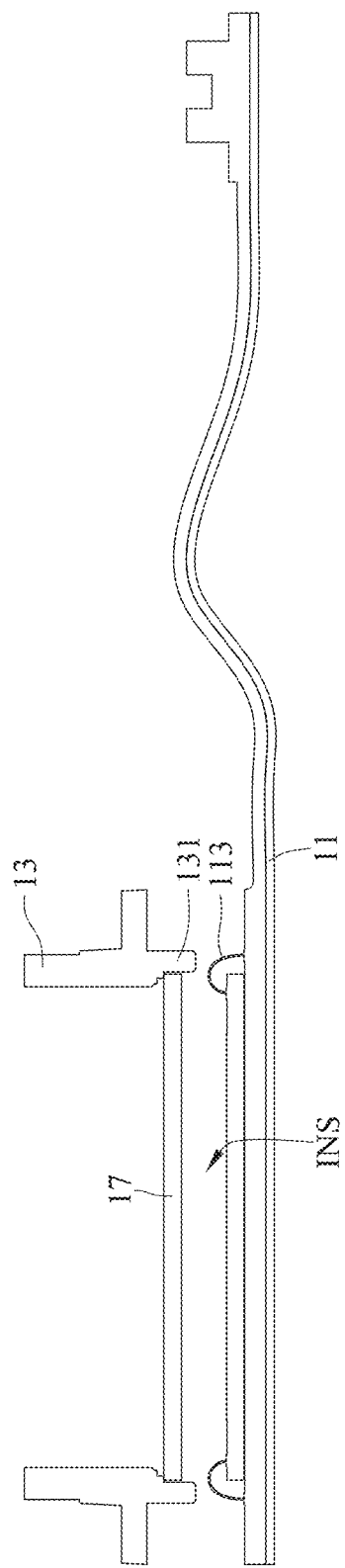
Figure 12:
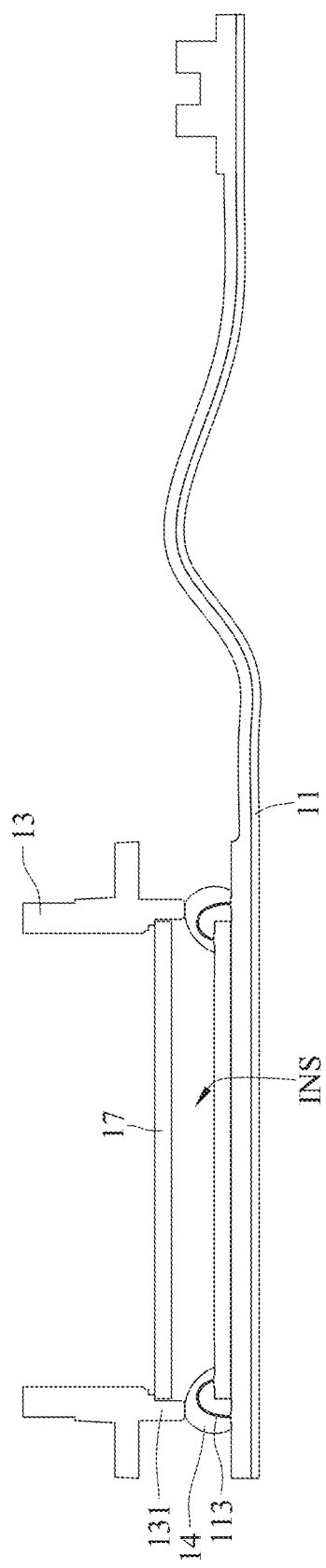
Figure 13:
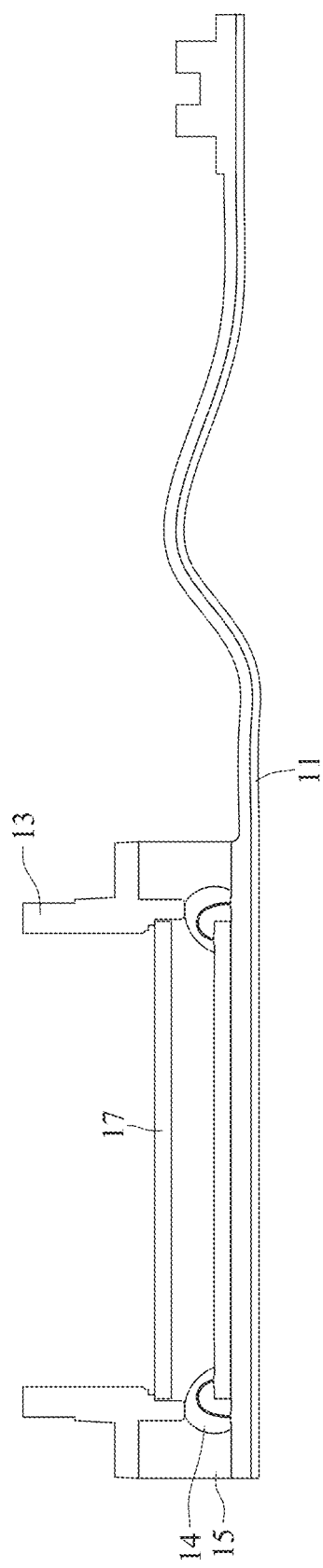
Figure 16:
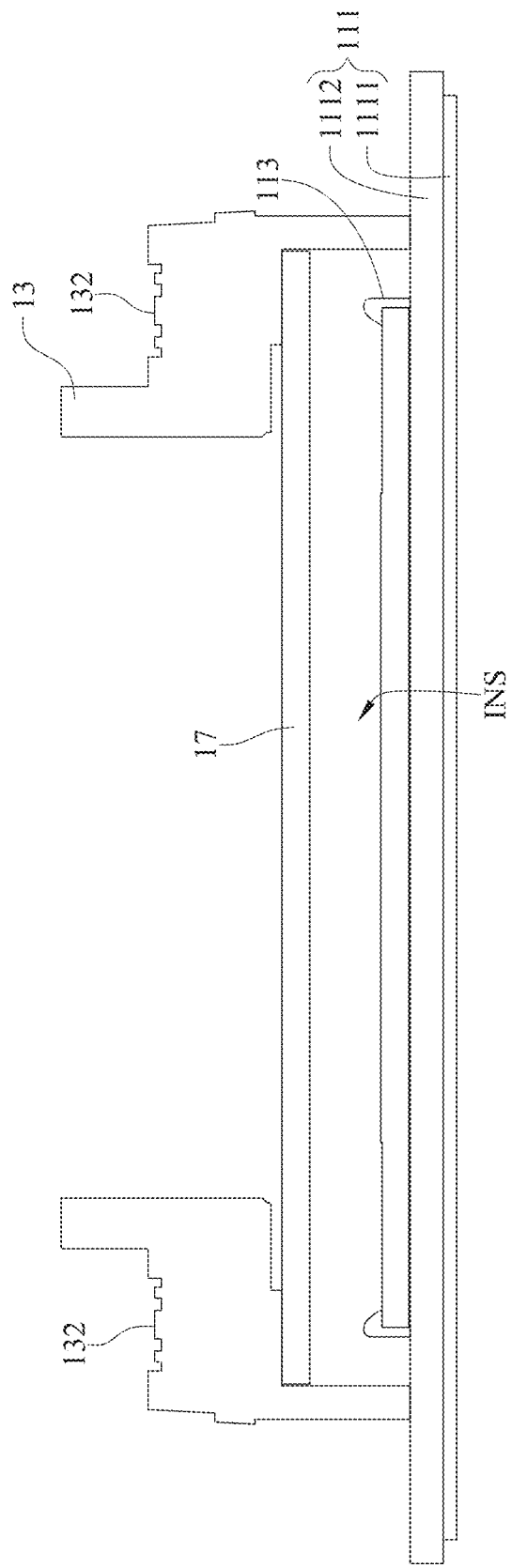
Figure 17:
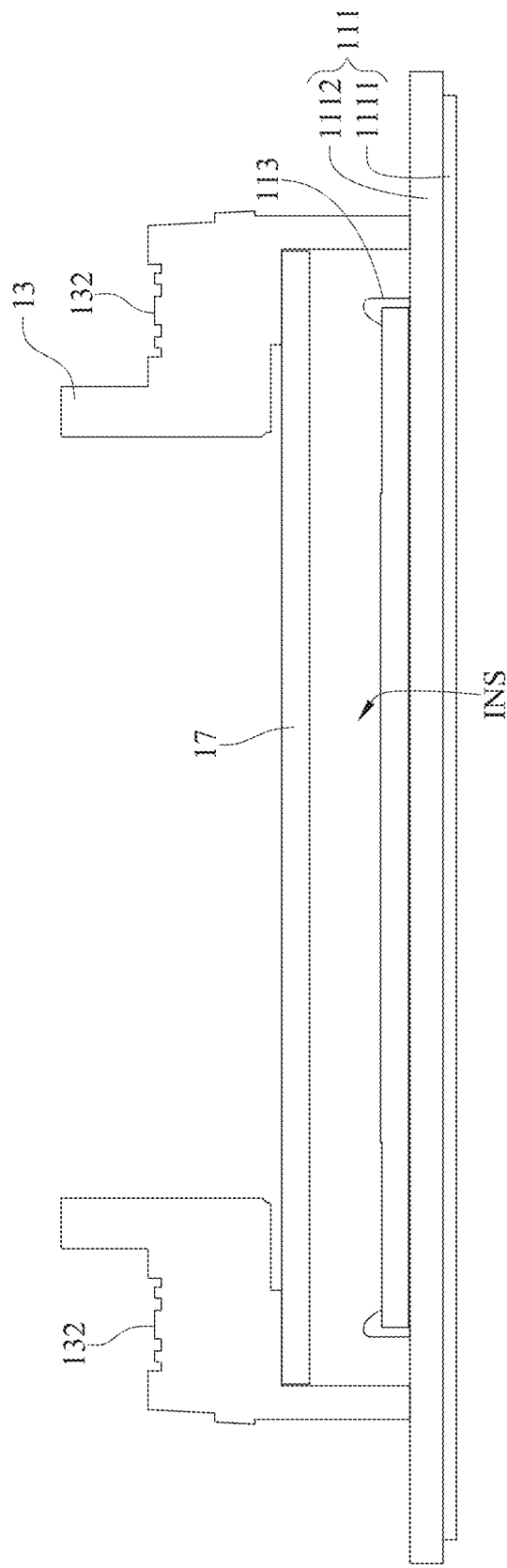

The lens holding member 13 holds the lens assembly 12. The lens holding member 13 includes two wire correspondence structures 131 and four positioning structures 132. Please refer to FIG. 23, the wire correspondence structures 131 are disposed corresponding to the conducting wires 113. Please refer to FIG. 4 and FIG. 21 for the assembly position, the lens holding member 13 is disposed at a particular position (i.e., the X region) of the sensing part 11. The particular position (X region) is arranged on the substrate 111 of the sensing part 11 for the pre-adhesive article 16 to be disposed thereon. Please refer to FIG. 20, during the assembly process, the positioning structures 132 can be used for aligning the lens holding member 13 with the optical effective area 1121 of the sensing chip 112 through image recognition. The assembled lens holding member 13 is shown in FIG. 16, which is disposed on the substrate 111. As shown in FIG. 11, the lens holding member 13 and the sensing part 11 form an internal space INS therebetween, and the internal space INS is in connection with outside via the wire correspondence structures 131 for utilizing the wire correspondence structures 131 as air exhaust channels connected to the internal space INS during assembly.

Figure 7:
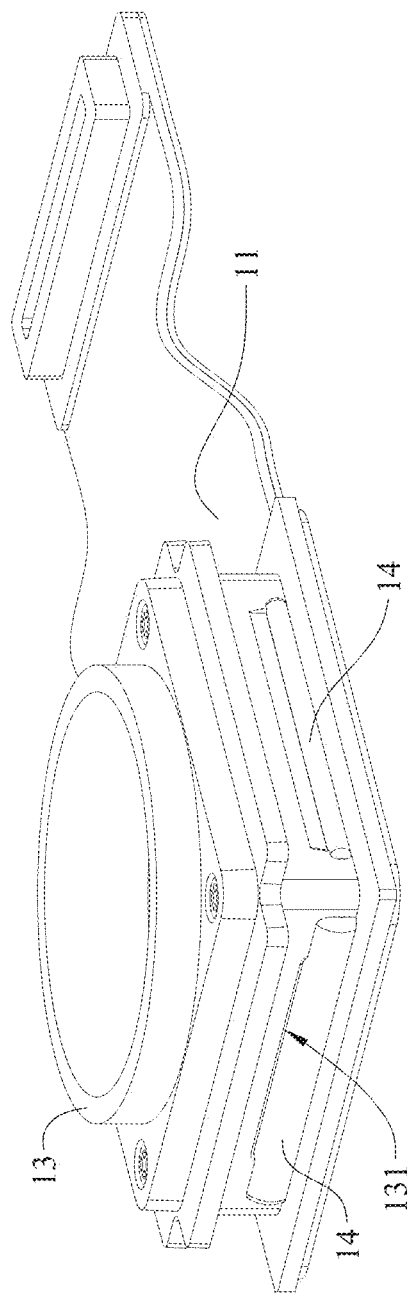
Figure 8:
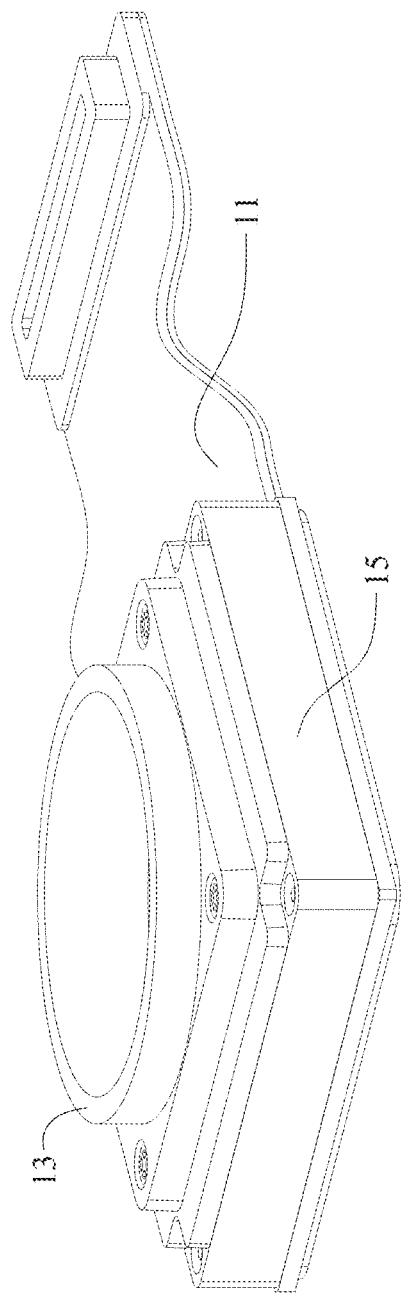
Figure 9:
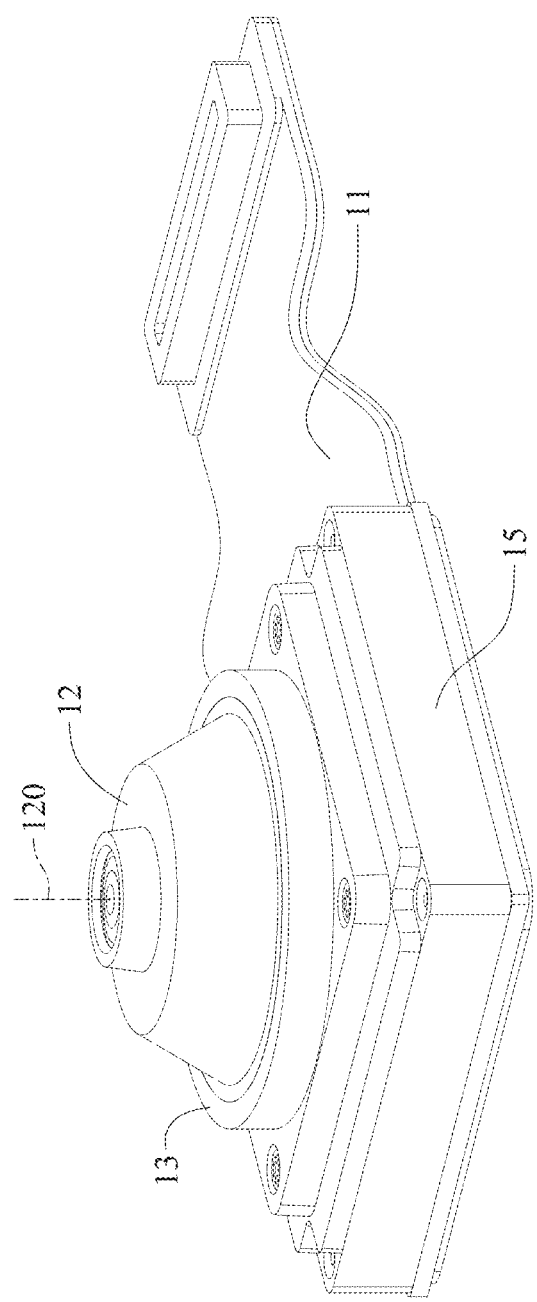

The isolating articles 14 isolate the conducting wires 113. Further, please refer to FIG. 23, the isolating articles 14 are disposed between the wire correspondence structures 131 and the conducting wires 113. As shown in FIG. 23, the isolating articles 14 cover the conducting wires 113. As shown in FIG. 7, the isolating articles 14 enclose the wire correspondence structures 131.

Figure 18:
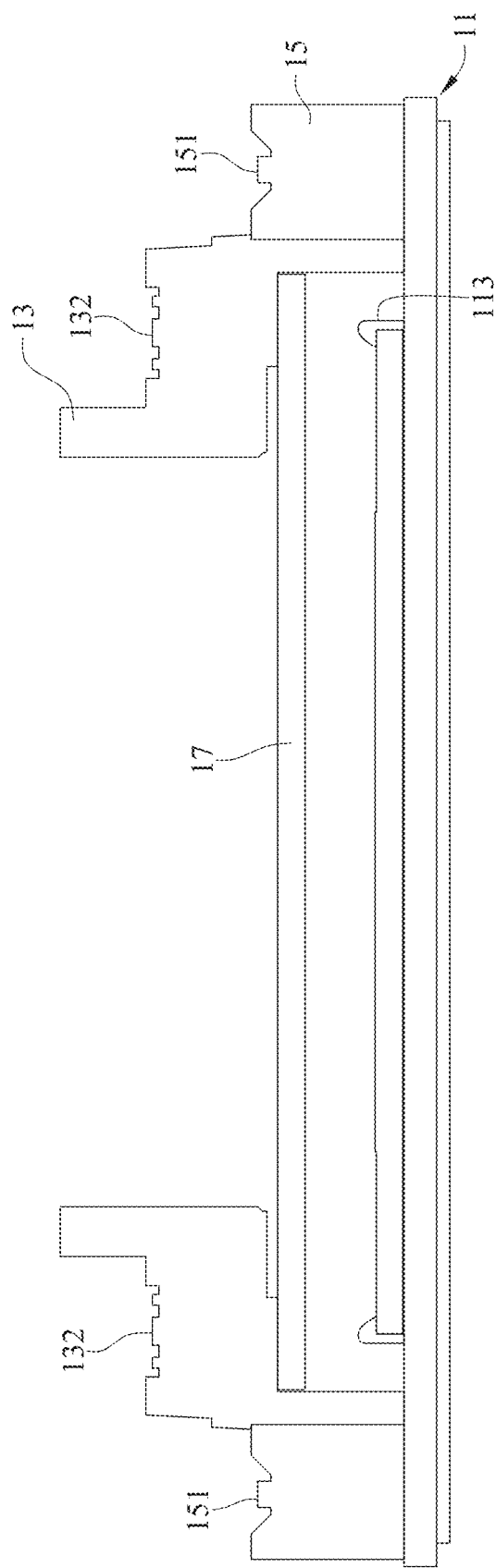
Figure 19:
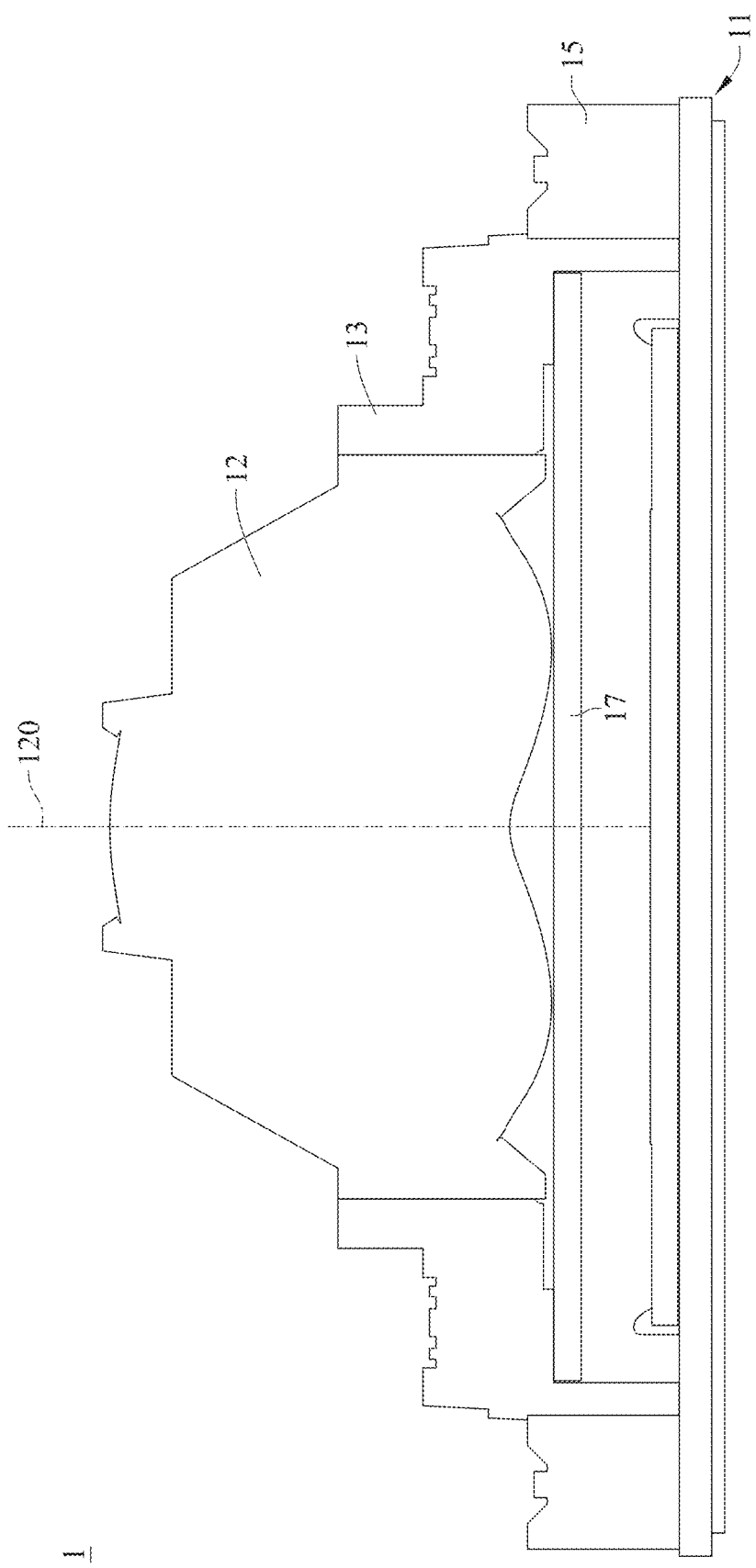

The plastic molding article 15 is molded on the sensing part 11 and in physical contact with the lens holding member 13. Further, please refer to FIG. 23, the plastic molding article 15 can be integrally formed with the lens holding member 13 and the sensing part 11 through an insert molding process. And, as shown in FIG. 18, the molded plastic molding article 15 has a plurality of gate traces 151. Therefore, the lens holding member 13 can be fixed with respect to the sensing part 11. As shown in FIG. 23, the plastic molding article 15 is located farther away from the optical effective area 1121 than the isolating articles 14 and the conducting wires 113.

The optical element 17 is an IR-cut filter. The optical element 17 is disposed on the lens holding member 13 and corresponding to the optical effective area 1121. And, the optical element 17 is located at an image side of the fifth lens element 125.

The anti-reflection membranes 18 are disposed at a side of the lens holding member 13 facing towards the sensing part 11, on the optical effective area 1121 and at a side of the optical element 17 facing towards the optical effective area 1121, as shown in FIG. 23. The anti-reflection membranes 18 each include a nano-ridge layer (not shown in the drawings of this embodiment). The pitch of the nano-ridges distribution in the nano-ridge layer becomes large towards the air, which represents that the nano-ridge layer becomes sparse towards the air, and the average height of the nano-ridge layer ranges from 60 nanometers to 400 nanometers. The detail of the nano-ridge layer can refer to the description about FIG. 71 to FIG. 73, and it will not be repeated here again.

And, the isolating articles 14 have hardness equal to or smaller than that of the plastic molding article 15.

2nd Embodiment

Figure 24:
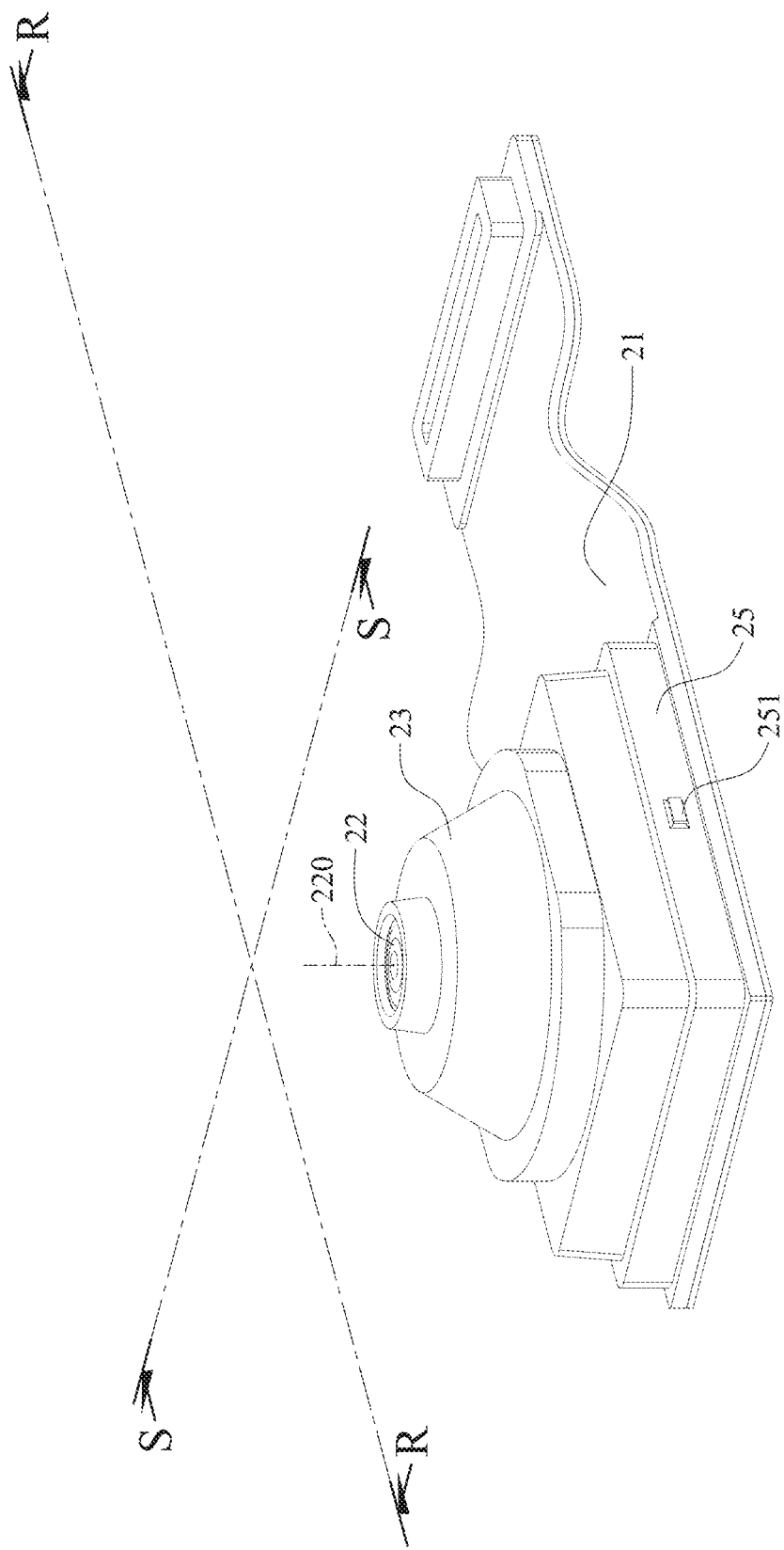
FIG. 24 is a perspective view of an imaging lens module according to the 2nd embodiment of the present disclosure.
Figure 25:
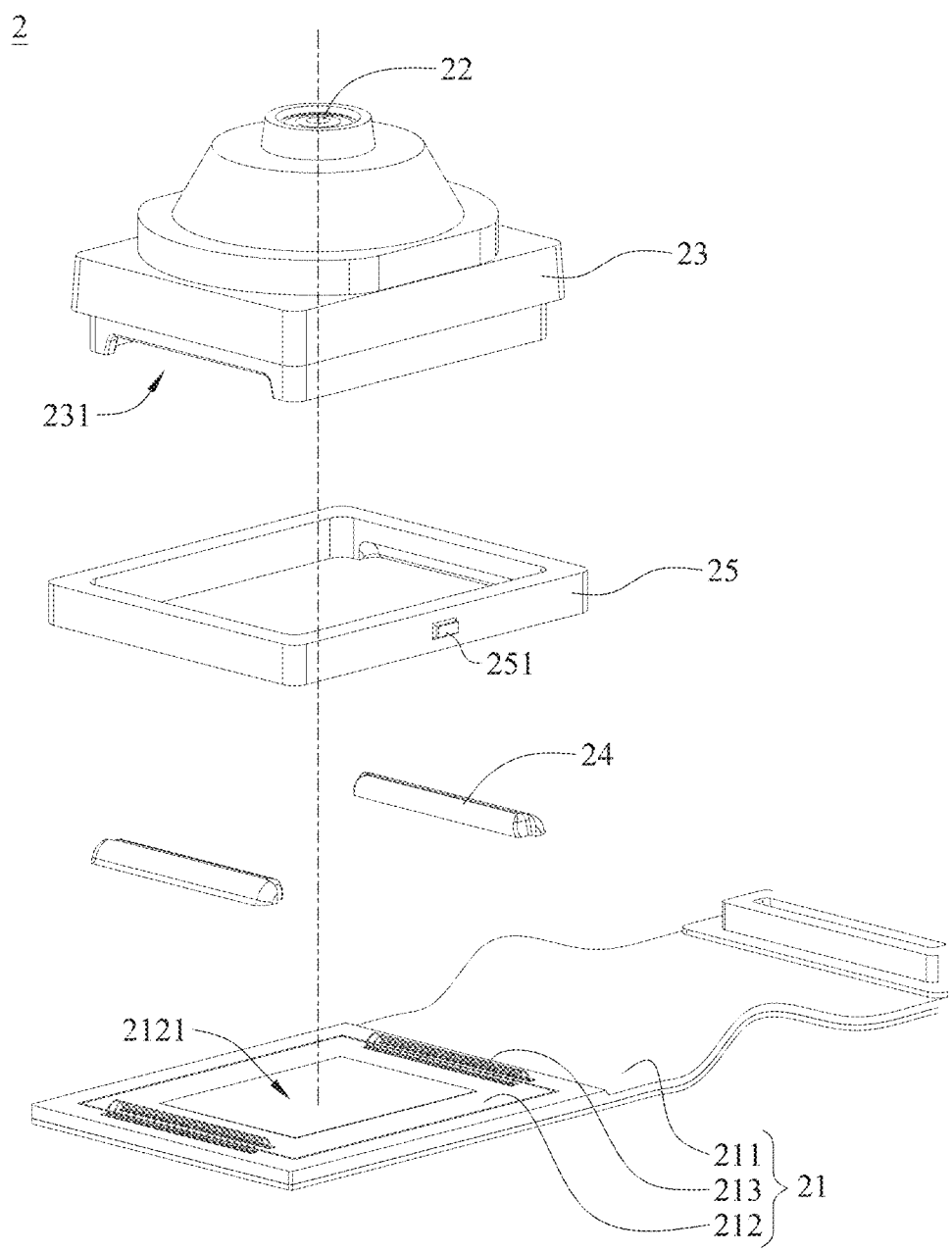
FIG. 25 is an exploded view of the imaging lens module in FIG. 24.
Figure 26:
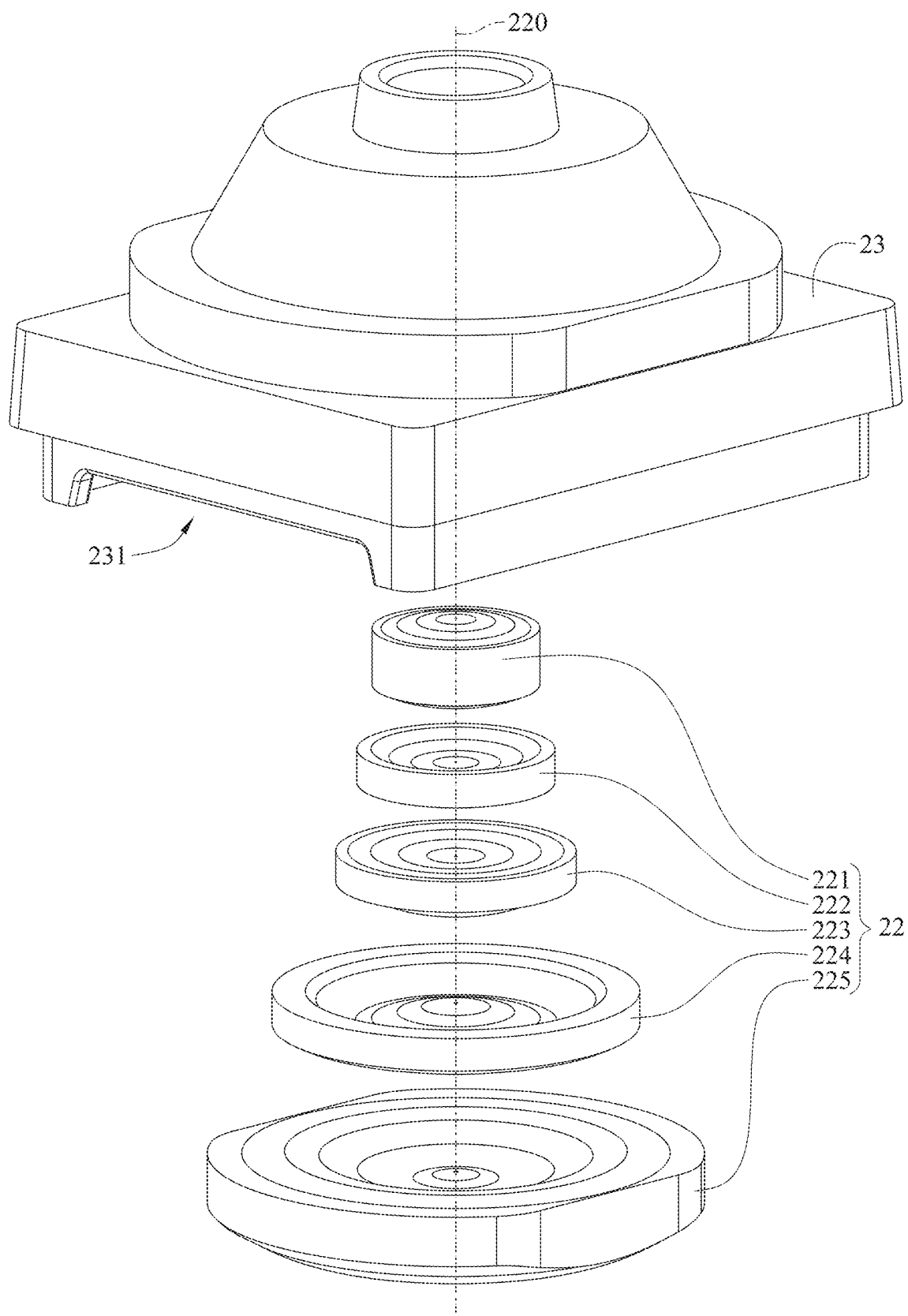
FIG. 26 is an exploded view of a lens assembly and a lens holding member of the imaging lens module in FIG. 25.
Figure 27:
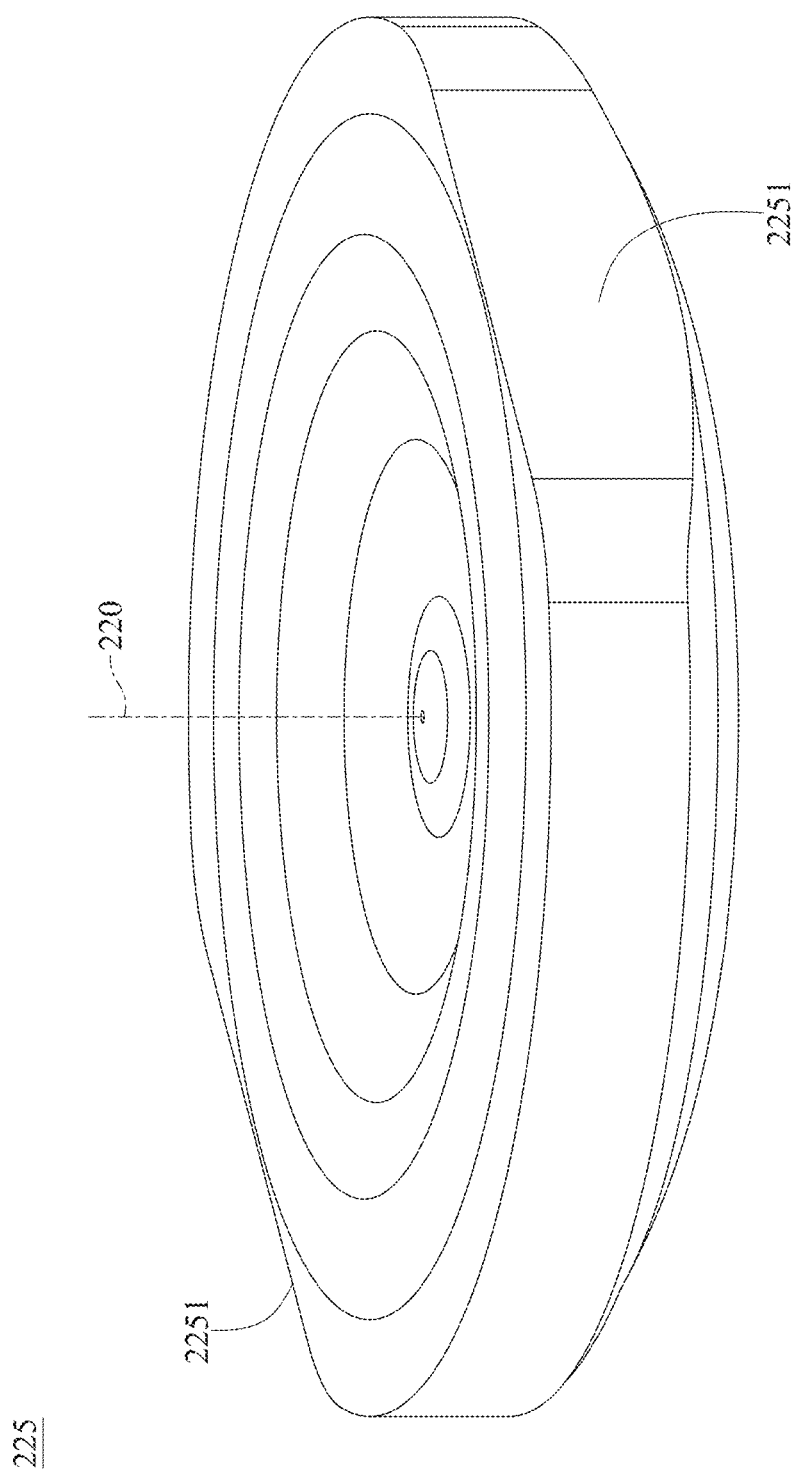
FIG. 27 is an enlarged view of a fifth lens element of the lens assembly in FIG. 25.
Figure 28:
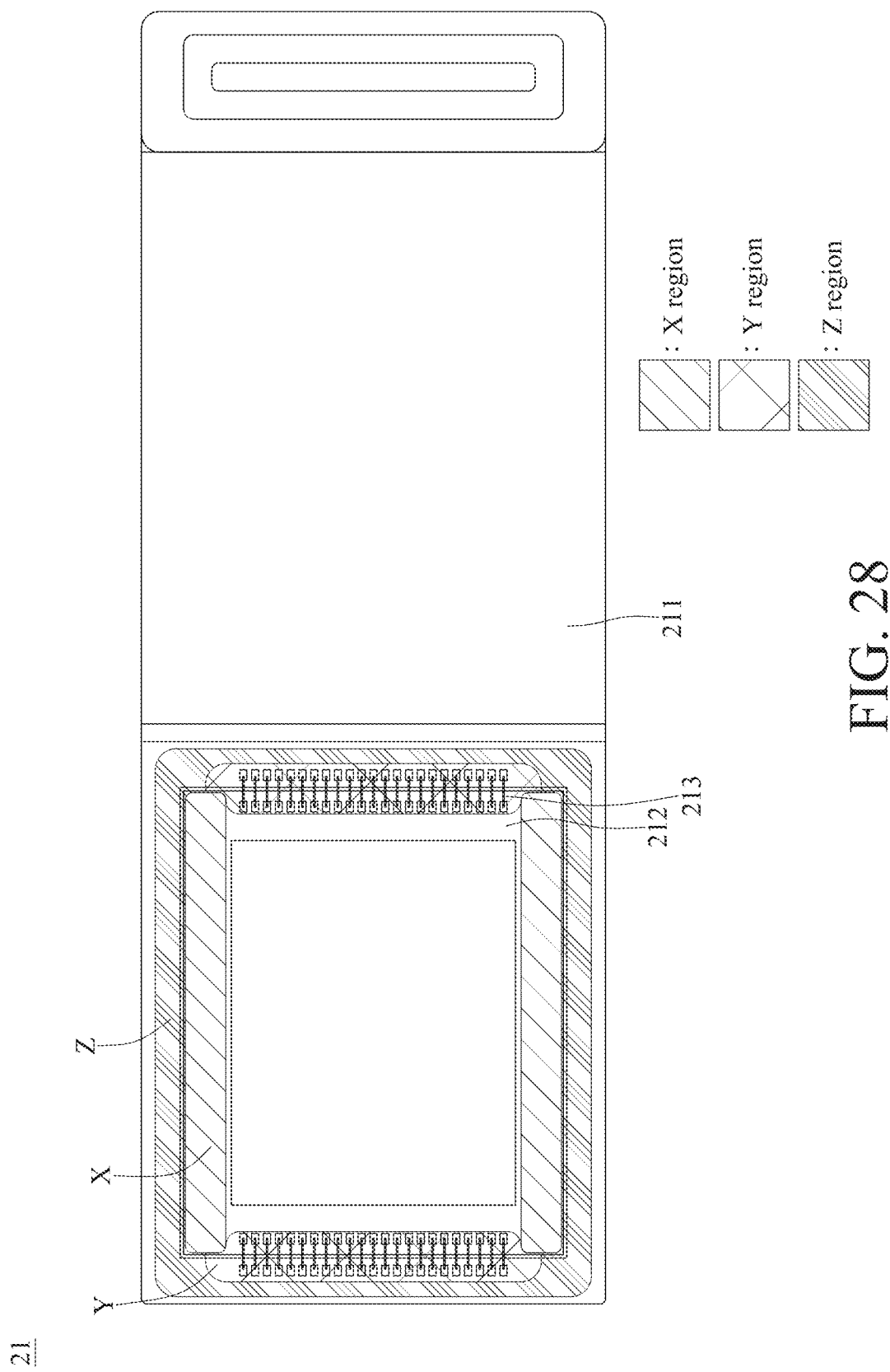
FIG. 28 is a top view of a sensing part of the imaging lens module in FIG. 25.
Figure 29:
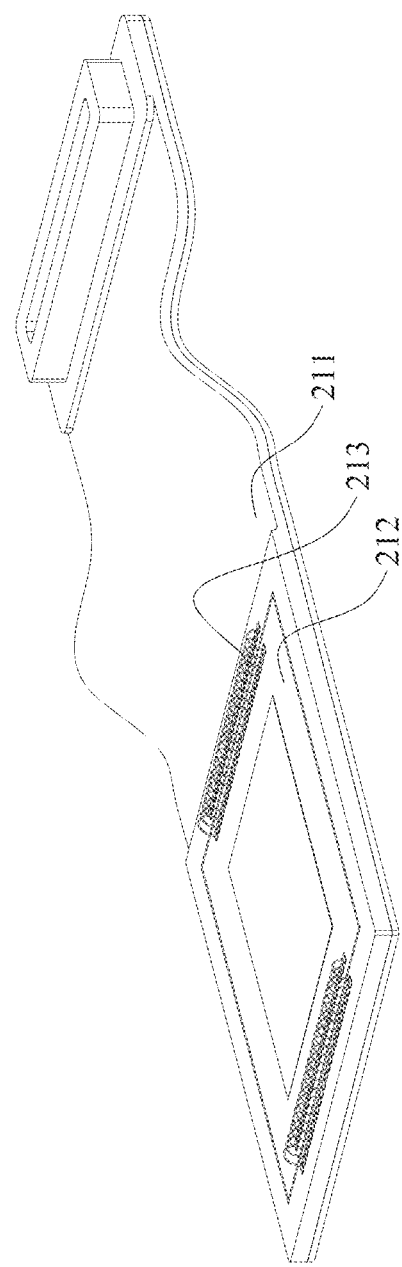
FIG. 29 to FIG. 32 are perspective views showing assembly processes of the imaging lens module in FIG. 24.
Figure 30:
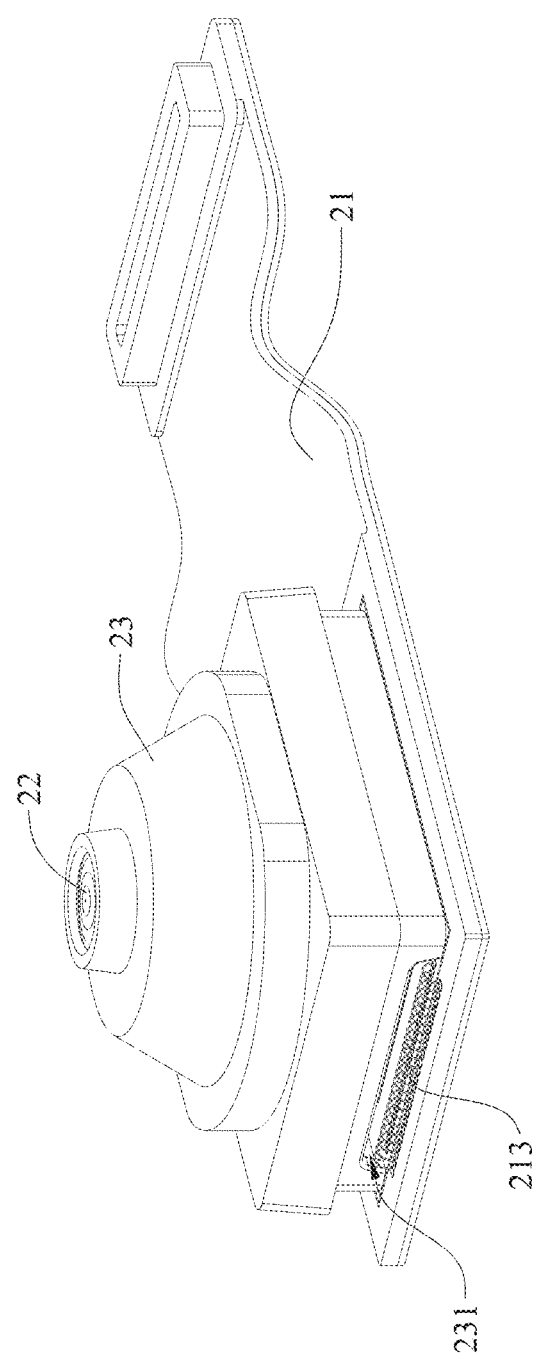
Figure 31:
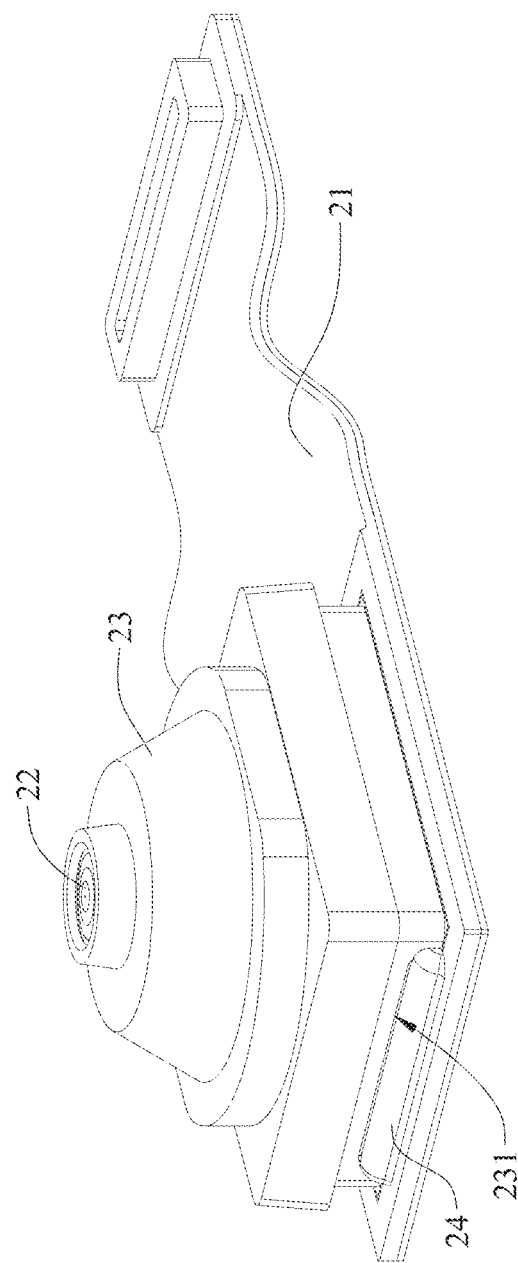
Figure 32:
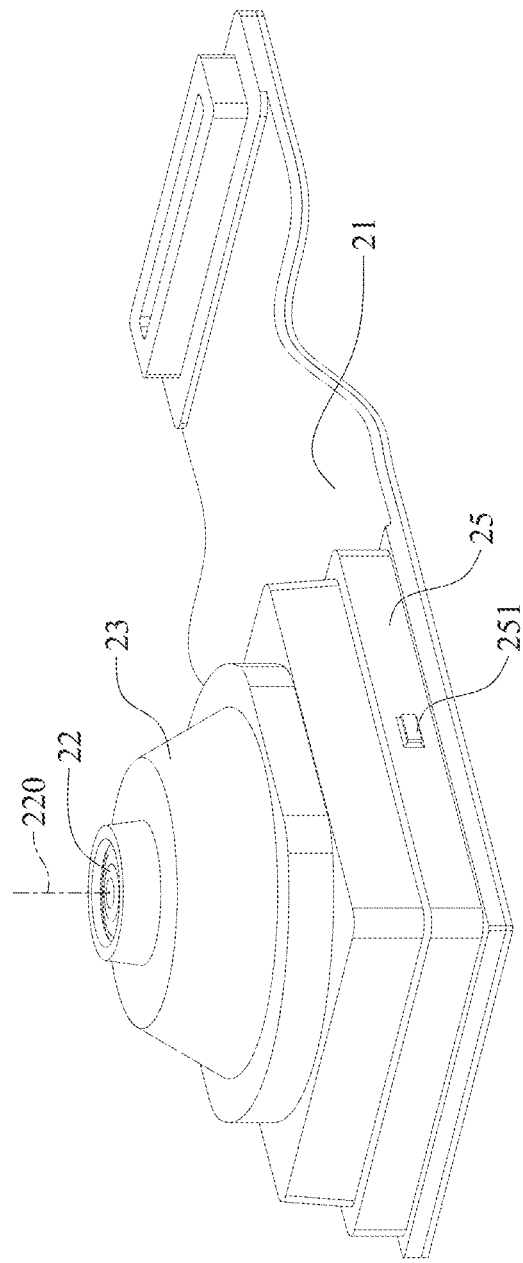
Figure 33:
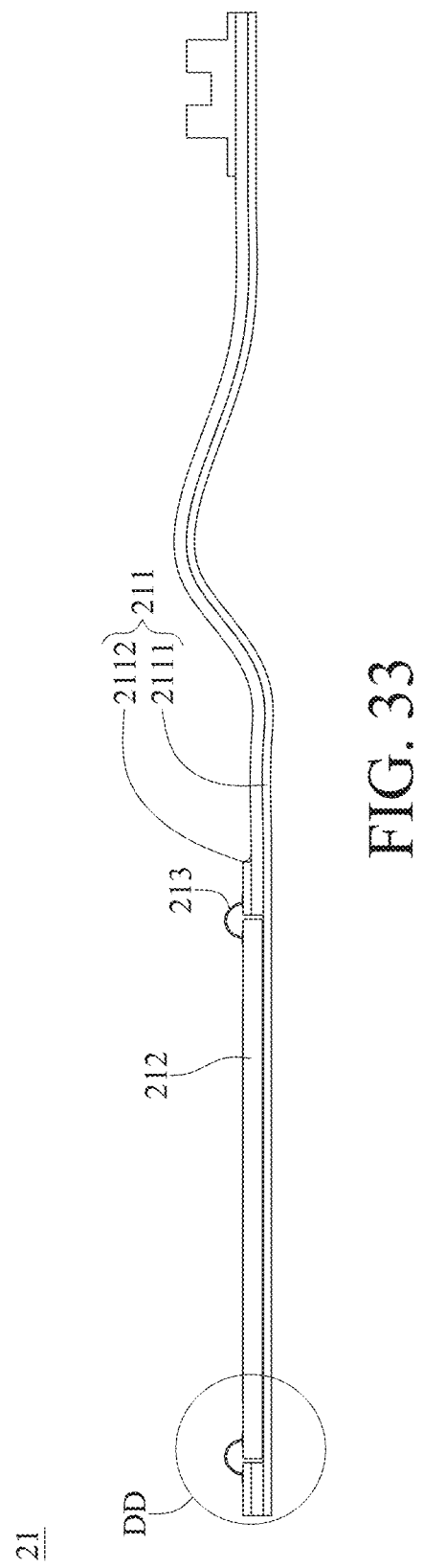
FIG. 33 to FIG. 36 are cross-sectional views showing the assembly processes of the imaging lens module along line R-R in FIG. 24.
Figure 36:
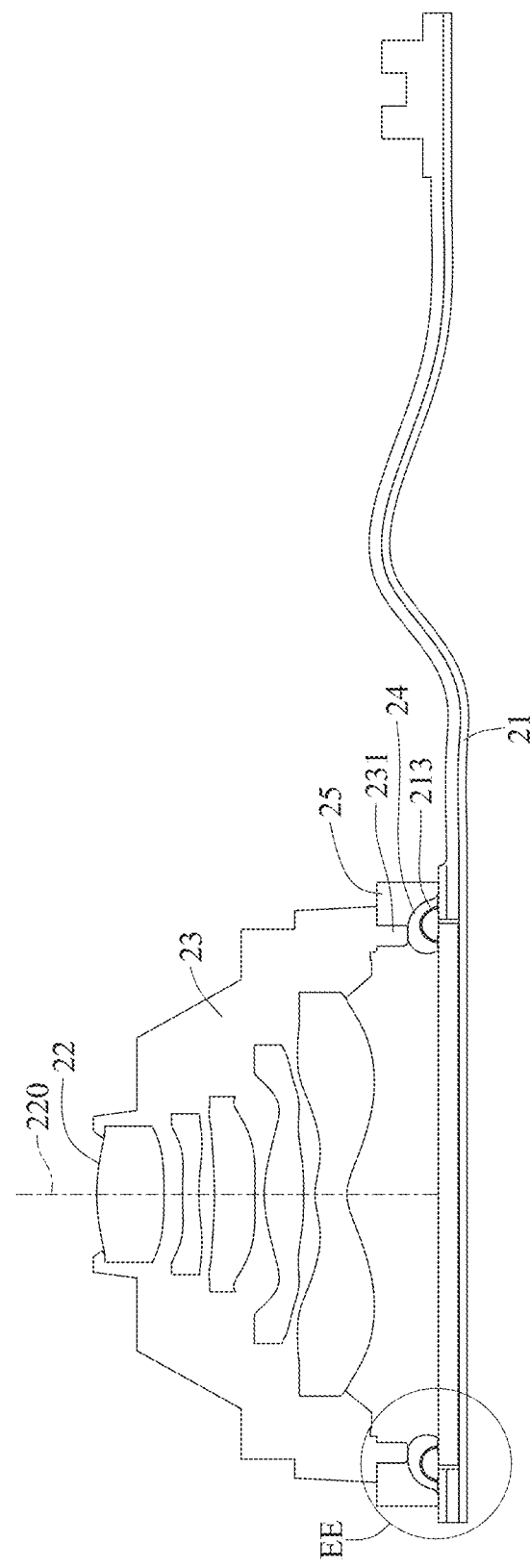
Figure 37:
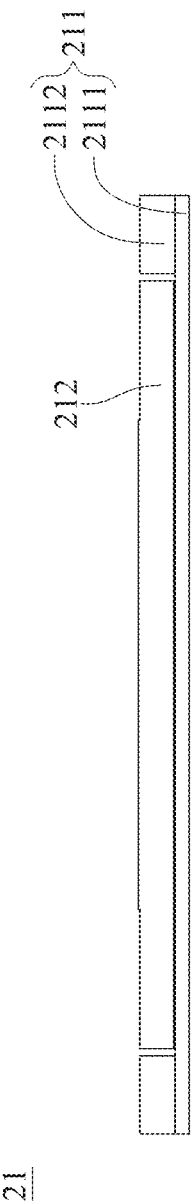
FIG. 37 to FIG. 40 are cross-sectional views showing the assembly processes of the imaging lens module along line S-S in FIG. 24.
Figure 40:
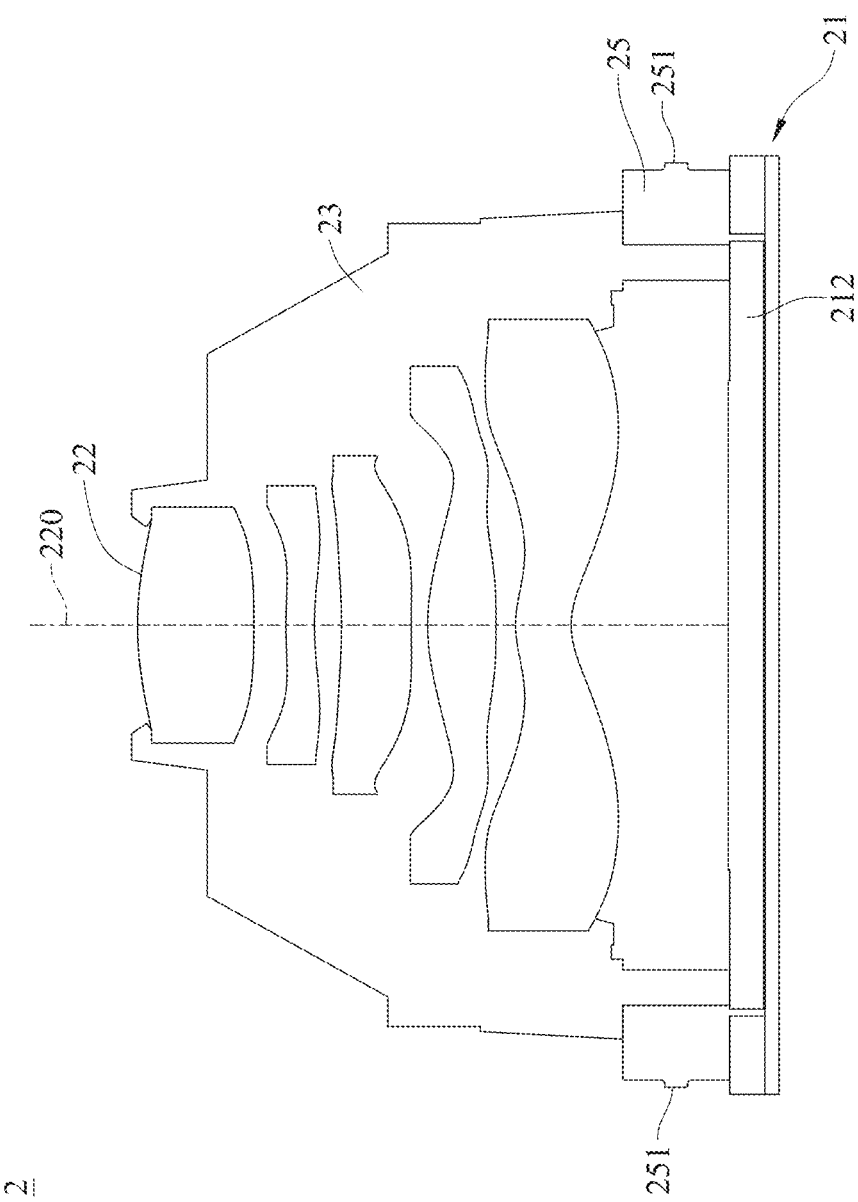
Figure 41:
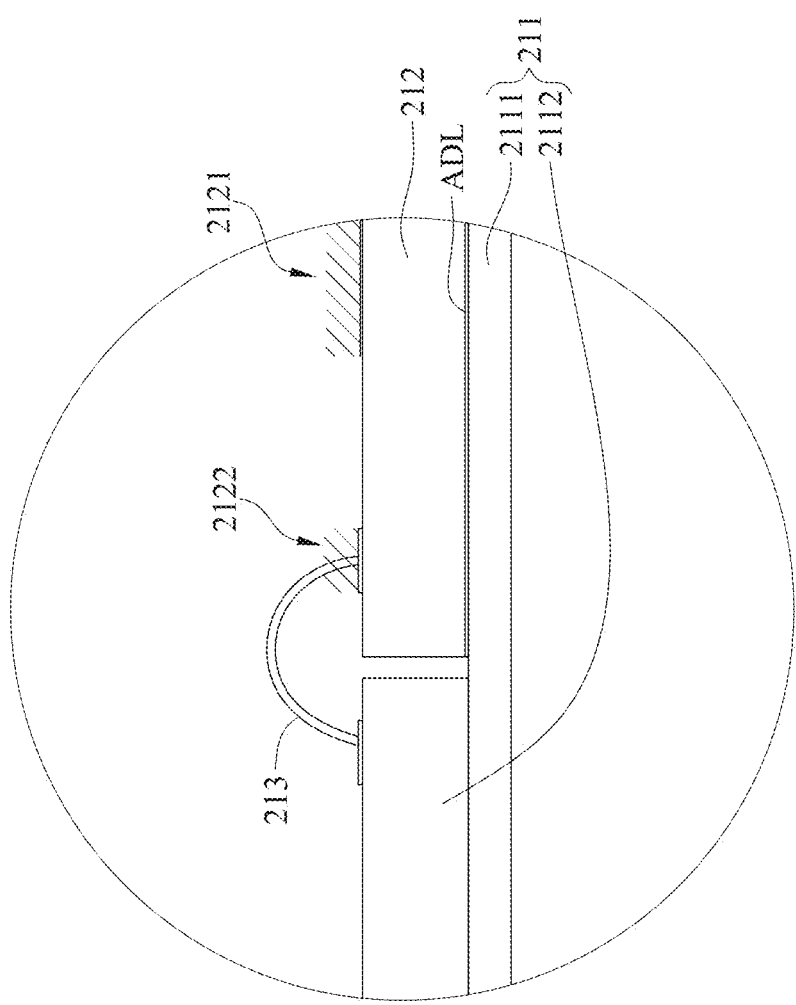
FIG. 41 is an enlarged view of DD region in FIG. 33.
Figure 42:
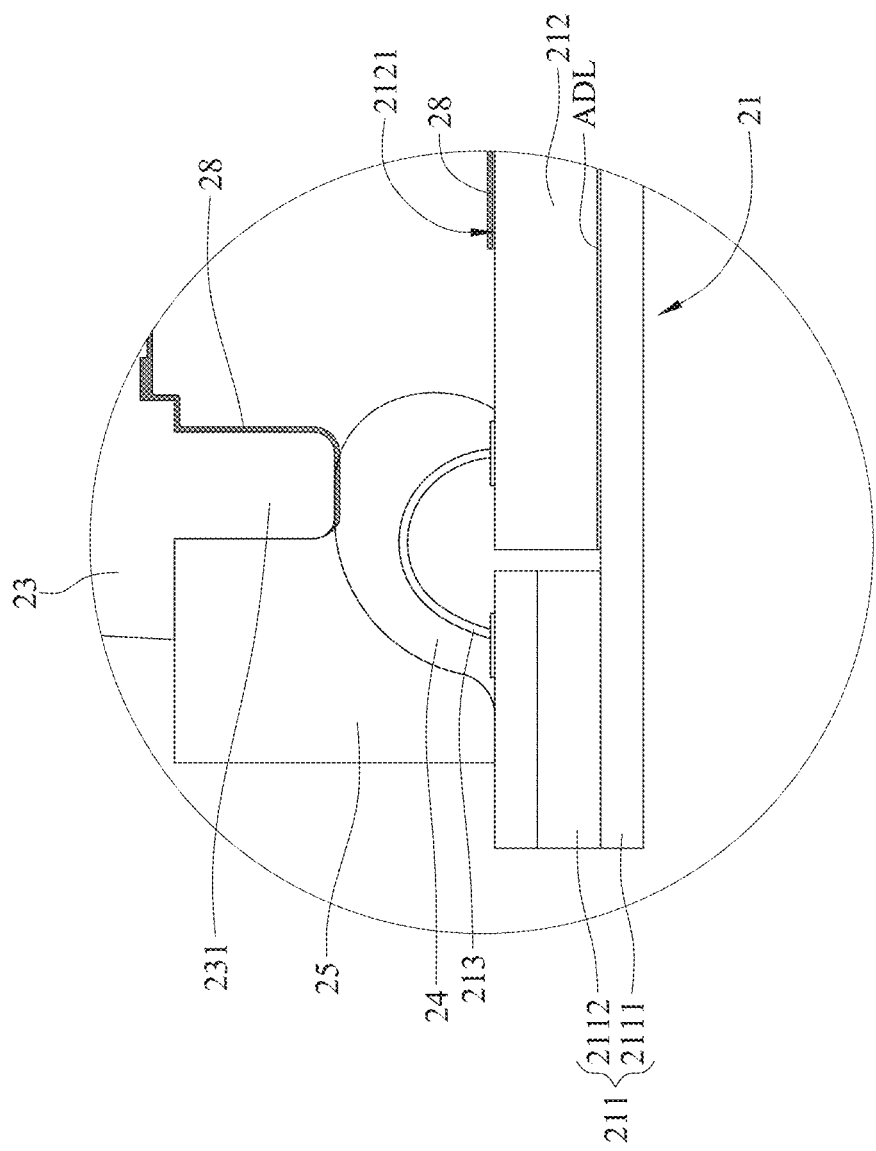
FIG. 42 is an enlarged view of EE region in FIG. 36.

Please refer to FIG. 24 to FIG. 42, where FIG. 24 is a perspective view of an imaging lens module according to the 2nd embodiment of the present disclosure, FIG. 25 is an exploded view of the imaging lens module in FIG. 24, FIG. 26 is an exploded view of a lens assembly and a lens holding member of the imaging lens module in FIG. 25, FIG. 27 is an enlarged view of a fifth lens element of the lens assembly in FIG. 25, FIG. 28 is a top view of a sensing part of the imaging lens module in FIG. 25, FIG. 29 to FIG. 32 are perspective views showing assembly processes of the imaging lens module in FIG. 24, FIG. 33 to FIG. 36 are cross-sectional views showing the assembly processes of the imaging lens module along line R-R in FIG. 24, FIG. 37 to FIG. 40 are cross-sectional views showing the assembly processes of the imaging lens module along line S-S in FIG. 24, FIG. 41 is an enlarged view of DD region in FIG. 33, and FIG. 42 is an enlarged view of EE region in FIG. 36.

In this embodiment, an imaging lens module 2 includes a sensing part 21, a lens assembly 22, a lens holding member 23, two isolating articles 24, a plastic molding article 25 and a plurality of anti-reflection membranes 28.

Please refer to FIG. 29 to FIG. 32, FIG. 33 to FIG. 36 and FIG. 37 to FIG. 40, which are respectively perspective views, cross-sectional views along line R-R, and cross-sectional views along line S-S showing four steps of the assembly processes of the imaging lens module 2. Step I is to provide the sensing part 21. Step II is to dispose the lens holding member 23. Step III is to dispose the isolating articles 24. Step IV is to mold the plastic molding article 25. Step I to Step IV exemplarily show the functionality of each component and the cooperation between the components, Step I to Step IV do not completely correspond to actual manufacturing processes, and the claims of the present disclosure are also not limited to Step I to Step IV. In the following, the components will be illustrated in detail.

The sensing part 21 includes a substrate 211, a sensing chip 212 and a plurality of conducting wires 213. The substrate 211 supports the sensing chip 212. Specifically, please refer to FIG. 41, the substrate 211 includes a heat dissipation layer 2111 and a circuit layer 2112. The circuit layer 2112 is disposed on peripheral areas of the heat dissipation layer 2111. The sensing chip 212 is disposed on the central area of the heat dissipation layer 2111 via an adhesive layer ADL. The sensing chip 212 includes an optical effective area 2121 and an electrical connection area 2122. The conducting wires 213 are electrically connected to the electrical connection area 2122 and the circuit layer 2112 so as to transmit image signals. As shown in FIG. 28, the sensing part 21 has an X region, a Y region and a Z region for the lens holding member 23, the isolating articles 24 and the plastic molding article to be disposed thereon, respectively.

The lens assembly 22 is disposed corresponding to the optical effective area 2121 and has an optical axis 220. The lens assembly 22 includes five lens elements accommodated in the lens holding member 23. The five lens elements are, in sequence along the optical axis 220, a first lens element 221, a second lens element 222, a third lens element 223, a fourth lens element 224 and a fifth lens element 225. The fifth lens element 225 is a trimmed lens element. Specifically, as shown in FIG. 27, the fifth lens element 225 has two trimmed surfaces 2251 recessed towards the optical axis 220. The five lens elements are only exemplary in the drawings, the quantity or the contours thereof can be adjusted according to actual requirements, and the present disclosure is not limited thereto.

Figure 34:
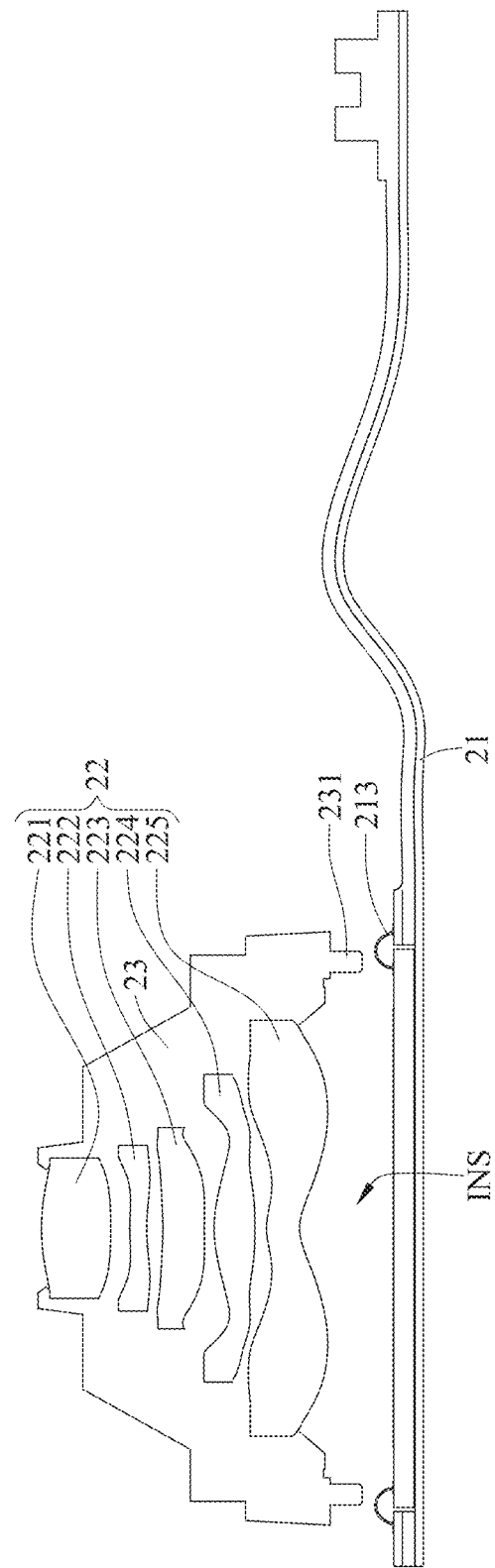
Figure 35:
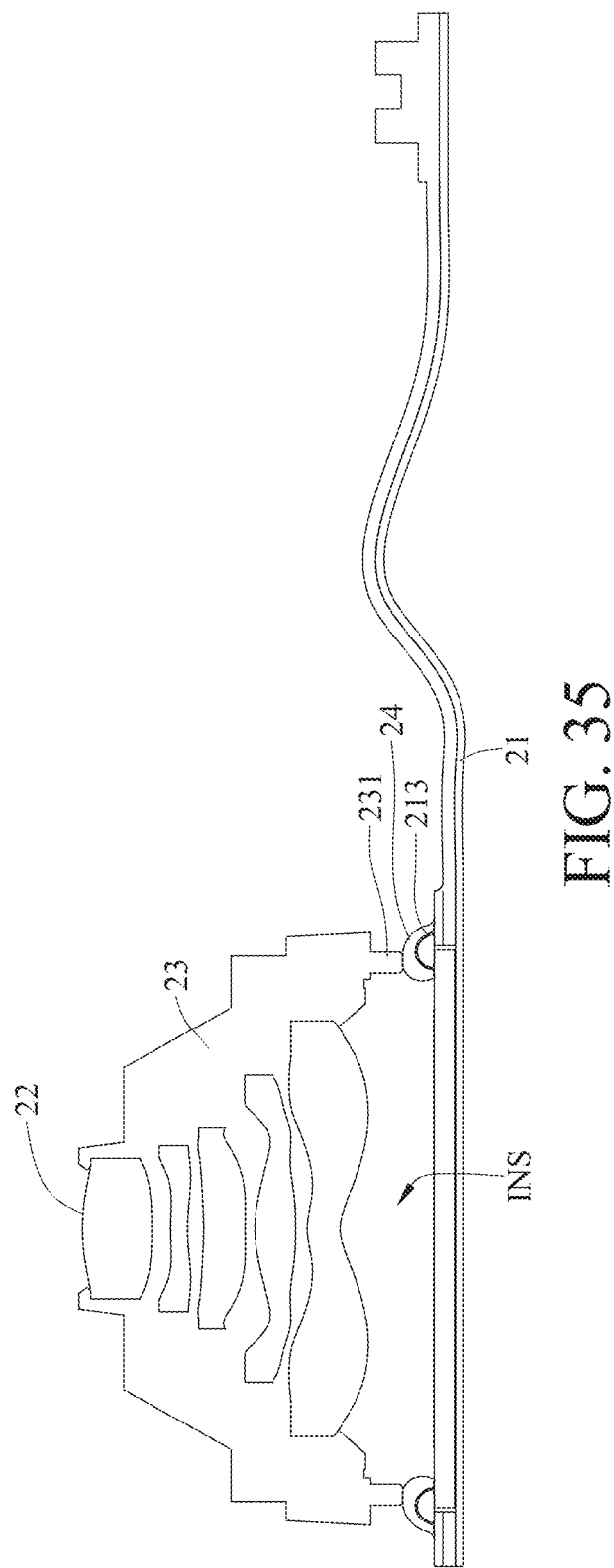
Figure 38:
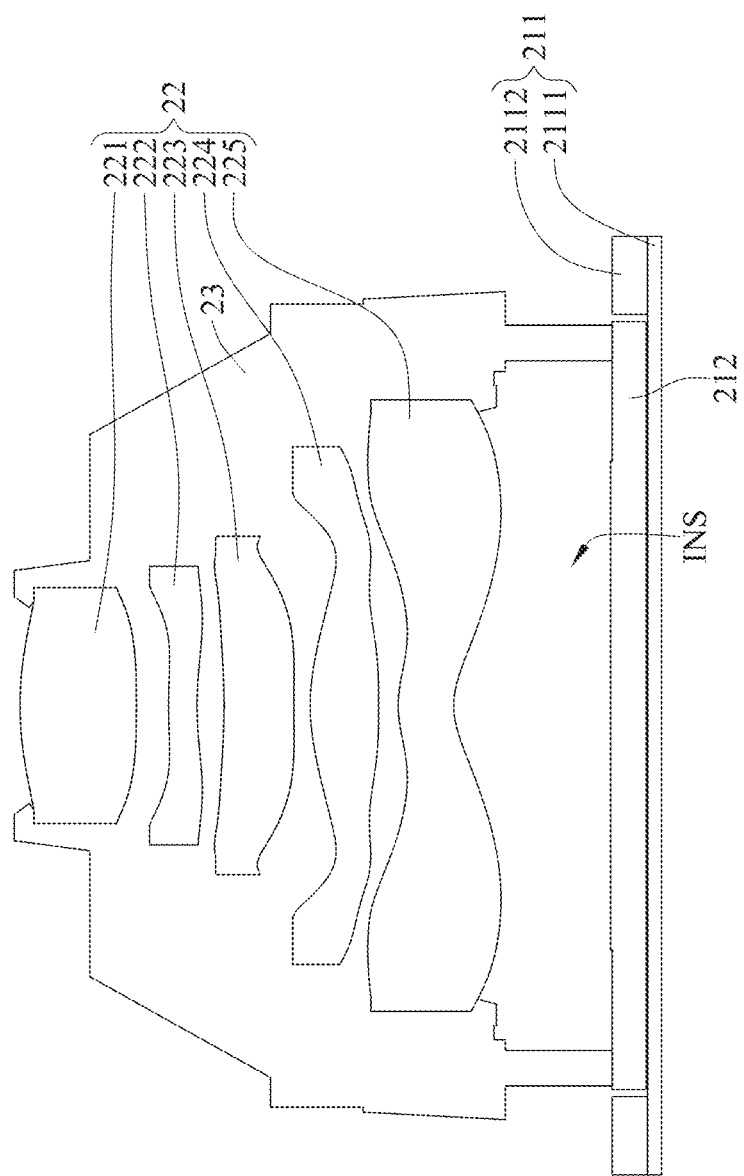
Figure 39:
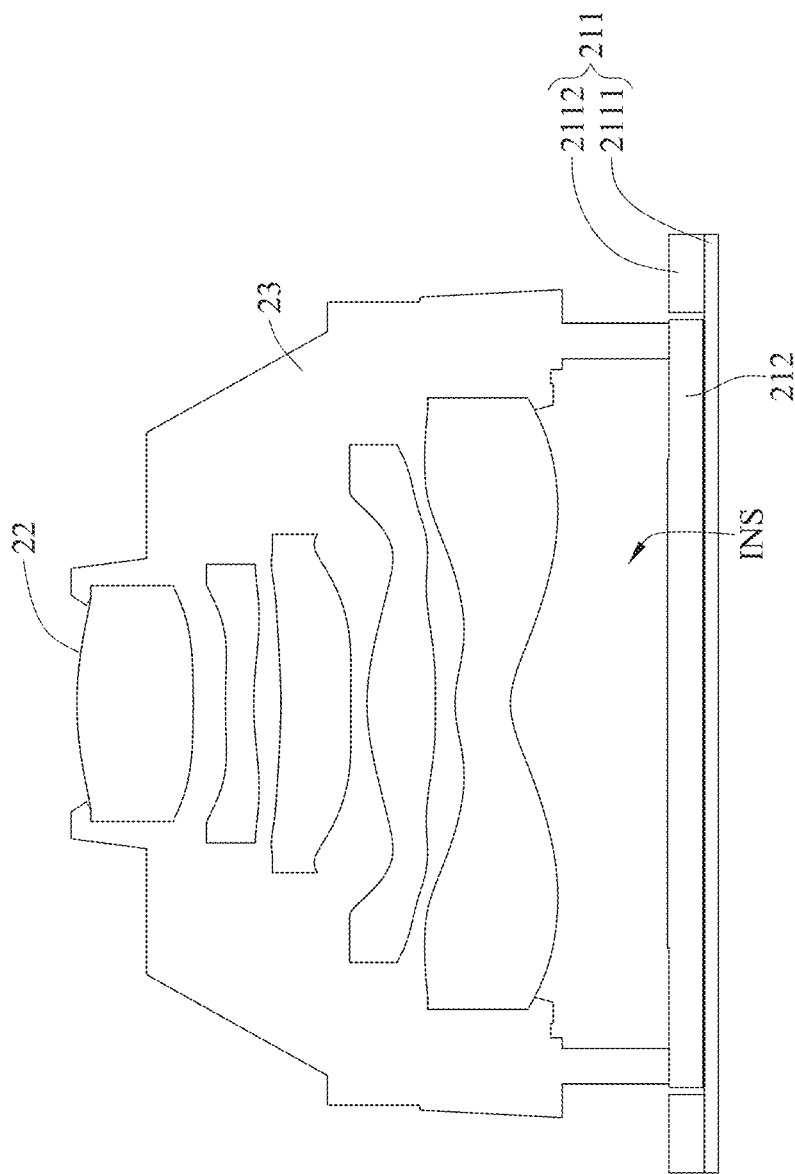

The lens holding member 23 holds the lens assembly 22. The lens holding member 23 includes two wire correspondence structures 231. Please refer to FIG. 42, the wire correspondence structures 231 are disposed corresponding to the conducting wires 213. Please refer to FIG. 28 for the assembly position, the lens holding member 23 is disposed at a particular position (i.e., the X region) of the sensing part 21. The particular position (X region) is arranged on the sensing chip 212 of the sensing part 21. The assembled lens holding member 23 is shown in FIG. 38, which is disposed on the sensing chip 212. As shown in FIG. 34, the lens holding member 23 and the sensing part 21 form an internal space INS therebetween, and the internal space INS is in connection with outside via the wire correspondence structures 231 for utilizing the wire correspondence structures 231 as air exhaust channels connected to the internal space INS during assembly.

The isolating articles 24 isolate the conducting wires 213. Further, please refer to FIG. 42, the isolating articles 24 are disposed between the wire correspondence structures 231 and the conducting wires 213. As shown in FIG. 42, the isolating articles 24 cover the conducting wires 213.

The plastic molding article 25 is molded on the sensing part 21 and in physical contact with the lens holding member 23. Further, please refer to FIG. 42, the plastic molding article 25 can be integrally formed with the lens holding member 23 and the sensing part 21 through an insert molding process. And, as shown in FIG. 40, the molded plastic molding article 25 has a plurality of gate traces 251. Therefore, the lens holding member 23 can be fixed with respect to the sensing part 21. As shown in FIG. 42, the plastic molding article 25 is located farther away from the optical effective area 2121 than the isolating articles 24 and the conducting wires 213.

The anti-reflection membranes 28 are disposed at a side of the lens holding member 23 facing towards the sensing part 21 and further on the optical effective area 2121, as shown in FIG. 42. The anti-reflection membranes 28 each include a nano-ridge layer (not shown in the drawings of this embodiment). The pitch of the nano-ridges distribution in the nano-ridge layer becomes large towards the air, which represents that the nano-ridge layer becomes sparse towards the air, and the average height of the nano-ridge layer ranges from 60 nanometers to 400 nanometers. The detail of the nano-ridge layer can refer to the description about FIG. 71 to FIG. 73, and it will not be repeated here again.

And, the isolating articles 24 have hardness equal to or smaller than that of the plastic molding article 25.

3rd Embodiment

Figure 43:
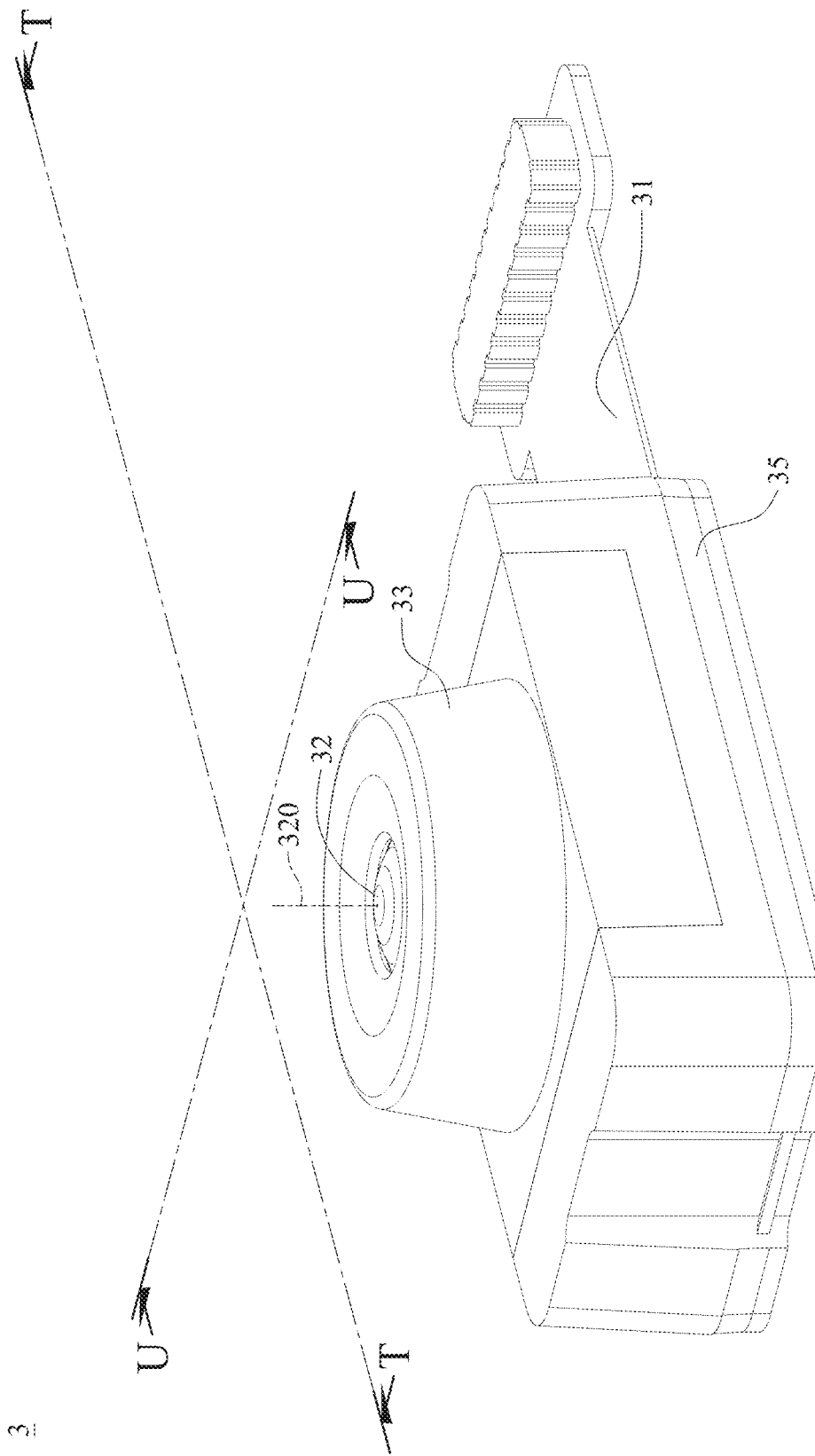
FIG. 43 is a perspective view of an imaging lens module according to the 3rd embodiment of the present disclosure.
Figure 44:
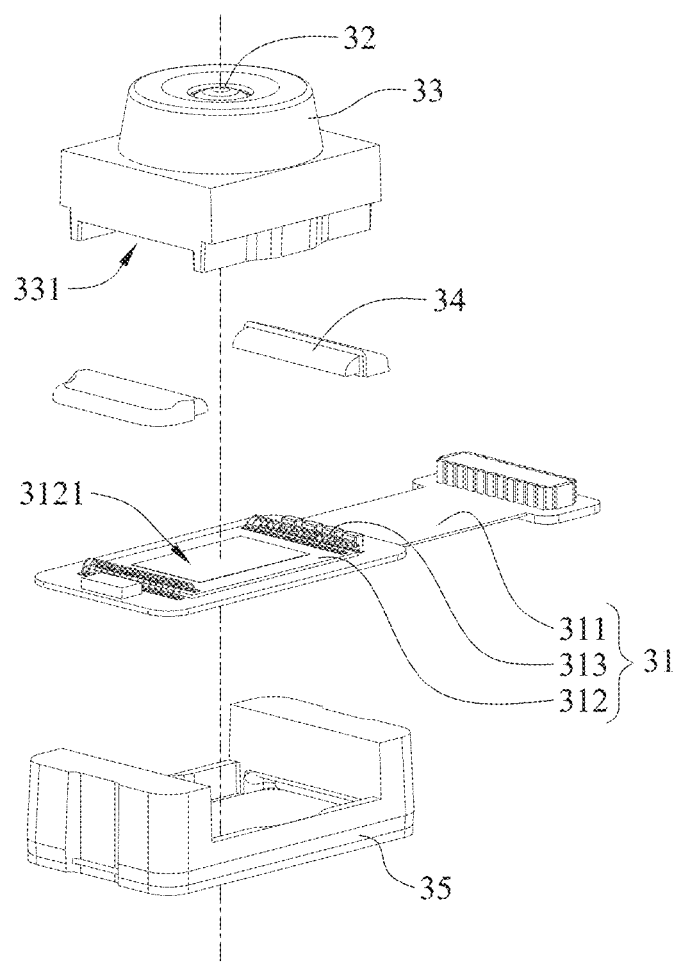
FIG. 44 is an exploded view of the imaging lens module in FIG. 43.
Figure 45:
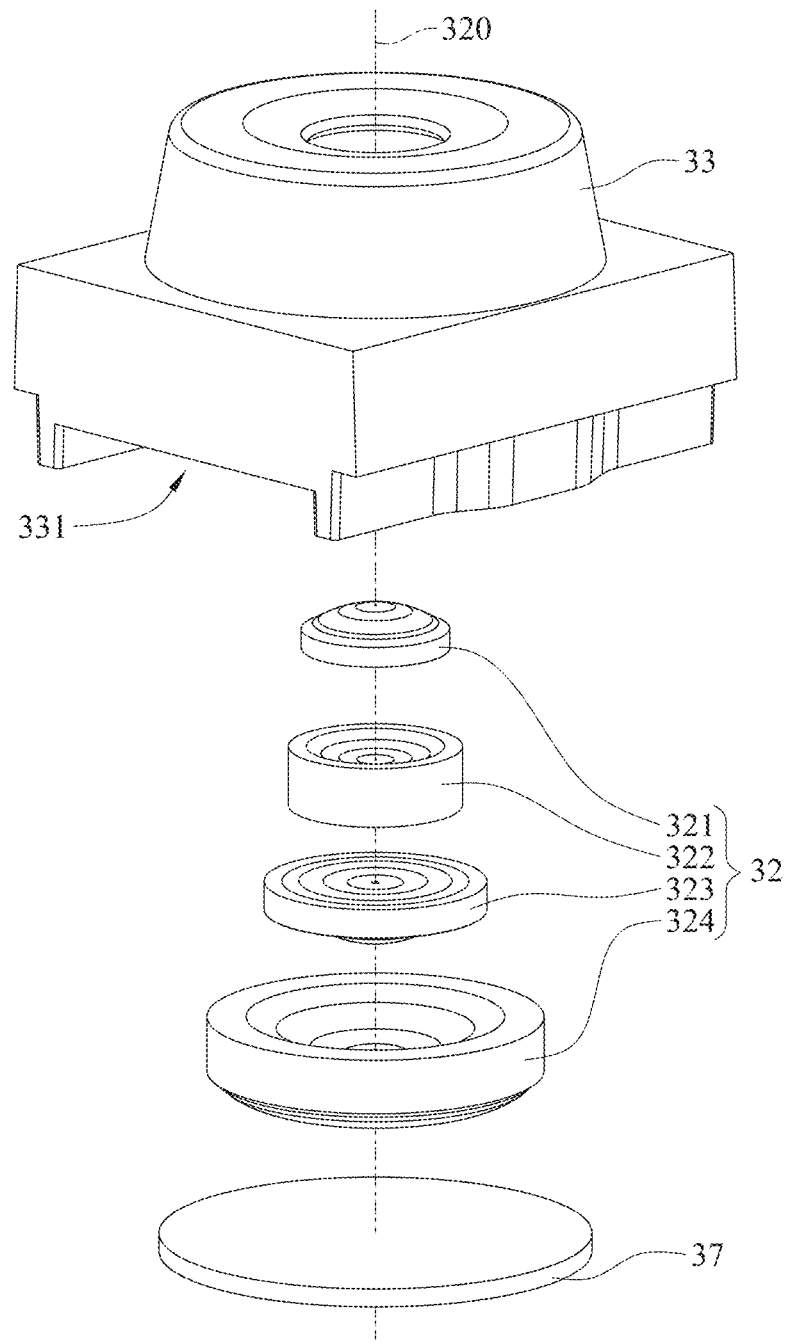
FIG. 45 is an exploded view of a lens assembly, a lens holding member and an optical element of the imaging lens module in FIG. 44.
Figure 46:
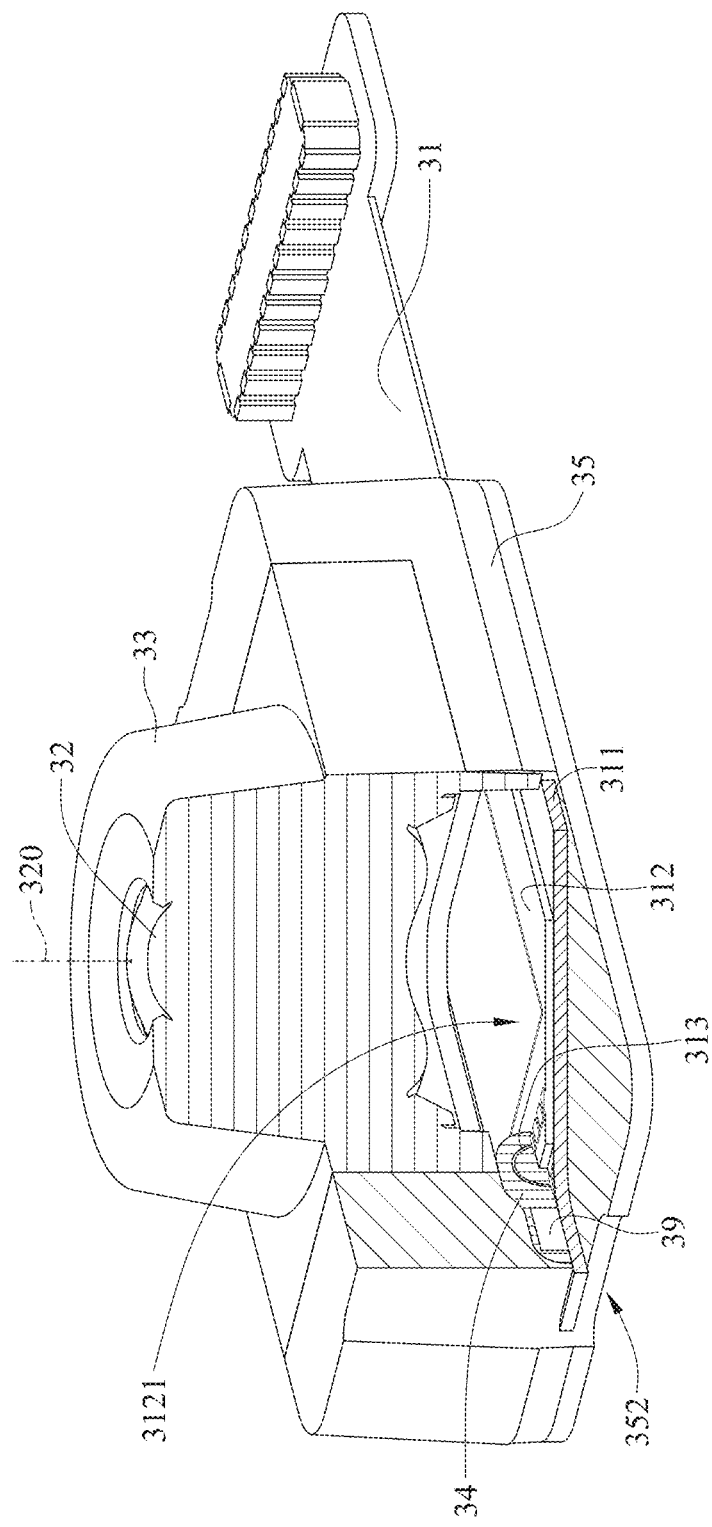
FIG. 46 is a perspective view of the imaging lens module in FIG. 43 that has been partially sectioned.
Figure 47:
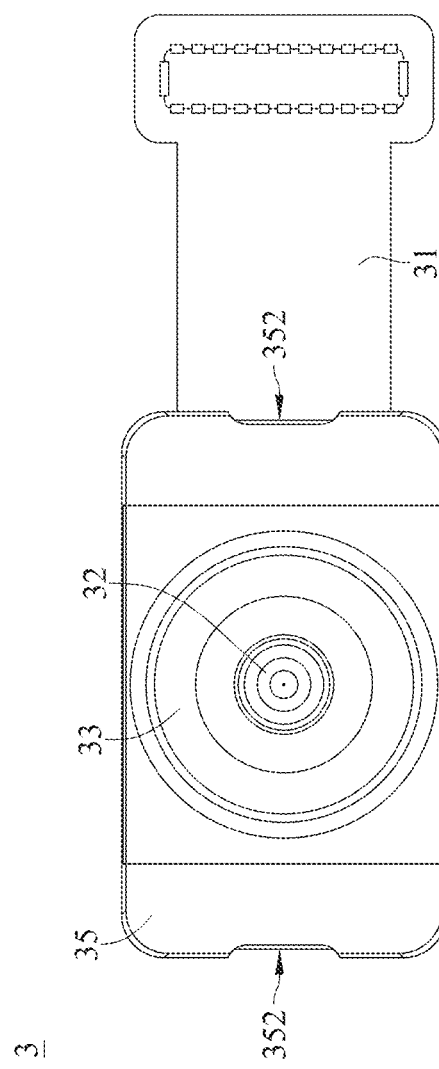
FIG. 47 is a top view of the imaging lens module in FIG. 43.
Figure 48:
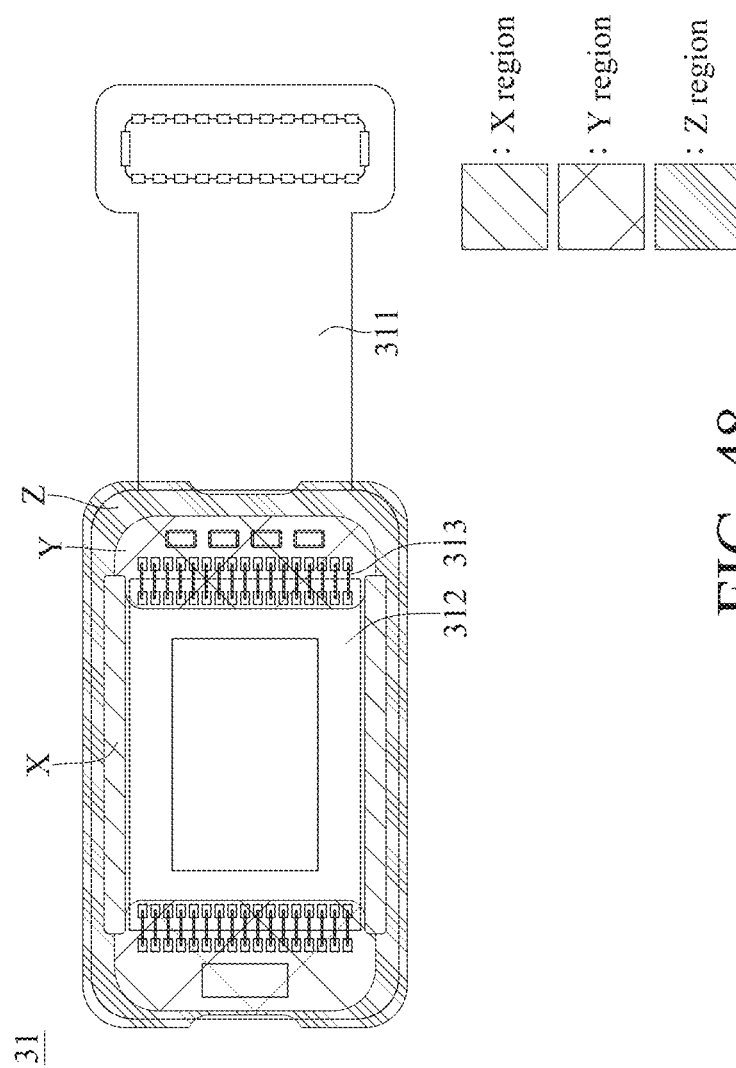
FIG. 48 is a top view of a sensing part of the imaging lens module in FIG. 44.
Figure 49:
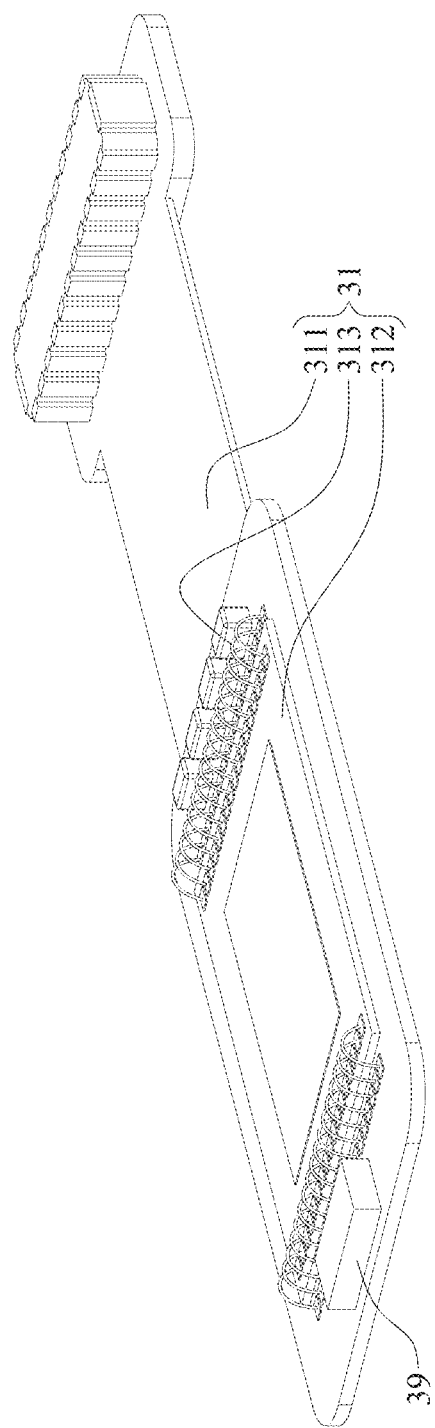
FIG. 49 to FIG. 52 are perspective views showing assembly processes of the imaging lens module in FIG. 43.
Figure 50:
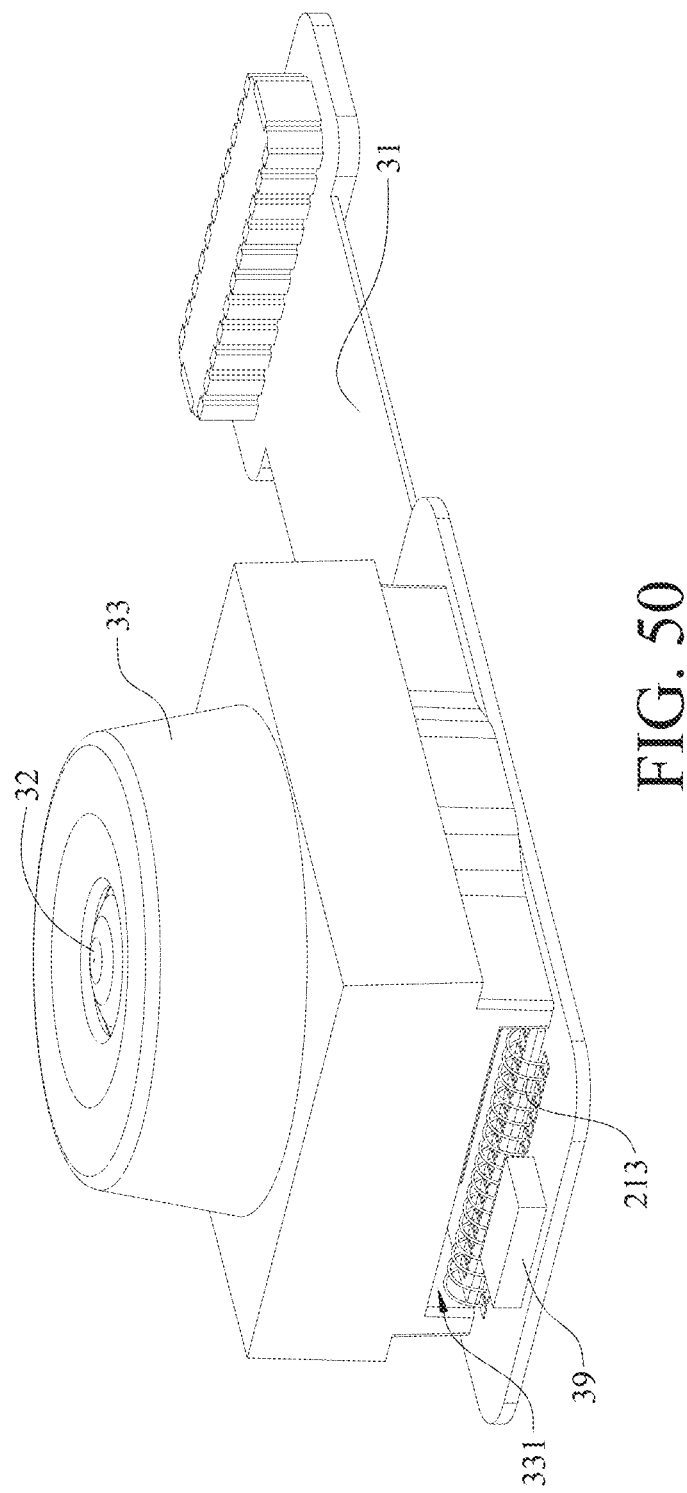
Figure 51:
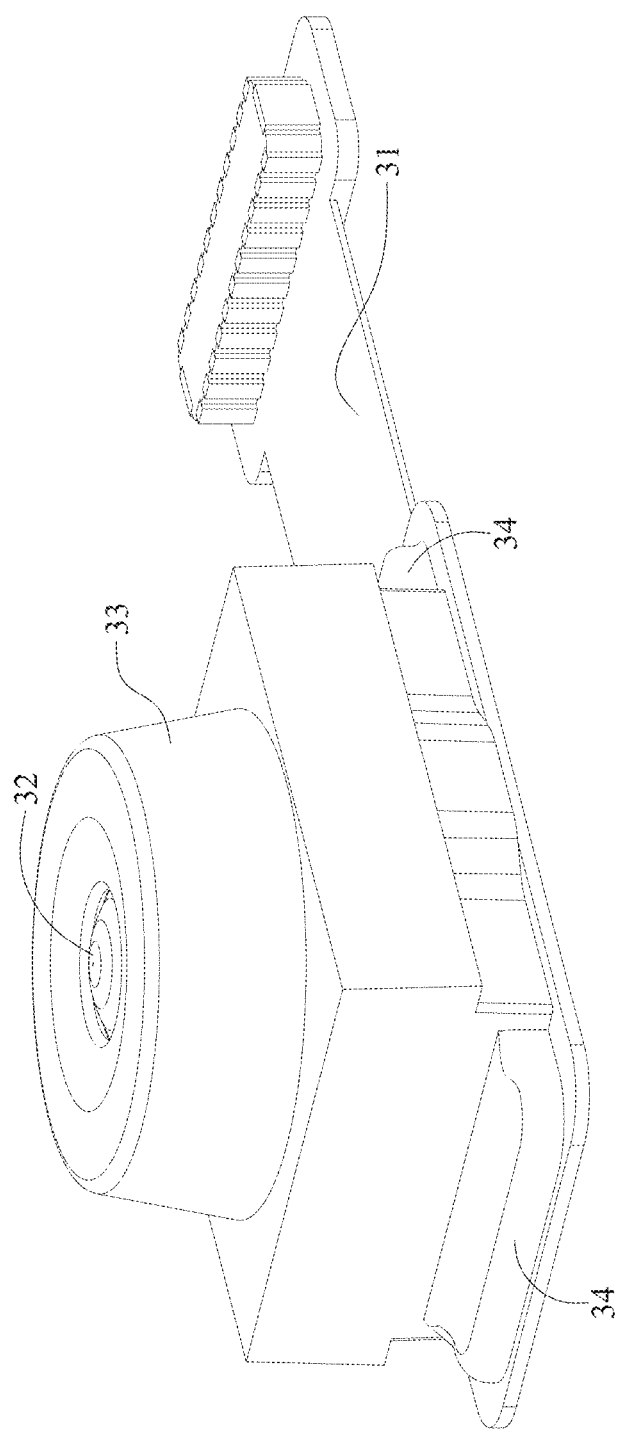
Figure 52:
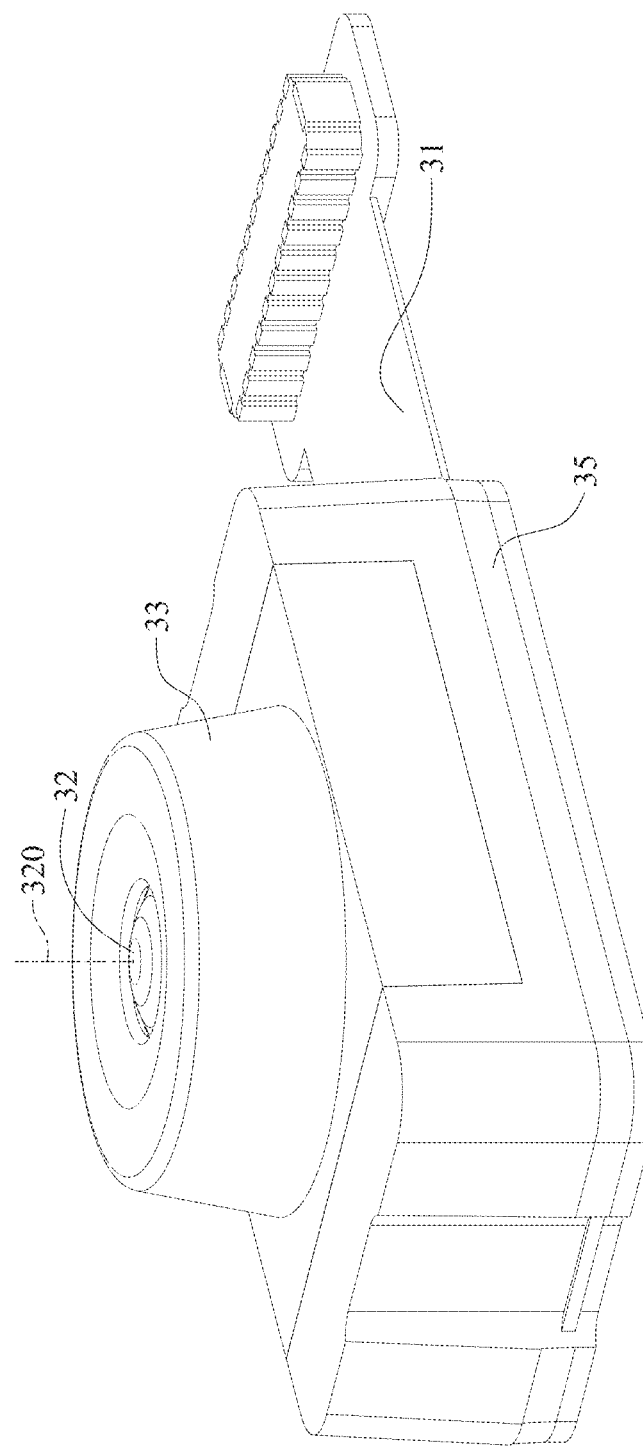
Figure 53:
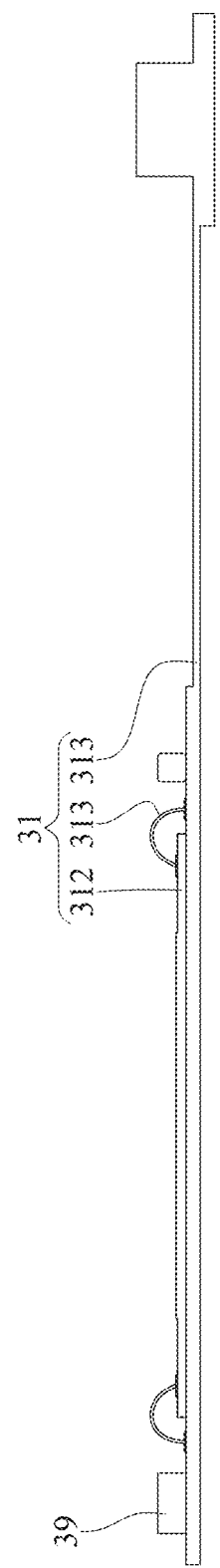
FIG. 53 to FIG. 56 are cross-sectional views showing the assembly processes of the imaging lens module along line T-T in FIG. 43.
Figure 56:
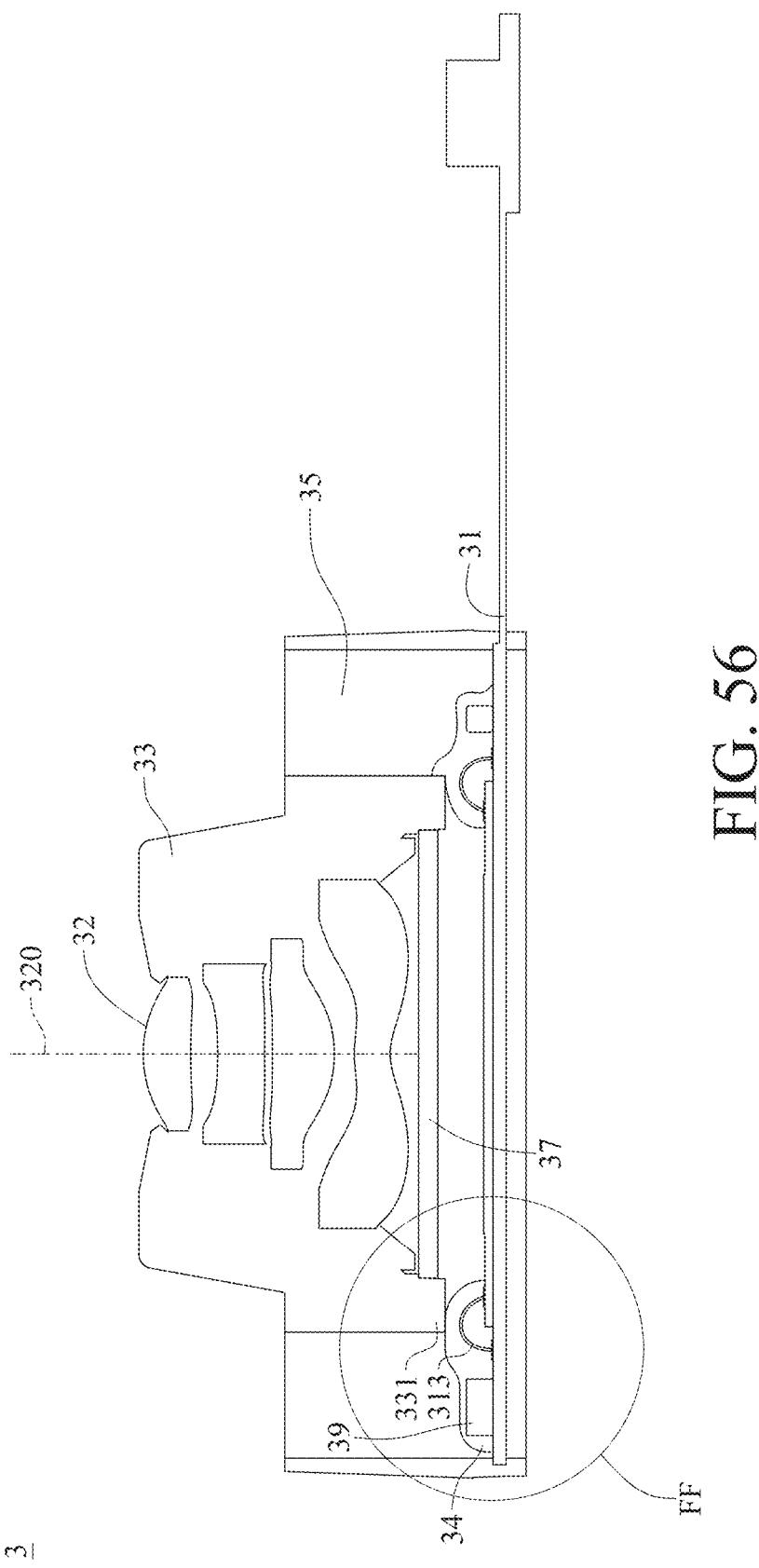
Figure 57:
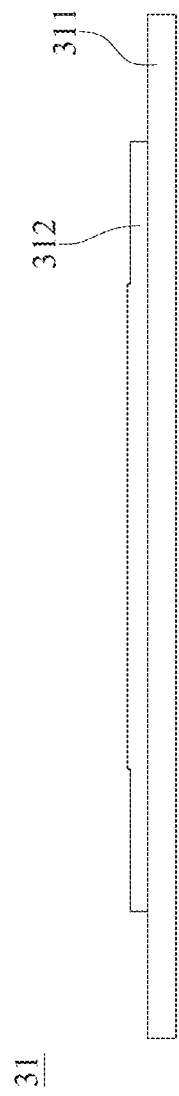
FIG. 57 to FIG. 60 are cross-sectional views showing the assembly processes of the imaging lens module along line U-U in FIG. 43.
Figure 61:
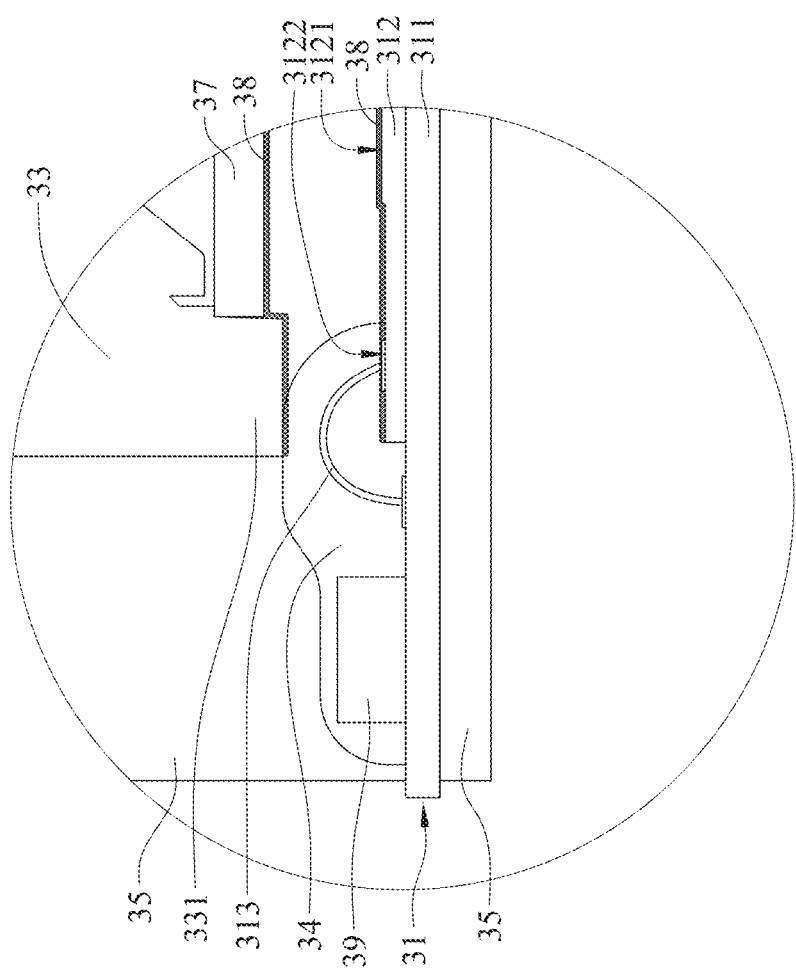
FIG. 61 is an enlarged view of FF region in FIG. 56.

Please refer to FIG. 43 to FIG. 61, where FIG. 43 is a perspective view of an imaging lens module according to the 3rd embodiment of the present disclosure, FIG. 44 is an exploded view of the imaging lens module in FIG. 43, FIG. 45 is an exploded view of a lens assembly, a lens holding member and an optical element of the imaging lens module in FIG. 44, FIG. 46 is a perspective view of the imaging lens module in FIG. 43 that has been partially sectioned, FIG. 47 is a top view of the imaging lens module in FIG. 43, FIG. 48 is a top view of a sensing part of the imaging lens module in FIG. 44, FIG. 49 to FIG. 52 are perspective views showing assembly processes of the imaging lens module in FIG. 43, FIG. 53 to FIG. 56 are cross-sectional views showing the assembly processes of the imaging lens module along line T-T in FIG. 43, FIG. 57 to FIG. 60 are cross-sectional views showing the assembly processes of the imaging lens module along line U-U in FIG. 43, and FIG. 61 is an enlarged view of FF region in FIG. 56.

In this embodiment, an imaging lens module 3 includes a sensing part 31, a lens assembly 32, a lens holding member 33, two isolating articles 34, a plastic molding article 35, an optical element 37, a plurality of anti-reflection membranes 38 and an electronic component 39.

Please refer to FIG. 49 to FIG. 52, FIG. 53 to FIG. 56 and FIG. 57 to FIG. 60, which are respectively perspective views, cross-sectional views along line T-T, and cross-sectional views along line U-U showing four steps of the assembly processes of the imaging lens module 3. Step I is to provide the sensing part 31. Step II is to dispose the lens holding member 33. Step III is to dispose the isolating articles 34. Step IV is to mold the plastic molding article 35. Step I to Step IV exemplarily show the functionality of each component and the cooperation between the components, Step I to Step IV do not completely correspond to actual manufacturing processes, and the claims of the present disclosure are also not limited to Step I to Step IV. In the following, the components will be illustrated in detail.

The sensing part 31 includes a substrate 311, a sensing chip 312 and a plurality of conducting wires 313. The substrate 311 supports the sensing chip 312. As shown in FIG. 61, the sensing chip 312 includes an optical effective area 3121 and an electrical connection area 3122. The conducting wires 313 are electrically connected to the electrical connection area 3122 and the electronic component 39 that is disposed on the substrate 311 so as to transmit image signals. As shown in FIG. 48, the sensing part 31 has an X region, a Y region and a Z region for the lens holding member 33, the isolating articles 34 and the plastic molding article 35 to be disposed thereon, respectively.

The lens assembly 32 is disposed corresponding to the optical effective area 3121 and has an optical axis 320. The lens assembly 32 includes four lens elements accommodated in the lens holding member 33. The four lens elements are, in sequence along the optical axis 320, a first lens element 321, a second lens element 322, a third lens element 323 and a fourth lens element 324. The four lens elements are only exemplary in the drawings, the quantity or the contours thereof can be adjusted according to actual requirements, and the present disclosure is not limited thereto.

Figure 54:
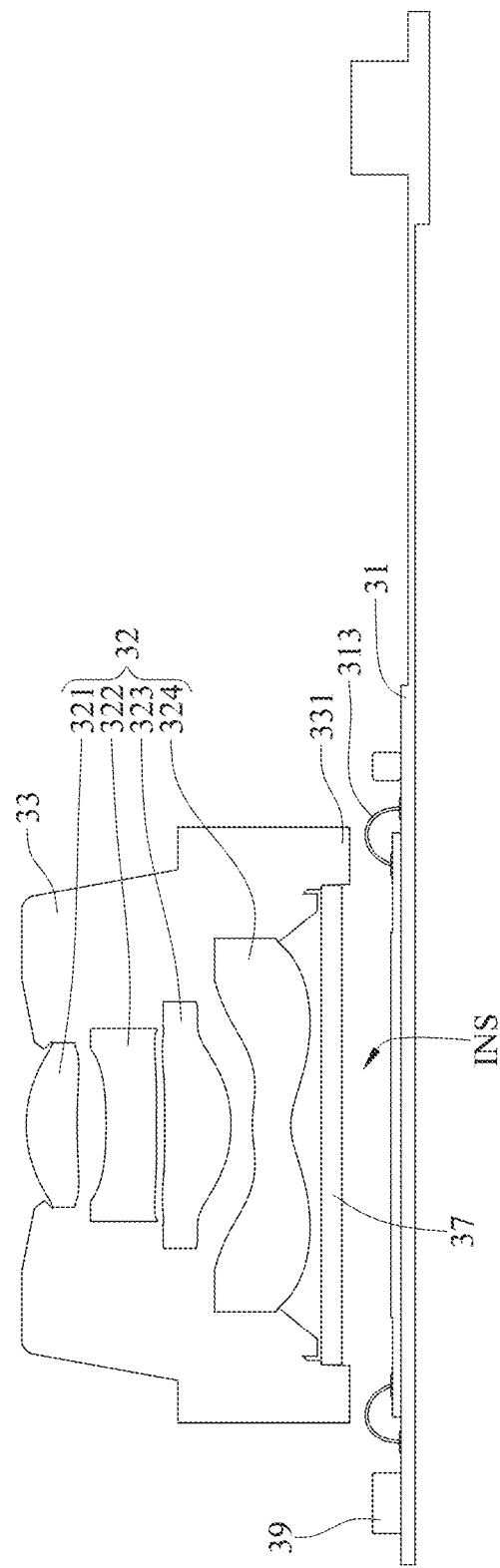
Figure 55:
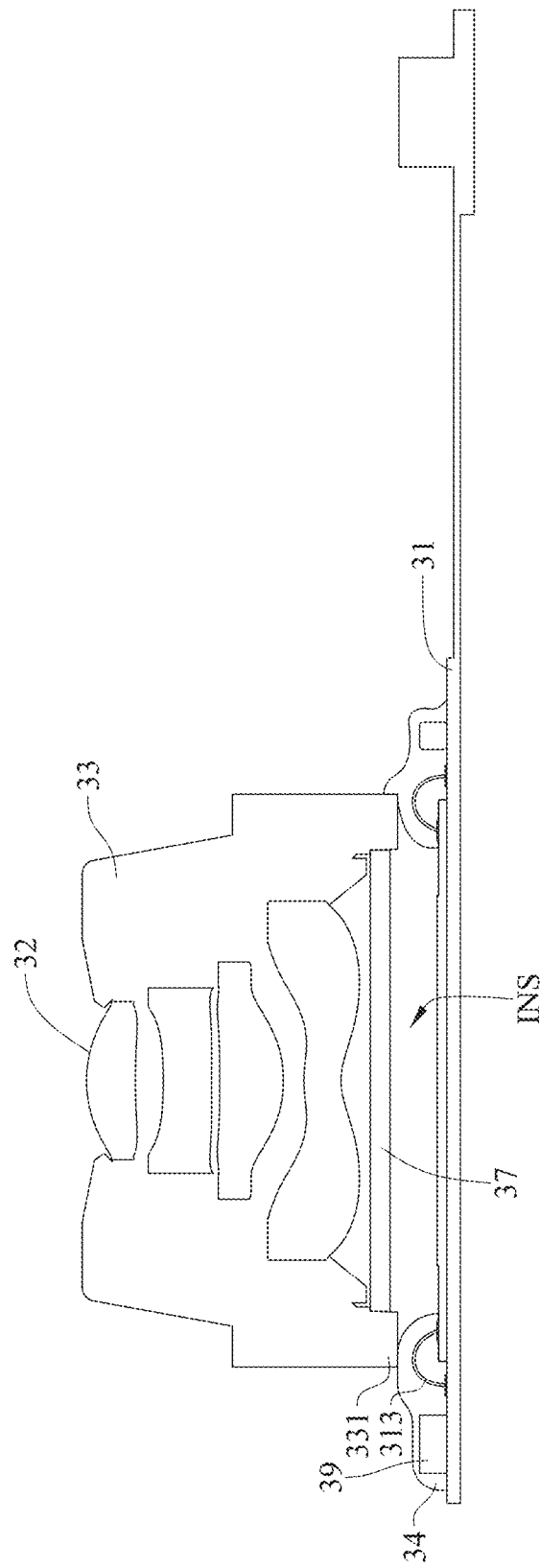
Figure 58:
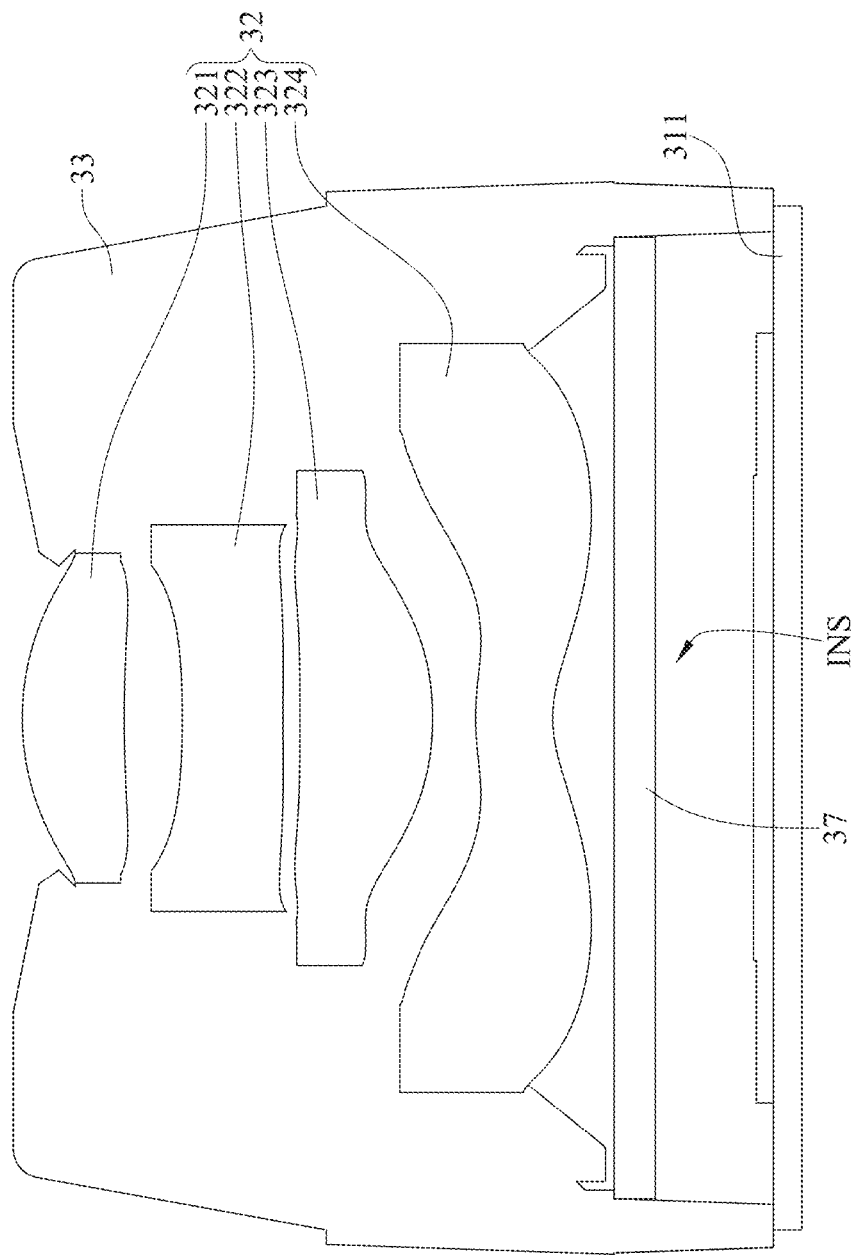
Figure 59:
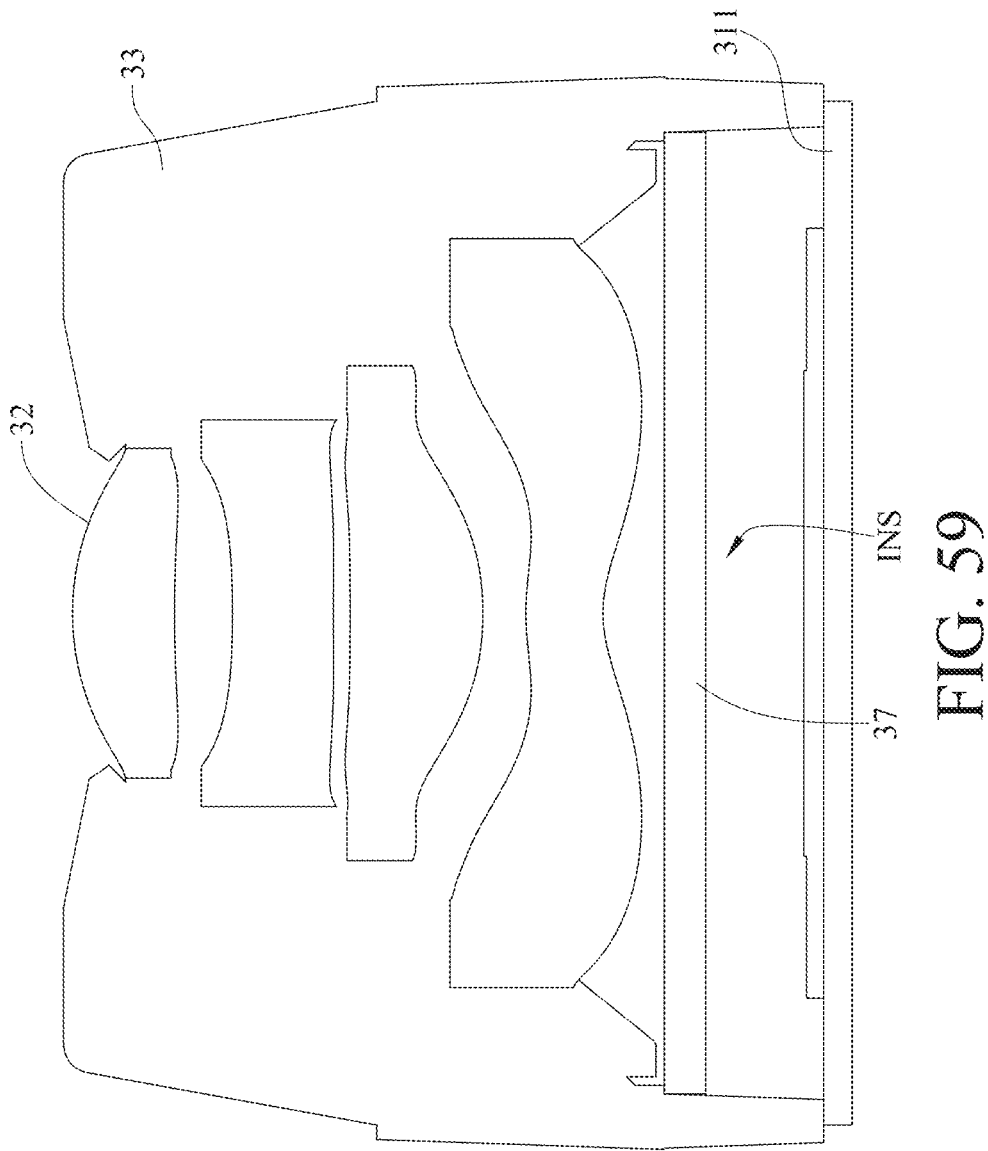
Figure 60:
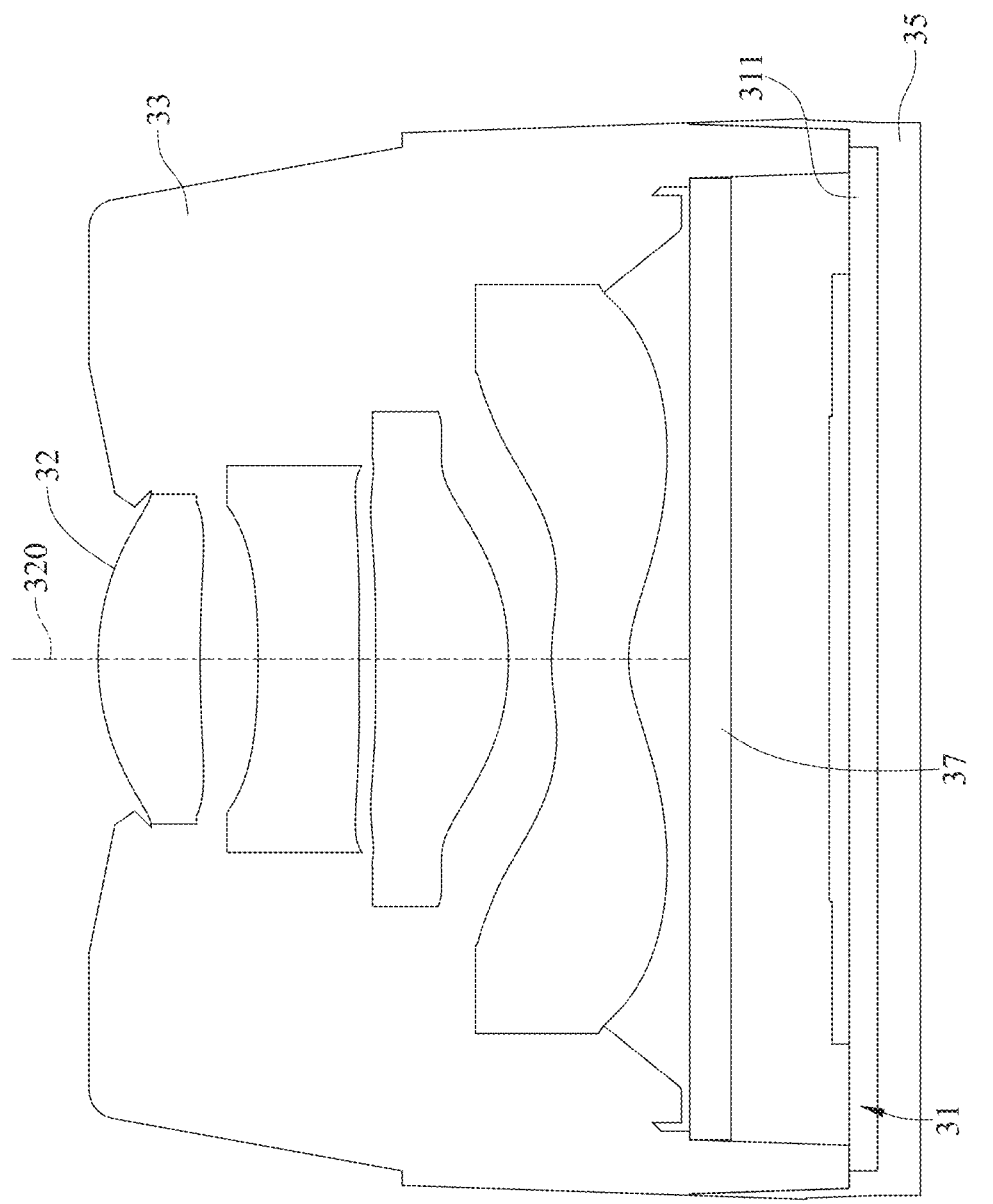

The lens holding member 33 holds the lens assembly 32. The lens holding member 33 includes two wire correspondence structures 331. Please refer to FIG. 61, the wire correspondence structures 331 are disposed corresponding to the conducting wires 313. Please refer to FIG. 48 for the assembly position, the lens holding member 33 is disposed at a particular position (i.e., the X region) of the sensing part 31. The particular position (X region) is arranged on the substrate 311 of the sensing part 31. The assembled lens holding member 33 is shown in FIG. 58, which is disposed on the substrate 311. As shown in FIG. 54, the lens holding member 33 and the sensing part 31 form an internal space INS therebetween, and the internal space INS is in connection with outside via the wire correspondence structures 331 for utilizing the wire correspondence structures 331 as air exhaust channels connected to the internal space INS during assembly.

The isolating articles 34 isolate the conducting wires 313. Further, please refer to FIG. 61, the isolating articles 34 are disposed between the wire correspondence structures 331 and the conducting wires 313. As shown in FIG. 61, the isolating articles 34 cover the conducting wires 313 and the electronic component 39.

The plastic molding article 35 includes a thermal conductive polymer. The plastic molding article 35 is molded on the sensing part 31 and in physical contact with the lens holding member 33. Further, please refer to FIG. 61, the plastic molding article 35 covers the lens holding member 33 and the sensing part 31 through an insert molding process, such that all of them are integrally formed into one piece. And, as shown in FIG. 47, the molded plastic molding article 35 has a plurality of clamped parts 352 for being easily fixed together with the sensing part 31 during the molding process.

The optical element 37 is an IR-cut filter. The optical element 37 is disposed on the lens holding member 33 and corresponding to the optical effective area 3121. And, the optical element 37 is located at an image side of the fourth lens element 324.

The anti-reflection membranes 38 are disposed at a side of the lens holding member 33 facing towards a side of the sensing part 31, on the optical effective area 3121 and at a side of the optical element 37 facing towards the optical effective area 3121, as shown in FIG. 61. The anti-reflection membranes 38 each include a nano-ridge layer (not shown in the drawings of this embodiment). The pitch of the nano-ridges distribution in the nano-ridge layer becomes large towards the air, which represents that the nano-ridge layer becomes sparse towards the air, and the average height of the nano-ridge layer ranges from 60 nanometers to 400 nanometers. The detail of the nano-ridge layer can refer to the description about FIG. 71 to FIG. 73, and it will not be repeated here again.

And, the isolating articles 34 have hardness equal to or smaller than that of the plastic molding article 35. The plastic molding article 35 has thermally conductivity equal to or larger than that of the lens holding member 33.

4th Embodiment

Figure 62:
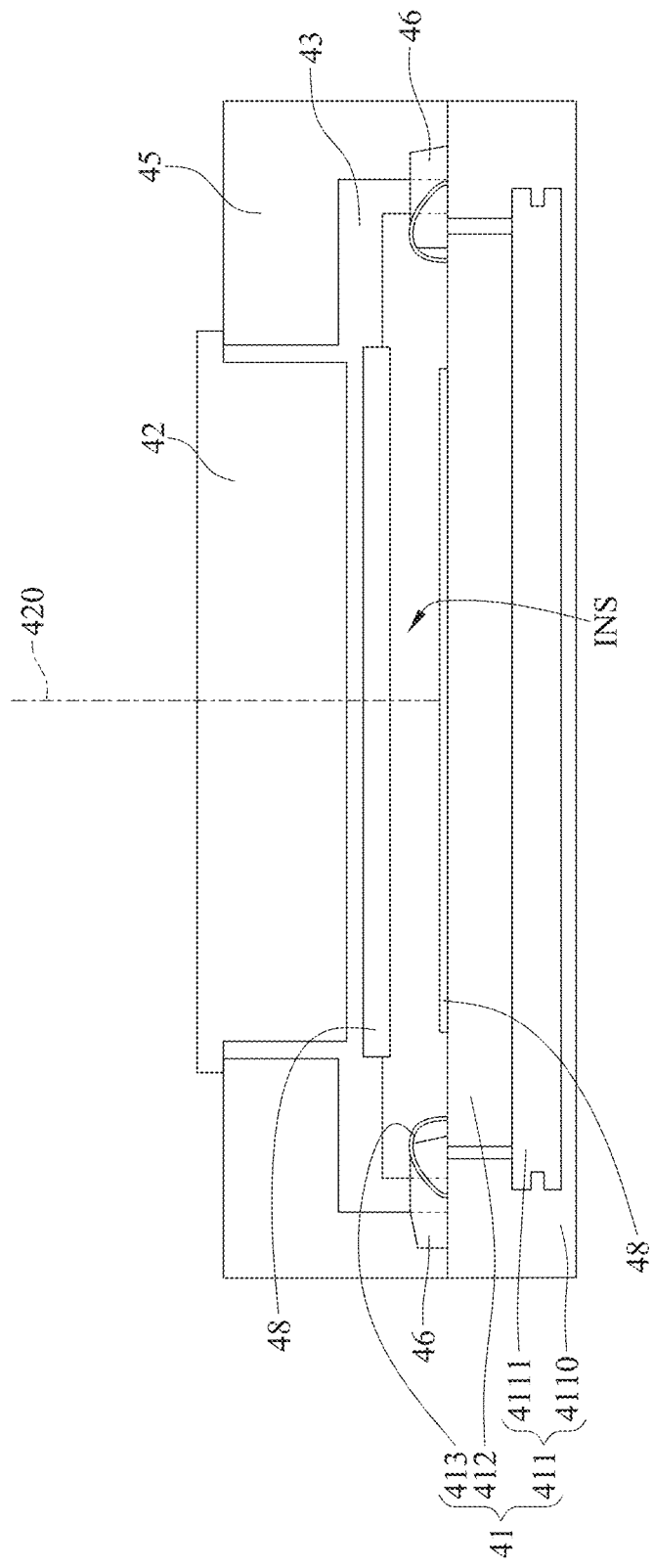
FIG. 62 is a cross-sectional view of an imaging lens module according to the 4th embodiment of the present disclosure.
Figure 63:
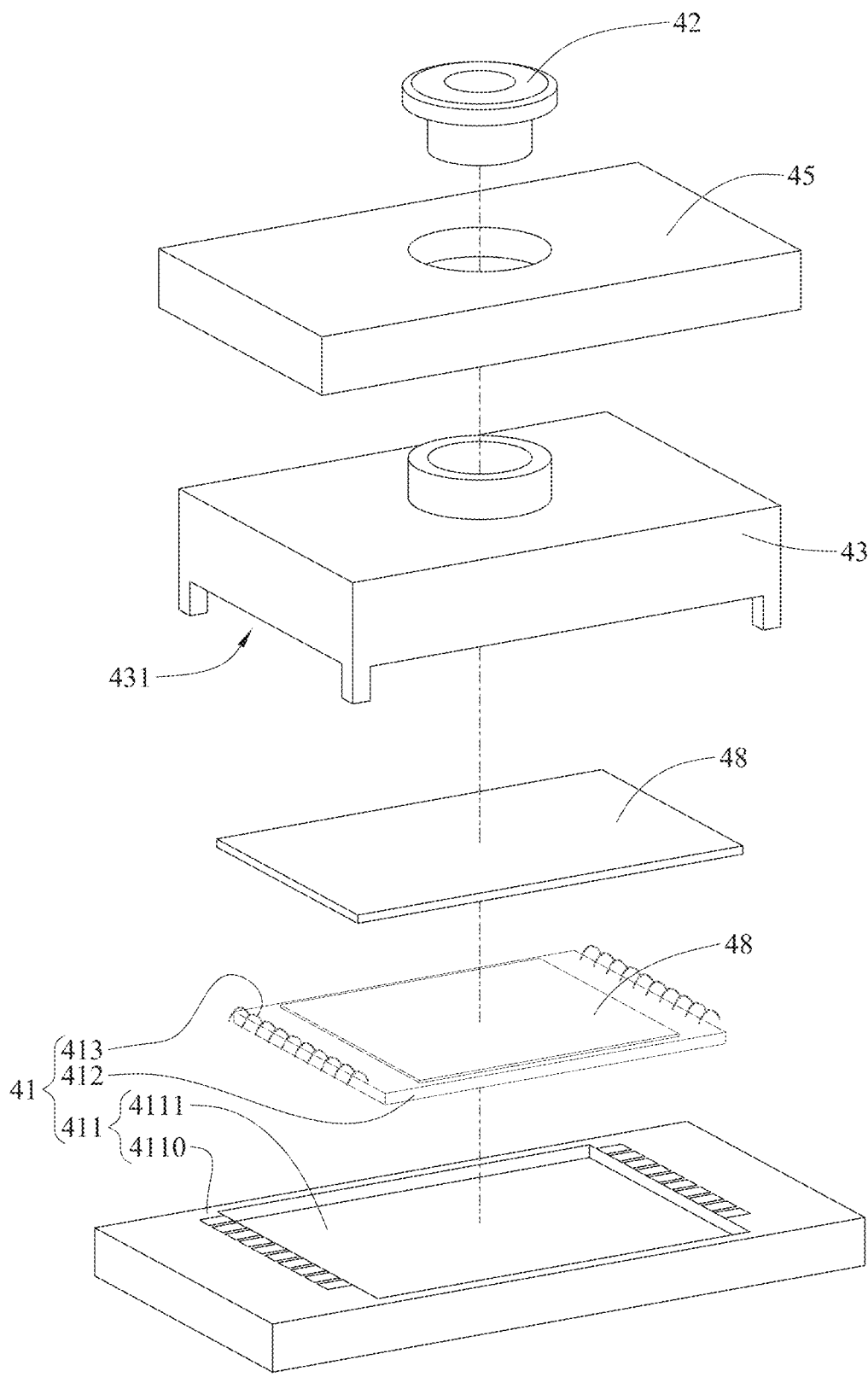
FIG. 63 is an exploded view of the imaging lens module in FIG. 62.

Please refer to FIG. 62 to FIG. 63, where FIG. 62 is a cross-sectional view of an imaging lens module according to the 4th embodiment of the present disclosure, and FIG. 63 is an exploded view of the imaging lens module in FIG. 62. Please be noted that FIG. 62 and FIG. 63 are only exemplary, and the present disclosure is not limited thereto.

In this embodiment, an imaging lens module 4 includes a sensing part 41, a lens assembly 42, a lens holding member 43, a plastic molding article 45, a pre-adhesive article 46 and a plurality of anti-reflection membranes 48.

The sensing part 41 includes a substrate 411, a sensing chip 412 and a plurality of conducting wires 413. The substrate 411 supports the sensing chip 412. Specifically, please refer to FIG. 62, the substrate 411 includes main part 4110 and a heat dissipation layer 4111. The heat dissipation layer 4111 is disposed on the main part 4110. The sensing chip 412 is disposed on the heat dissipation layer 4111. The conducting wires 413 are electrically connected to the sensing chip 412 and the main part 4110 so as to transmit image signals.

The lens assembly 42 is disposed corresponding to the sensing chip 412 and has an optical axis 420.

The lens holding member 43 holds the lens assembly 42. The lens holding member 43 includes two wire correspondence structures 431. Please refer to FIG. 63, the wire correspondence structures 431 are disposed corresponding to the conducting wires 413. The lens holding member 43 is disposed at a particular position of the sensing part 41. The particular position is arranged on the substrate 411 of the sensing part 41 for the pre-adhesive article 46 to be disposed thereon. The assembled lens holding member 43 is shown in FIG. 63, which is disposed on the substrate 411. As shown in FIG. 62, the lens holding member 43 and the sensing part 41 form an internal space INS therebetween, and the internal space INS is in connection with outside via the wire correspondence structures 431 for utilizing the wire correspondence structures 431 as air exhaust channels connected to the internal space INS during assembly.

The plastic molding article 45 is molded on the sensing part 41 and in physical contact with the lens holding member 43. Further, please refer to FIG. 62, the plastic molding article 45 can be integrally formed with the lens holding member 43 and the sensing part 41 through an insert molding process. Therefore, the lens holding member 43 can be fixed with respect to the sensing part 41. As shown in FIG. 62, the plastic molding article 45 is located farther away from the sensing chip 412 than the conducting wires 413.

The anti-reflection membranes 48 are disposed at a side of the lens holding member 43 facing towards the sensing part 41 and on the sensing chip 412, as shown in FIG. 62. The anti-reflection membranes 48 each include a nano-ridge layer (not shown in the drawings of this embodiment). The pitch of the nano-ridges distribution in the nano-ridge layer becomes large towards the air, which represents that the nano-ridge layer becomes sparse towards the air, and the average height of the nano-ridge layer ranges from 60 nanometers to 400 nanometers. The detail of the nano-ridge layer can refer to the description about FIG. 71 to FIG. 73, and it will not be repeated here again.

5th Embodiment

Figure 64:
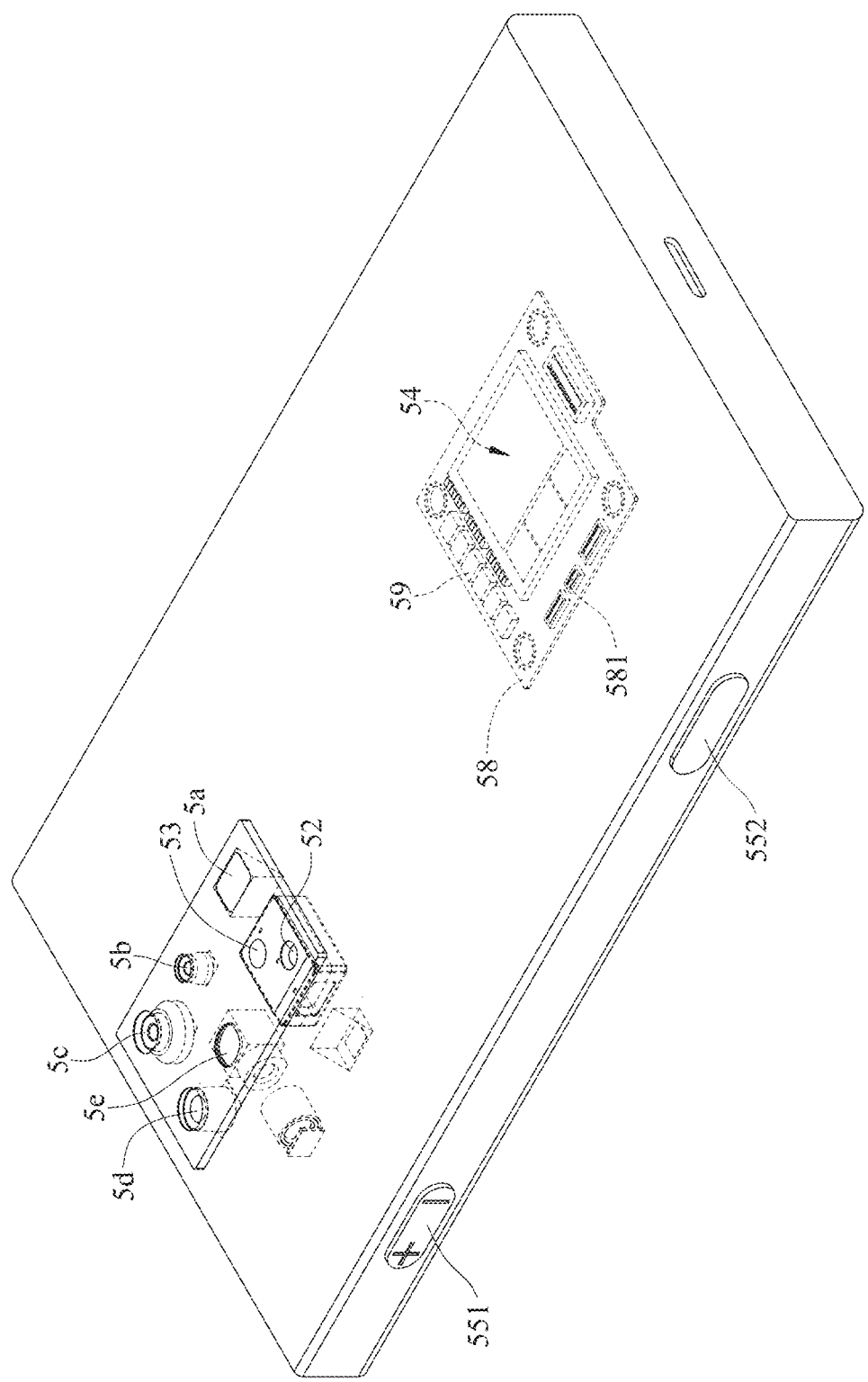
FIG. 64 is a perspective view of an electronic device according to the 5th embodiment of the present disclosure.
Figure 65:
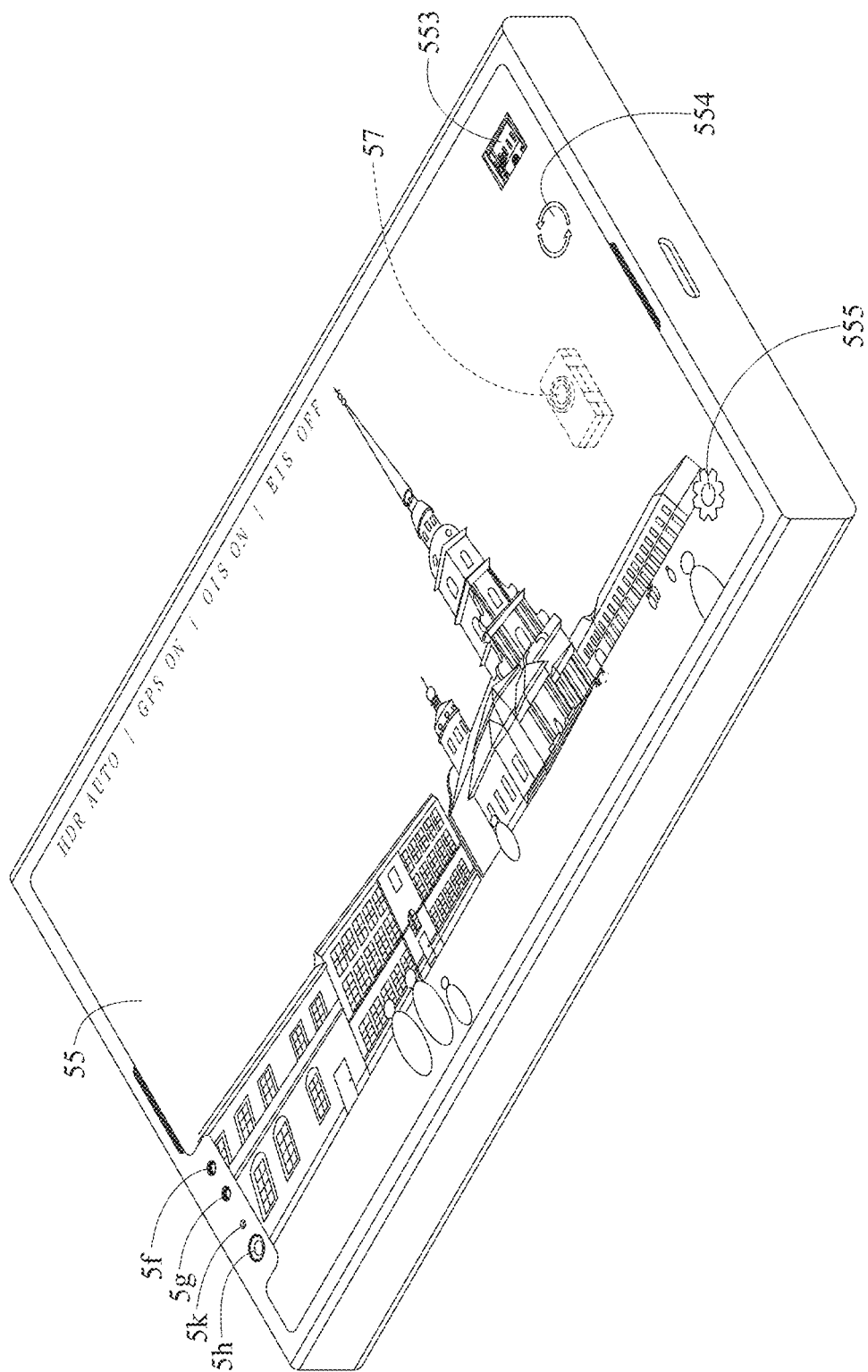
FIG. 65 is another perspective view of the electronic device in FIG. 64.
Figure 66:
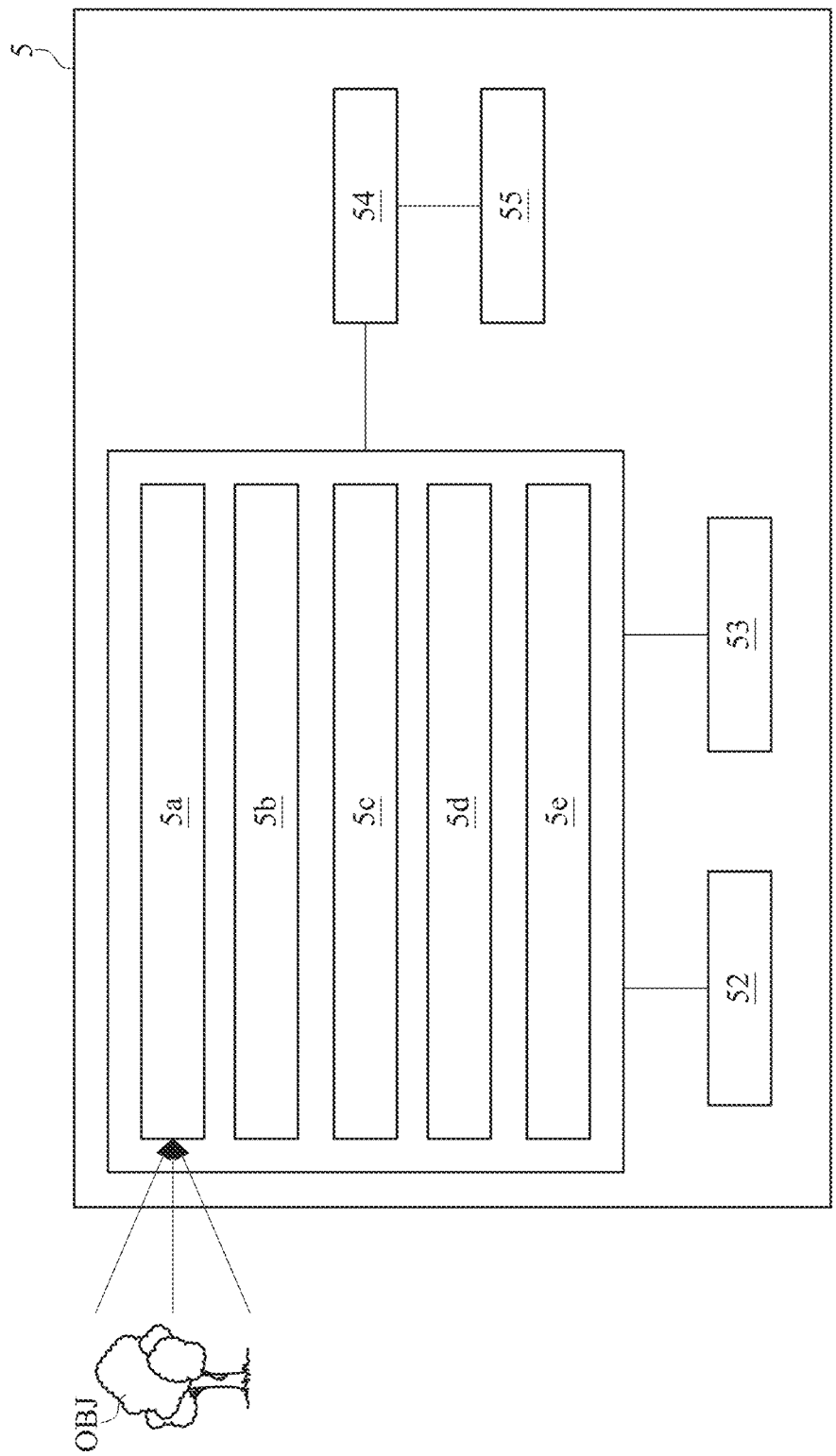
FIG. 66 is a block diagram of the electronic device in FIG. 64.

Please refer to FIG. 64 to FIG. 66, where FIG. 64 is a perspective view of an electronic device according to the 5th embodiment of the present disclosure, FIG. 65 is another perspective view of the electronic device in FIG. 64, and FIG. 66 is a block diagram of the electronic device in FIG. 64.

In this embodiment, an electronic device 5 is a mobile device such as a computer, a smartphone, a smart wearable device, a camera drone, and a driving recorder and displayer, but the present disclosure is not limited thereto. The electronic device 5 includes an image capturing unit 5a, an image capturing unit 5b, an image capturing unit 5c, an image capturing unit 5d, an image capturing unit 5e, an image capturing unit 5f, an image capturing unit 5g, an image capturing unit 5h, a flash module 52, a focus assist module 53, an image signal processor, a display module 55, an image software processor and a biometric identification device 57.

Each of the image capturing unit 5a, the image capturing unit 5b, the image capturing unit 5c, the image capturing unit 5d, the image capturing unit 5e, the image capturing unit 5f, the image capturing unit 5g and the image capturing unit 5h can include one of the imaging lens modules 1-4 abovementioned in the 1st to the 4th embodiments.

The image capturing unit 5a, the image capturing unit 5b, the image capturing unit 5c, the image capturing unit 5d and the image capturing unit 5e are disposed on the same side of the electronic device 5. The image capturing unit 5f, the image capturing unit 5g, the image capturing unit 5h and the display module 55 are disposed on the opposite side of the electronic device 5. The display module 55 can be a user interface, so that the image capturing units 5f, 5g and 5h can be front-facing cameras of the electronic device 5 for taking selfies, but the present disclosure is not limited thereto.

Figure 67:
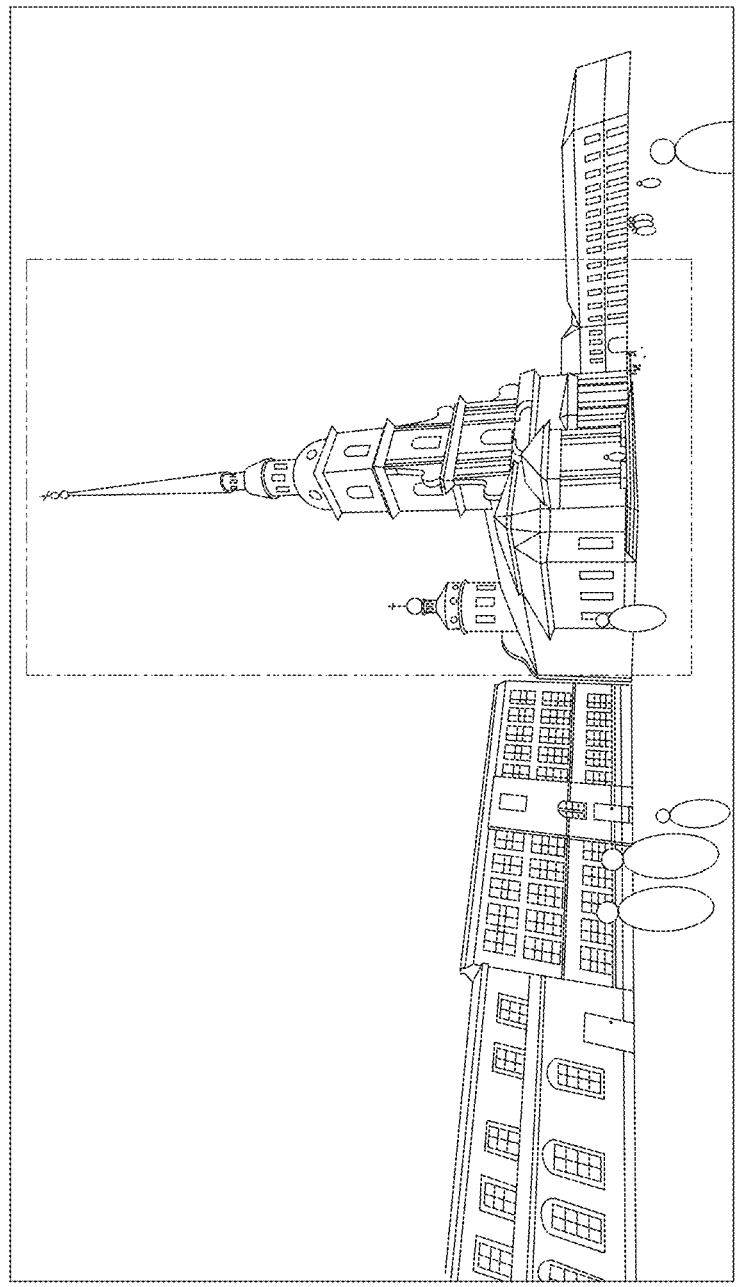
FIG. 67 shows an image captured by an ultra-wide-angle image capturing unit of the electronic device in FIG. 64.
Figure 68:
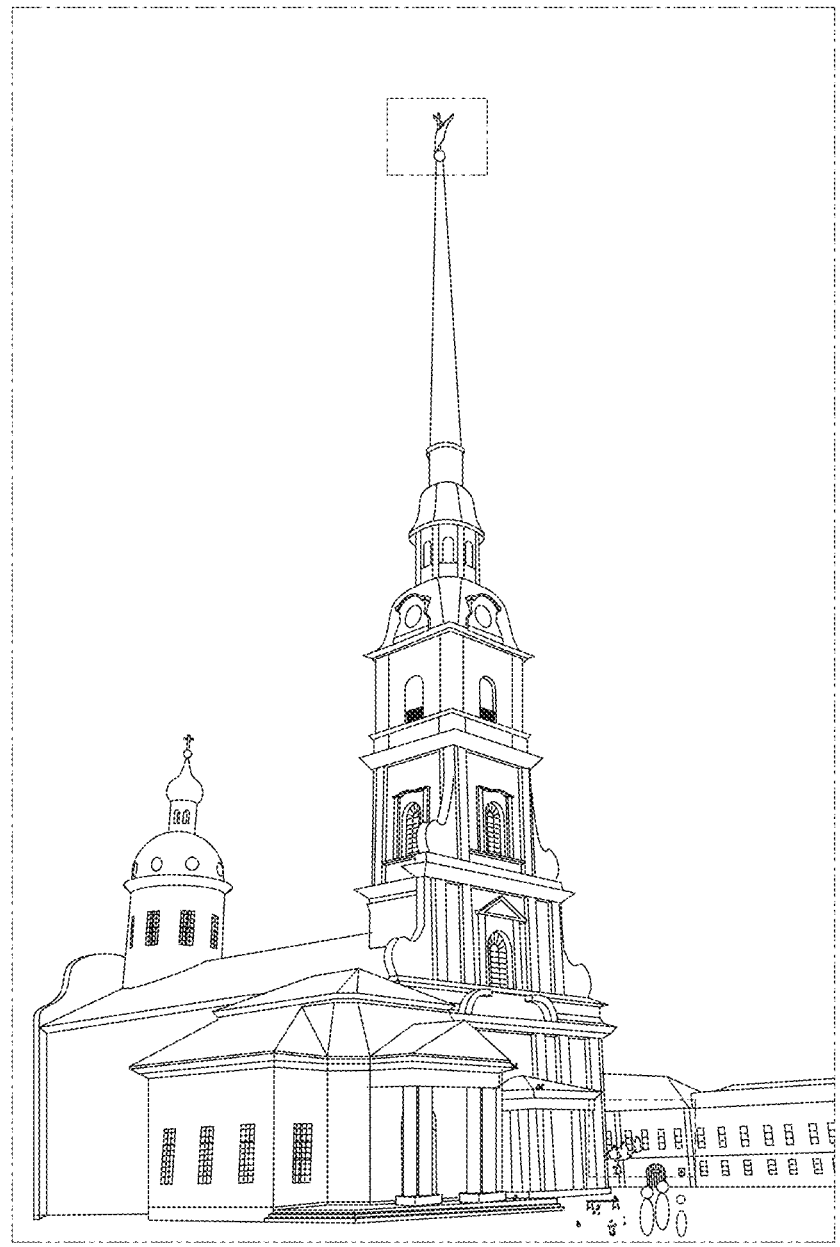
FIG. 68 shows an image captured by a wide-angle image capturing unit of the electronic device in FIG. 64.
Figure 69:
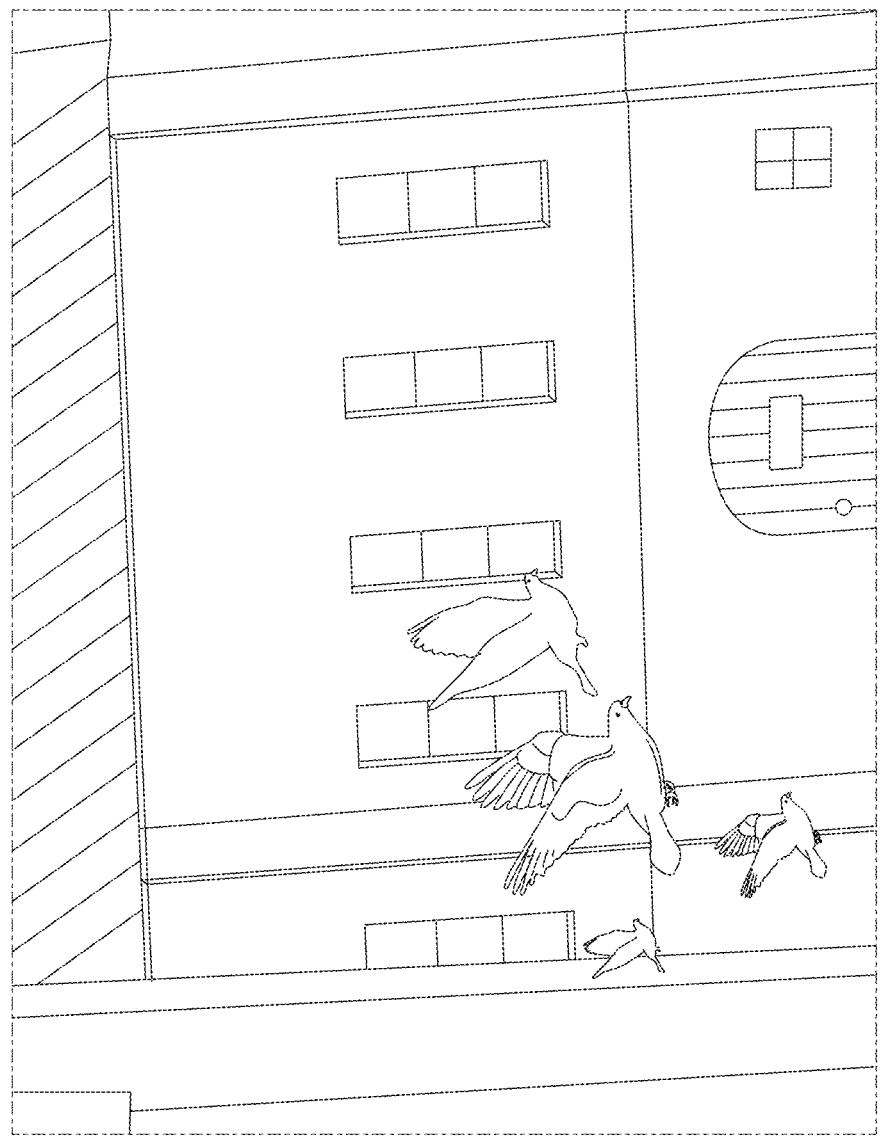
FIG. 69 shows an image captured by a telephoto image capturing unit of the electronic device in FIG. 64.
Figure 70:
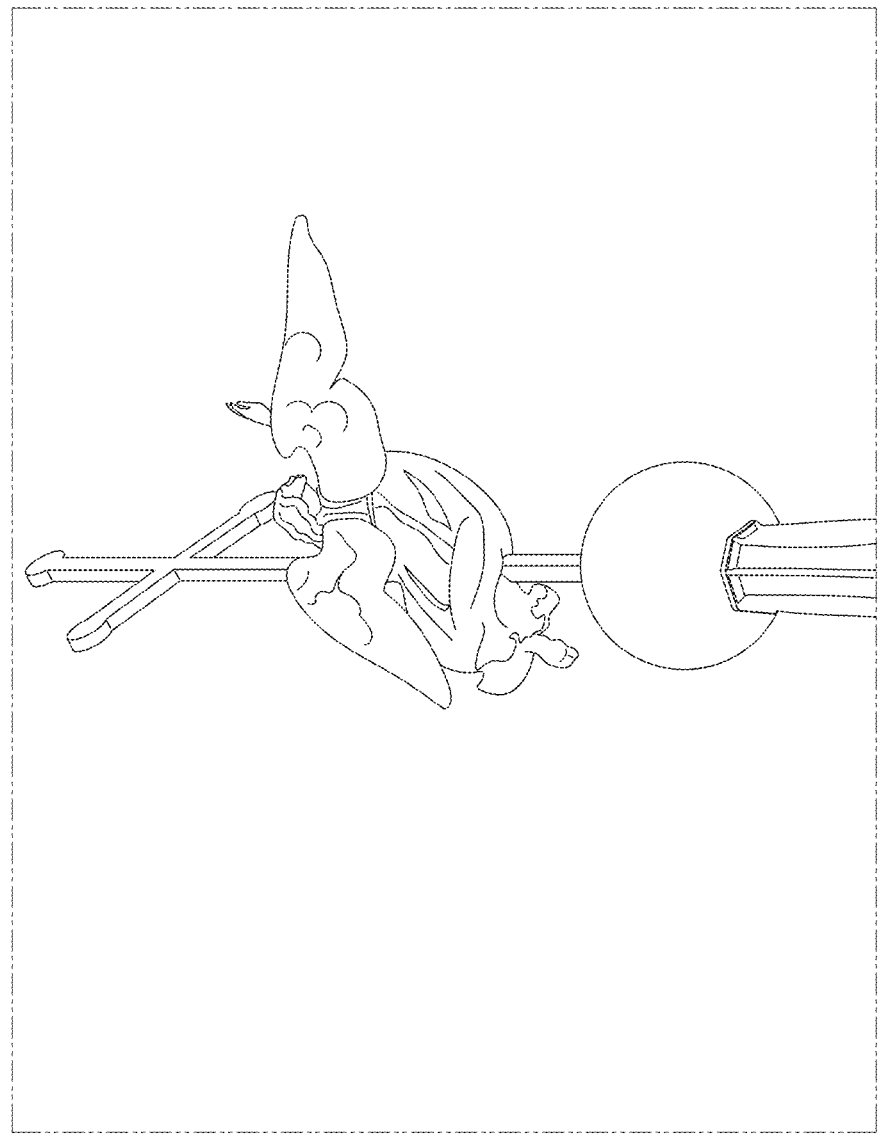
FIG. 70 shows an image captured by an ultra-telephoto image capturing unit of the electronic device in FIG. 64.

The image capturing unit 5a is an ultra-telephoto image capturing unit, the image capturing unit 5b is a macro-photo image capturing unit, the image capturing unit 5c is a wide-angle image capturing unit, the image capturing unit 5d is an ultra-wide-angle image capturing unit, the image capturing unit 5e is a telephoto image capturing unit, the image capturing unit 5f is an ultra-wide-angle image capturing unit, the image capturing unit 5g is a wide-angle image capturing unit, and the image capturing unit 5h is a ToF (time of flight) image capturing unit. In this embodiment, the image capturing unit 5a, the image capturing unit 5b, the image capturing unit 5c, the image capturing unit 5d and the image capturing unit 5e have different fields of view, such that the electronic device 5 can have various magnification ratios so as to meet the requirement of optical zoom functionality. For example, the image captured by the ultra-wide-angle image capturing unit 5d can refer to FIG. 67, which shows an image captured by the ultra-wide-angle image capturing unit 5d of the electronic device 5, and the captured image as shown in FIG. 67 includes the whole cathedral, surrounding buildings and people on the square. The captured image as shown in FIG. 67 has a relatively large field of view and depth of view, but it often has a relatively large degree of distortion. The image captured by the wide-angle image capturing unit 5c can refer to FIG. 68, which shows an image captured by a wide-angle image capturing unit 5c of the electronic device 5, and the captured image as shown in FIG. 68 includes the whole cathedral and people in front of the cathedral. The image captured by the telephoto image capturing unit 5e can refer to FIG. 69, which shows an image captured by the telephoto image capturing unit 5e of the electronic device 5, and the captured image as shown in FIG. 69 includes the birds flying in front of the cathedral. The captured image as shown in FIG. 69 has a relatively small field of view and depth of view, and the telephoto image capturing unit 5e can be used for shooting moving targets. For this, an optical element driving unit (not shown) can drive the lens assembly to quickly and continuously autofocus on the target, such that the captured image of the target would not be blurred due to deviation from the focusing position. When imaging, the telephoto image capturing unit 5e can further perform optical zoom for imaged objects so as to obtain clearer images. The image captured by the ultra-telephoto image capturing unit 5a can refer to FIG. 70, which shows an image captured by the ultra-telephoto image capturing unit 5a of the electronic device 5, and the captured image as shown in FIG. 70 includes the angel-and-cross-topped spire of the cathedral. The captured image as shown in FIG. 70 has a further smaller field of view and depth of view, and the lens assembly of the ultra-telephoto image capturing unit 5a may easily capture an out of focus image due to slight camera shake. For this, the optical element driving unit can provide a feedback force to reduce the shake so as to achieve optical image stabilization while providing a force to drive the lens assembly of the ultra-telephoto image capturing unit 5a to focus on a target. In addition, the image capturing unit 5h can determine depth information of the imaged object. In this embodiment, the electronic device 5 includes multiple image capturing units 5a, 5b, 5c, 5d, 5e, 5f, 5g and 5h, but the present disclosure is not limited to the number and arrangement of image capturing units.

When a user captures images of an object OBJ, light rays converge in the image capturing unit 5a, the image capturing unit 5b, the image capturing unit 5c or the image capturing unit 5e to generate images, and the flash module 52 is activated for light supplement. The focus assist module 53 detects the object distance of the imaged object OBJ to achieve fast auto focusing. The image signal processor is configured to optimize the captured image to improve image quality. The light beam emitted from the focus assist module 53 can be either conventional infrared or laser.

In addition, the light rays may converge in the image capturing unit 5f, 5g or 5h to generate images. The electronic device 5 can include a reminder light 5k that can be illuminated to remind the user that the image capturing unit 5f, 5g or 5h of the electronic device 5 is working. The display module 55 can be a touch screen or physical buttons such as a zoom button 551 and a shutter release button 552. The user is able to interact with the display module 55 and the image software processor having multiple functions to capture images and complete image processing. The image processed by the image software processor can be displayed on the display module 55. The user can replay the previously captured image through an image playback button 553 of the display module 55, can choose a suitable image capturing unit for shooting through an image capturing units switching button 554 of the display module 55, and can properly adjust shooting parameters according to current shooting situations through an integrated menu button 555 of the display module 55.

Further, the electronic device 5 further includes a circuit board 58 and a plurality of electronic components 59 disposed on the circuit board 58. The image capturing unit 5a, 5b, 5c, 5d, 5e, 5f, 5g, and 5h are electrically connected to the electronic components 59 via connectors 581 on the circuit board 58. The electronic components 59 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, but the present disclosure is not limited thereto.

The electronic components 59 can also include a storage unit, a random access memory for storing image information, a gyroscope, and a position locator for facilitating the navigation or positioning of the electronic device 5. In this embodiment, the image signal processor, the image software processor and the random access memory are integrated into a single chip system 54, but the present disclosure is not limited thereto. In some other embodiments, the electronic components can also be integrated in the image capturing unit or can also be disposed on one of the circuit boards. In addition, the user can use the biometric identification device 57 to turn on and unlock the electronic device 5.

The smartphone in this embodiment is only exemplary for showing the lens assembly and the image capturing unit of the present disclosure installed in an electronic device, and the present disclosure is not limited thereto. The lens assembly and the image capturing unit can be optionally applied to optical systems with a movable focus. Furthermore, the lens assembly and the image capturing unit feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module, comprising:
    a sensing part, comprising a substrate, a sensing chip and a plurality of conducting wires, wherein the substrate supports the sensing chip, the sensing chip comprises an optical effective area and an electrical connection area, and the plurality of conducting wires are electrically connected to the electrical connection area for transmitting an image signal;
    a lens assembly, disposed corresponding to the optical effective area;
    a lens holding member, holding the lens assembly, wherein the lens holding member comprises a wire correspondence structure disposed corresponding to the plurality of conducting wires;
    an isolating article, disposed between the wire correspondence structure and the plurality of conducting wires; and
    a plastic molding article, molded on the sensing part, wherein the plastic molding article is in physical contact with the lens holding member, such that the lens holding member is fixed with respect to the sensing part;
    wherein hardness of the isolating article is equal to or smaller than hardness of the plastic molding article.

2. The imaging lens module according to claim 1, wherein the plastic molding article is located farther away from the optical effective area than the isolating article.

3. The imaging lens module according to claim 1, wherein the isolating article encloses the wire correspondence structure.

4. The imaging lens module according to claim 1, wherein the lens holding member and the sensing part form an internal space therebetween, and the internal space is in connection with outside via the wire correspondence structure.

5. The imaging lens module according to claim 1, wherein the lens holding member is disposed at a particular position of the sensing part, and the particular position is located on one of the substrate and the sensing chip.

6. The imaging lens module according to claim 5, further comprising a pre-adhesive article disposed at the particular position.

7. The imaging lens module according to claim 1, further comprising an anti-reflection membrane disposed at a side of the lens holding member facing towards the sensing part, wherein the anti-reflection membrane comprises a nano-ridge layer that mainly comprises a ceramic material, the nano-ridge layer becomes sparse towards air, and an average height of the nano-ridge layer ranges from 60 nanometers to 400 nanometers.

8. The imaging lens module according to claim 1, further comprising an anti-reflection membrane disposed in the optical effective area, wherein the anti-reflection membrane comprises a nano-ridge layer that mainly comprises a ceramic material, the nano-ridge layer becomes sparse towards air, and an average height of the nano-ridge layer ranges from 60 nanometers to 400 nanometers.

9. The imaging lens module according to claim 1, further comprising an optical element and an anti-reflection membrane, wherein the optical element is disposed on the lens holding member and corresponding to the optical effective area, the anti-reflection membrane is disposed at a side of the optical element facing towards the optical effective area, the anti-reflection membrane comprises a nano-ridge layer that mainly comprises a ceramic material, the nano-ridge layer becomes sparse towards air, and an average height of the nano-ridge layer ranges from 60 nanometers to 400 nanometers.

10. The imaging lens module according to claim 1, wherein the substrate comprises a heat dissipation layer, and the sensing chip is disposed on the heat dissipation layer.

11. The imaging lens module according to claim 1, wherein the plastic molding article is integrally formed with the lens holding member and the sensing part through an insert molding process.

12. The imaging lens module according to claim 1, wherein the plastic molding article comprises a thermal conductive polymer, and thermal conductivity of the thermal conductive polymer is equal to or larger than thermal conductivity of the lens holding member.

13. The imaging lens module according to claim 1, wherein the isolating article covers the plurality of conducting wires, and the isolating article comprises a light-absorption material.

14. The imaging lens module according to claim 1, wherein the lens assembly comprises a trimmed lens element.

15. An electronic device, comprising:
the imaging lens module of claim 1.

16. An imaging lens module, comprising:
a sensing part, comprising a substrate, a sensing chip and a plurality of conducting wires, wherein the substrate supports the sensing chip, the sensing chip comprises an optical effective area and an electrical connection area, and the plurality of conducting wires are electrically connected to the electrical connection area for transmitting an image signal;
a lens assembly, disposed corresponding to the optical effective area;
a lens holding member, holding the lens assembly;
an isolating article, isolates the plurality of conducting wires; and
a plastic molding article, molded on the sensing part and located farther away from the optical effective area than the plurality of conducting wires, wherein the plastic molding article is in physical contact with the lens holding member, such that the lens holding member is fixed with respect to the sensing part;
wherein hardness of the isolating article is equal to or smaller than hardness of the plastic molding article.

17. The imaging lens module according to claim 16, wherein the plastic molding article is located farther away from the optical effective area than the isolating article.

18. The imaging lens module according to claim 16, further comprising an anti-reflection membrane disposed at a side of the lens holding member facing towards the sensing part, wherein the anti-reflection membrane comprises a nano-ridge layer that mainly comprises a ceramic material, the nano-ridge layer becomes sparse towards air, and an average height of the nano-ridge layer ranges from 60 nanometers to 400 nanometers.

19. The imaging lens module according to claim 16, further comprising an anti-reflection membrane disposed in the optical effective area, wherein the anti-reflection membrane comprises a nano-ridge layer that mainly comprises a ceramic material, the nano-ridge layer becomes sparse towards air, and an average height of the nano-ridge layer ranges from 60 nanometers to 400 nanometers.

20. The imaging lens module according to claim 16, further comprising an optical element and an anti-reflection membrane, wherein the optical element is disposed on the lens holding member and corresponding to the optical effective area, the anti-reflection membrane is disposed at a side of the optical element facing towards the optical effective area, the anti-reflection membrane comprises a nano-ridge layer that mainly comprises a ceramic material, the nano-ridge layer becomes sparse towards air, and an average height of the nano-ridge layer ranges from 60 nanometers to 400 nanometers.

21. The imaging lens module according to claim 16, wherein the substrate comprises a heat dissipation layer, and the sensing chip is disposed on the heat dissipation layer.

22. The imaging lens module according to claim 16, wherein the plastic molding article is integrally formed with the lens holding member and the sensing part through an insert molding process.

23. The imaging lens module according to claim 16, wherein the isolating article comprises a light-absorption material.

24. An electronic device, comprising:
the imaging lens module of claim 16.

* * * * *